US012320169B2

(12) United States Patent
Farnesi et al.

(10) Patent No.: US 12,320,169 B2
(45) Date of Patent: Jun. 3, 2025

(54) CLOSURE LATCH ASSEMBLY WITH RELEASE CABLE ARRANGEMENT HAVING AN ANTI-RATTLE MECHANISM

(71) Applicant: MAGNA CLOSURES INC., Newmarket (CA)

(72) Inventors: Luca Farnesi, Pisa (IT); Marco Taurasi, Leghorn (IT)

(73) Assignee: MAGNA CLOSURES INC., Newmarket (CA)

( * ) Notice: Subject to any disclaimer, the term of this patent is extended or adjusted under 35 U.S.C. 154(b) by 171 days.

(21) Appl. No.: 18/094,391

(22) Filed: Jan. 8, 2023

(65) Prior Publication Data

US 2023/0220705 A1 Jul. 13, 2023

Related U.S. Application Data

(60) Provisional application No. 63/298,420, filed on Jan. 11, 2022.

(51) Int. Cl.

| | |
|---|---|
| ***E05B 81/90*** | (2014.01) |
| ***E05B 77/26*** | (2014.01) |
| ***E05B 79/20*** | (2014.01) |
| ***E05B 81/06*** | (2014.01) |
| ***E05B 81/14*** | (2014.01) |

(Continued)

(52) U.S. Cl.
CPC .............. *E05B 81/90* (2013.01); *E05B 77/26* (2013.01); *E05B 79/20* (2013.01); *E05B 81/06* (2013.01); *E05B 81/14* (2013.01); *E05B 81/30* (2013.01); *E05B 83/36* (2013.01)

(58) Field of Classification Search
CPC .......... E05B 77/00; E05B 77/22; E05B 77/24; E05B 77/245; E05B 77/26; E05B 77/265; E05B 79/00; E05B 79/10; E05B 79/20; E05B 81/00; E05B 81/02; E05B 81/06; E05B 81/12–15; E05B 81/24;
(Continued)

(56) References Cited

U.S. PATENT DOCUMENTS

| | | | |
|---|---|---|---|
| 7,827,836 | B2 | 11/2010 | Cetnar |
| 10,214,945 | B2 | 2/2019 | Cetnar |

(Continued)

FOREIGN PATENT DOCUMENTS

| | | | |
|---|---|---|---|
| DE | 102019134375 A1 * | 6/2021 | |

*Primary Examiner* — Nathan Cumar
(74) *Attorney, Agent, or Firm* — Dickinson Wright PLLC

(57) ABSTRACT

The present disclosure relates to a closure latch assembly and system for a vehicle closure panel equipped with a latch mechanism having a latched position and an unlatched position and a power release mechanism moveable between home position, a release position and a double pull position and/or a child lock position, wherein a motor is operable to move the power release mechanism from the home position to the release position and from the home position to the double pull position and/or the child lock position, and wherein an emergency backup mechanism in mechanically coupled communication with the latch mechanism can be mechanically actuated from a non-deployed position to a deployed position to move a pawl from a ratchet holding position to a ratchet releasing position regardless of the position of the power release mechanism, wherein the emergency backup mechanism is prevented from generating rattling noise while in the non-deployed position.

18 Claims, 43 Drawing Sheets

(51) Int. Cl.
*E05B 81/30* (2014.01)
*E05B 83/36* (2014.01)

(58) Field of Classification Search
CPC .......... E05B 81/26; E05B 81/30; E05B 81/32; E05B 81/34; E05B 81/36; E05B 81/90
USPC .......................................................... 70/278.7
See application file for complete search history.

(56) References Cited

U.S. PATENT DOCUMENTS

| | | | | |
|---|---|---|---|---|
| 2017/0314297 | A1* | 11/2017 | Taurasi | E05B 77/30 |
| 2017/0314298 | A1* | 11/2017 | Tomaszewski | E05B 77/26 |
| 2017/0350170 | A1* | 12/2017 | Cetnar | E05B 77/26 |
| 2018/0340358 | A1 | 11/2018 | Mihail | |
| 2018/0340359 | A1* | 11/2018 | Cumbo | E05B 81/42 |
| 2018/0355642 | A1* | 12/2018 | Cumbo | E05B 83/36 |
| 2019/0271179 | A1* | 9/2019 | Patane | E05B 81/36 |
| 2020/0024871 | A1 | 1/2020 | Perkins | |
| 2020/0109579 | A1 | 4/2020 | Ottino | |
| 2021/0355716 | A1 | 11/2021 | Cumbo et al. | |
| 2021/0372169 | A1 | 12/2021 | Patane et al. | |

* cited by examiner

FIG. 3A
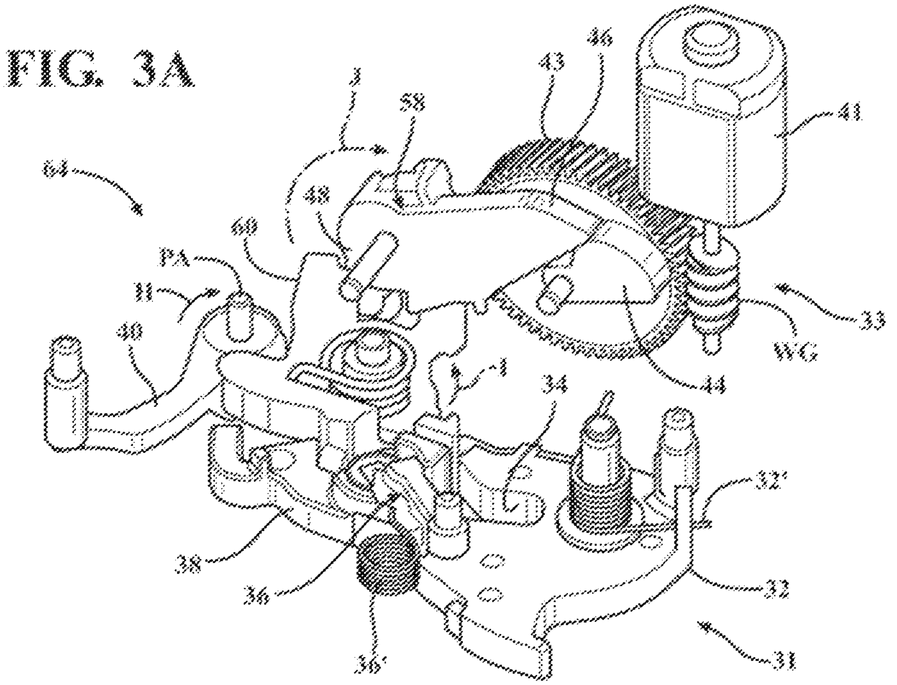
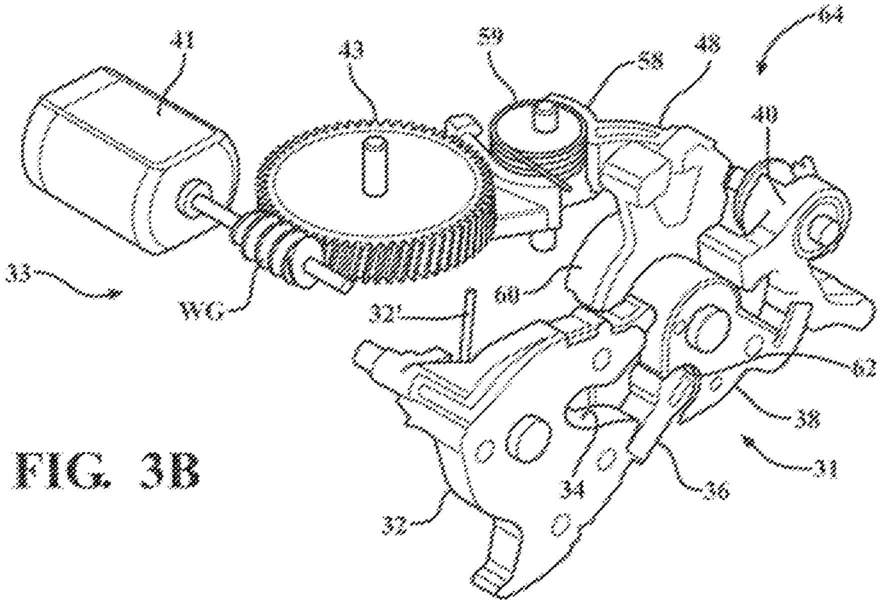
FIG. 3B

FIG. 35
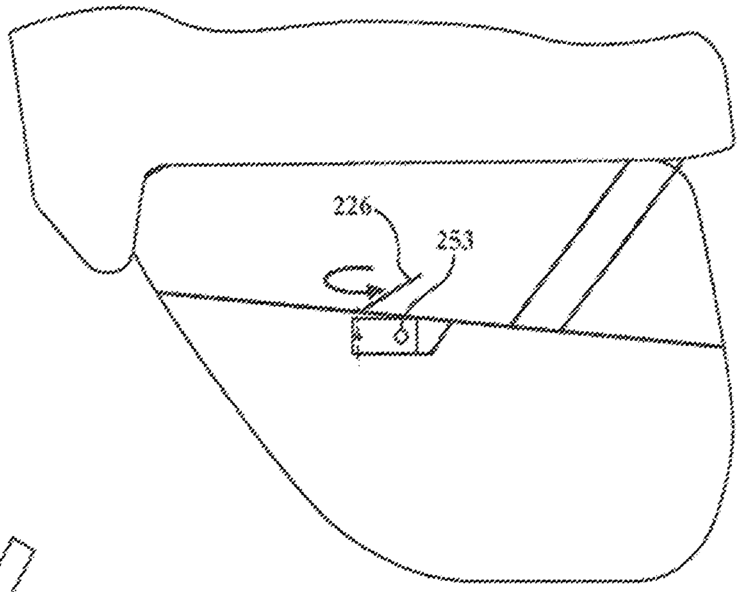
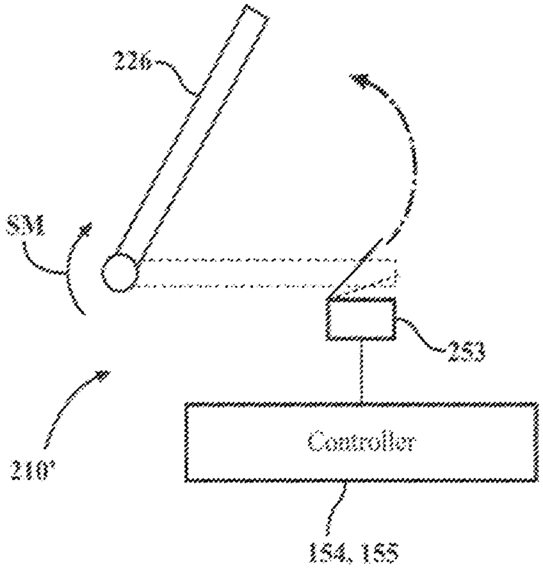
FIG. 35A
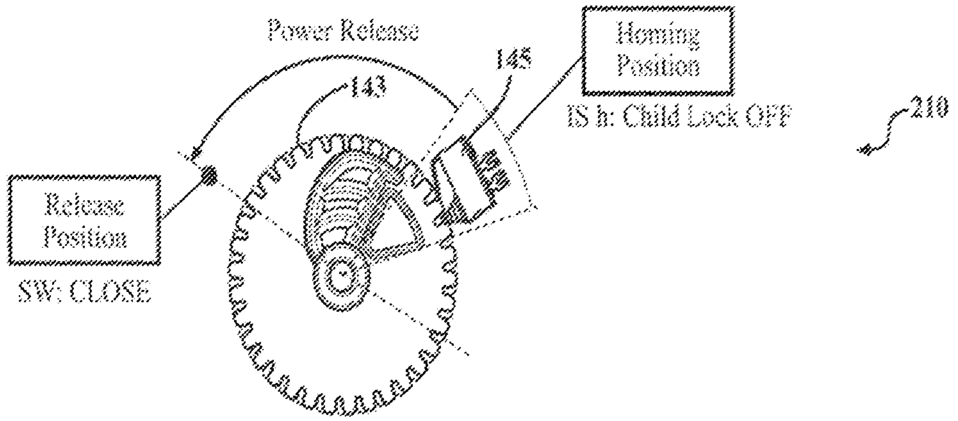
FIG. 35B

CLOSURE LATCH ASSEMBLY WITH RELEASE CABLE ARRANGEMENT HAVING AN ANTI-RATTLE MECHANISM

CROSS-REFERENCE TO RELATED APPLICATION

This application claims the benefit of U.S. Provisional Application Ser. No. 63/298,420, filed Jan. 11, 2022, which is incorporated herein by reference in its entirety.

FIELD

The present disclosure relates generally to closure latches for a vehicle passenger door. More particularly, the present disclosure is directed to a closure latch equipped with a power release mechanism and a mechanically actuated, emergency release mechanism.

BACKGROUND

This section provides background information related to closure latches and is not necessarily prior art to the closure latch of the present disclosure.

Passive entry systems for vehicles are provided on some vehicles to permit a vehicle user who is in possession of the key fob to simply pull the door handle and open the door without the need to introduce a key into a keyhole in the door. The key fob is typically equipped with an electronic device that communicates with the vehicle's on-board control system to authenticate the user. When the user pulls the outside door handle to indicate that he/she wishes entry into the vehicle, an electric actuator associated with a door-mounted closure latch is actuated to release a latch mechanism so as to unlatch the door and permit subsequent movement of the door to its open position. The outside door handle may also be equipped with a switch that triggers the electric actuator. The latch mechanism may also be mechanically released from inside the vehicle since the inside door handle is connected to an inside release mechanism associated with the closure latch. In some jurisdictions, however, there are regulations that govern the degree of connection provided by the inside release mechanism between the inside door handle and the latch mechanism (particularly for a rear door, where children may be the occupants).

Many modern closure latches provide various power-operated features including power release, power lock and power child lock in addition to a double pull inside release function. While commercially-available closure latches are satisfactory to meet operational and regulatory requirements, a need still exists to advance the technology to provide closure latches having reduced complexity and packaging, while providing an ability to open a rear door via an alternate opening mechanism in the event power is interrupted to the power-operated actuator. The alternate opening mechanism needs to be economical in manufacture and assembly; in compliance with government regulations, and allow intended operation of the latch assembly during normal use without negatively impacting the desired performance attributes of the latch assembly, including smooth, noise free operation. Accordingly, advances are continually being sought to address at least those issues discussed above.

SUMMARY

This section provides a general summary of the disclosure and is not intended to be considered as a comprehensive and exhaustive listing of its full scope or all of its aspects, features and objectives.

It is an aspect of the present disclosure to provide a closure latch system for a motor vehicle closure panel, such as passenger door, having a power release actuator movable between a home position, whereat a latch mechanism is in a latched position, a release position, whereat the latch mechanism is in an unlatched position, and a child lock position, whereat the latch mechanism is prevented from be moved from the latched position to the unlatched position, and further including an emergency release system configured for manual actuation to allow the latch mechanism to be moved to the unlatched position regardless of the position of the power release actuator to allow the passenger door to be opened.

It is another aspect of the present disclosure to provide a power-operated closure latch system for a vehicle closure panel, such as passenger door, having a power release actuator movable to a child lock position, whereat a latch mechanism is prevented from be moved from a latched position to an unlatched position, thereby preventing the passenger door from being opened from an inside release mechanism, and further including an emergency release system configured for manual actuation to allow the latch mechanism to be moved to the unlatched position while the latch mechanism is in the child lock position to allow the passenger door to be opened.

It is another aspect of the present disclosure to conceal the emergency release system against unintended access to avoid unintended movement of the latch mechanism from the latched position to the unlatched position while the latch mechanism is in the child lock position.

It is another aspect of the present disclosure to provide the emergency release system being noise free during use of the motor vehicle.

It is another aspect of the present disclosure to provide the emergency release system being economical in manufacture and assembly.

It is another aspect of the present disclosure to provide the emergency release system such that the latch assembly remains in compliance with government regulations.

In accordance with these and other aspects, a closure latch system for a vehicle door of a motor vehicle includes a latch mechanism including a ratchet and a pawl, the ratchet being moveable between a striker capture position and a striker release position, the pawl being moveable between a ratchet holding position whereat the pawl holds the ratchet in its striker capture position and a ratchet releasing position whereat the pawl permits the ratchet to move to its striker release position. The closure latch system further includes a power release mechanism moveable by an actuator between a home position, whereat the pawl can be moved from the ratchet holding position to the ratchet releasing position upon a single actuation of the power release mechanism, and at least one of a double pull lock position and child lock position, whereat the pawl cannot be moved from the ratchet holding position to the ratchet releasing position upon a single actuation of the power release mechanism or upon a single actuation of an inside release member. The closure latch system further includes an emergency backup mechanism configured in mechanically coupled communication with the latch mechanism, wherein mechanical actuation of the emergency backup mechanism from a non-deployed position to a deployed position causes the pawl to move from the ratchet holding position to the ratchet releasing position regardless of the position of the power release mechanism, wherein the emergency backup mechanism has a preload bias imparted thereon to prevent rattling noise while in the non-deployed position and while the motor vehicle is moving.

In accordance with another aspect, the emergency backup mechanism has a cable assembly mechanically coupled to a release lever of the latch mechanism, wherein the preload bias is imparted on the cable assembly.

In accordance with another aspect, the cable assembly can include an outer tubular cable conduit and a central cable extending along a cable axis through the outer tubular cable conduit, with the bias being imparted on the central cable.

In accordance with another aspect, the bias can be imparted as a tension force on the central cable.

In accordance with another aspect, the bias can be imparted as a constant tension force on the central cable.

In accordance with another aspect, the bias can be imparted on the central cable by a spring member.

In accordance with another aspect, the spring member can be configured to impart the bias directly on the release lever, whereupon the release lever can be configured to impart the bias on the central cable.

In accordance with another aspect, a stop member can be fixed to the central cable, wherein the bias imparted on the central cable pulls the stop member into engagement with a stop surface that is fixed against movement along the cable axis to maintain the tension on the central cable while the emergency backup mechanism is in the non-deployed position, thereby preventing the rattle and noise generation by the emergency backup mechanism while the motor vehicle is being driven.

In accordance with another aspect, a pull member can be provided at a free end of the central cable, with the stop member being between the pull member and the stop surface, wherein the pull member is configured to be pulled generally along the cable axis to move the stop member away from the stop surface and move the release lever against the bias imparted by the spring member to cause the pawl to move from the ratchet holding position to the ratchet releasing position while the emergency backup mechanism is in the deployed position, regardless of the state of the power release mechanism.

In accordance with another aspect, the stop surface can be fixed to the outer tubular cable conduit.

In accordance with another aspect, the stop surface can be provided having a circumferentially extending groove configured for fixed receipt of an edge of a panel of the vehicle door therein, thereby preventing unwanted relative movement of the stop surface along the cable axis.

In accordance with another aspect, the outer tubular cable conduit extends between opposite first and second ends, wherein the stop surface can be fixed to the first end, thereby preventing unwanted relative movement of the stop surface and the outer tubular cable conduit along the cable axis.

In accordance with another aspect, the second end of the outer tubular cable conduit can be fixed to a housing of the closure latch assembly, thereby preventing unwanted relative movement of the outer tubular cable conduit along the cable axis.

In accordance with another aspect of the disclosure, a method of constructing a closure latch system for a vehicle door is provided. The method includes a step of configuring a latch mechanism including a ratchet moveable between a striker capture position and a striker release position and a pawl moveable between a ratchet holding position, whereat the pawl holds the ratchet in the striker capture position and a ratchet releasing position whereat the pawl permits the ratchet to move to the striker release position. Further, a step of configuring a power release mechanism having a home position, a lock position, and a child lock position; and a step of configuring an inside door handle in operable communication with the power release mechanism with the inside door handle having a rest position, a first deployed position and a second deployed position. While the power release mechanism is in the home position, the pawl moves from the ratchet holding position to the ratchet releasing position under power of the power release mechanism in response to a single actuation of the inside door handle from the rest position to the first deployed position, and while the power release mechanism is in the lock position, the pawl does not move from the ratchet holding position to the ratchet releasing position under power of the power release mechanism in response to a single actuation of the inside door handle from the rest position to the first deployed position. A further step includes configuring an emergency backup mechanism in mechanically coupled communication with the latch mechanism, with the emergency backup mechanism being actuatable to move the pawl from the ratchet holding position to the ratchet releasing position without assistance from the power release mechanism while the power release mechanism is in any one of the home position and the lock position, and imparting a preload bias on the emergency backup mechanism to prevent rattling noise while in the non-deployed position and while the motor vehicle is moving.

In accordance with a further aspect of the method, a step includes In providing the emergency backup mechanism having a cable assembly mechanically coupled to a release lever of the latch mechanism, wherein the cable assembly includes an outer tubular cable conduit and a central cable extending along a cable axis through the outer tubular cable conduit, and configuring the bias being to be imparted as a tension force on the central cable.

In accordance with another aspect, the method can include configuring a spring member to impart the bias directly on the release lever and configuring the release lever to impart the bias on the central cable.

In accordance with another aspect, the method can include fixing a stop member to the central cable such that the bias imparted on the central cable pulls the stop member into engagement with a stop surface fixed against movement along the cable axis to maintain the tension on the central cable while the emergency backup mechanism is in the non-deployed position.

In accordance with another aspect, the method can include providing a pull member at a free end of the central cable, with the stop member being between the pull member and the stop surface, and configuring the pull member to be pulled generally along the cable axis to move the stop member away from the stop surface, thereby causing the release lever to be moved against the bias imparted by the spring member to move the pawl from the ratchet holding position to the ratchet releasing position while the emergency backup mechanism is in the deployed position, regardless of the state of the power release mechanism.

In accordance with another aspect, the method can include fixing the stop surface to the outer tubular cable conduit.

In accordance with another aspect, the method can include fixing the stop surface to a first end of the outer tubular cable conduit and fixing a second end of the outer tubular cable conduit to a housing of the closure latch assembly, thereby preventing relative movement of the outer tubular cable conduit along the cable axis.

In accordance with a further aspect, a method of constructing a closure latch for a vehicle door includes configuring a latch mechanism including a ratchet moveable between a striker capture position and a striker release position and a pawl moveable between a ratchet holding position, whereat the pawl holds the ratchet in the striker capture position and a ratchet releasing position whereat the pawl permits the ratchet to move to the striker release position, configuring a release lever in mechanically coupled communication with the latch mechanism, with the release lever being actuatable to move the pawl from the ratchet holding position to the ratchet releasing position in response to actuation of the release member, and imparting a preload bias on the release lever to apply a tension to the release member.

In accordance with a further aspect, a closure latch assembly for a vehicle door, including a latch mechanism including a ratchet and a pawl, the ratchet being moveable between a striker capture position and a striker release position, the pawl being moveable between a ratchet holding position whereat the pawl holds the ratchet in its striker capture position and a ratchet releasing position whereat the pawl permits the ratchet to move to its striker release position, and a release lever operably coupled with the pawl, wherein actuation of the release lever from a non-deployed position to a deployed position causes the pawl to move from the ratchet holding position to the ratchet releasing position, a release member operably coupled to the release lever, the release member for actuating the release lever, such that relative movement between the release member and the release lever is inhibited when the release member is coupled to the release lever to prevent noise during vibration of the closure latch assembly.

Further areas of applicability will become apparent from the description provided herein. As noted, the description and any specific examples in this summary are intended for purposes of illustration only and are not intended to limit the scope of the present disclosure.

BRIEF DESCRIPTION OF THE DRAWINGS

The drawings described herein have been provided to illustrate selected embodiments and specific features thereof and are not intended to limit the scope of the present disclosure. The present disclosure will now be described by way of example only with reference to the attached drawings, in which:

FIG. 3A is a rear-side isometric view showing a release mechanism and some internal components of a latch mechanism of the closure latch assembly of FIG. 2 shown in a Latched mode;

FIG. 3B is a front-side isometric view of the release mechanism and latch mechanism of FIG. 3A;

FIG. 35 is a schematic illustration showing closure latch system during a normal release condition via actuation of an inside release mechanism while in a lock OFF, child lock OFF position corresponding to FIGS. 19-21 and FIG. 33;

FIG. 35A is a schematic illustration of closure latch system of FIG. 35 showing a controller in operable communication with the inside release mechanism;

FIG. 35B illustrates a power release gear of the closure latch system of FIGS. 35 and 35A;

DETAILED DESCRIPTION OF EXAMPLE EMBODIMENTS

Figure 1:
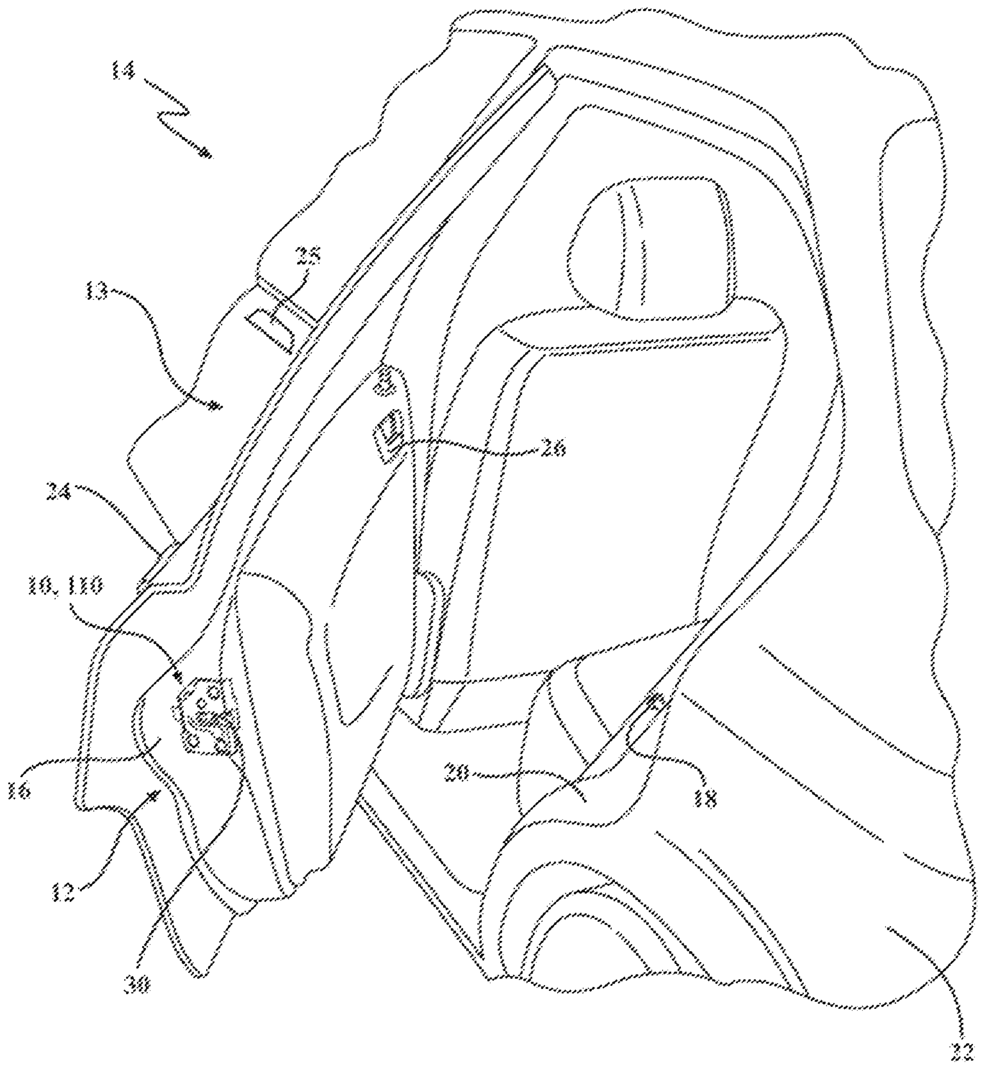
FIG. 1 is an isometric view of a motor vehicle having vehicle door equipped with a closure latch assembly constructed in accordance with multiple aspects of the disclosure.

Example embodiments of a closure latch for use in motor vehicle door closure systems are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1, a closure latch assembly, also referred to as closure latch or latch assembly 10, for a closure panel, such as a swing door, shown as a rear door 12, by way of example and without limitation, of a motor vehicle 14 is shown positioned along a shut face portion 16 of door 12 and is configured to releasably engage and capture a striker 18 secured to a vehicle body 22 to extend within a door opening 20 formed in vehicle body 22 in response to movement of door 12 from an open position to a closed position. Door 12 is shown to include an outside door handle 24 and an inside door handle 26, both of which are operatively connected (i.e., electrically and/or mechanically) to closure latch assembly 10. While not shown, it is understood that a similar closure latch assembly is provided in association with a front door 13 of vehicle 14 shown to include its own outside door handle 25.

Figure 2:
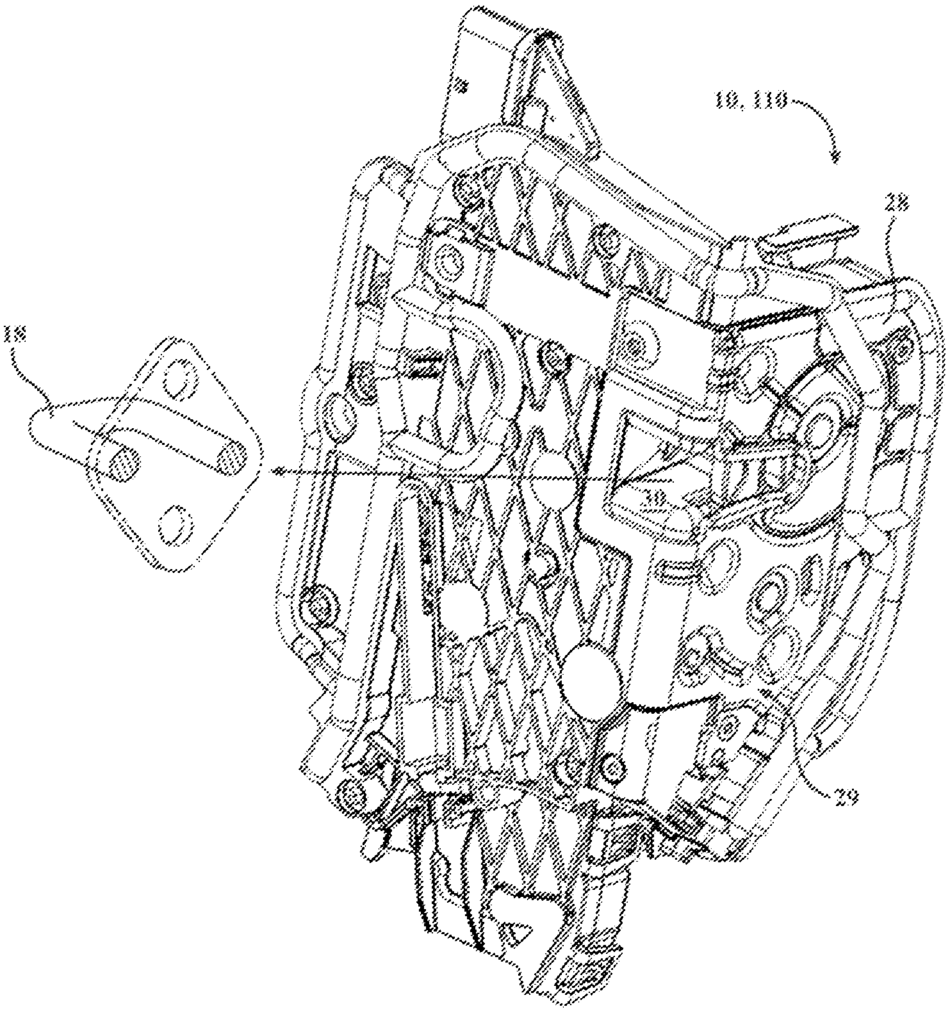
FIG. 2 is an isometric view of a closure latch assembly constructed in accordance with one aspect of the disclosure for use in the vehicle door shown in FIG. 1 shown arranged for receipt of a striker therein.
Figure 4:
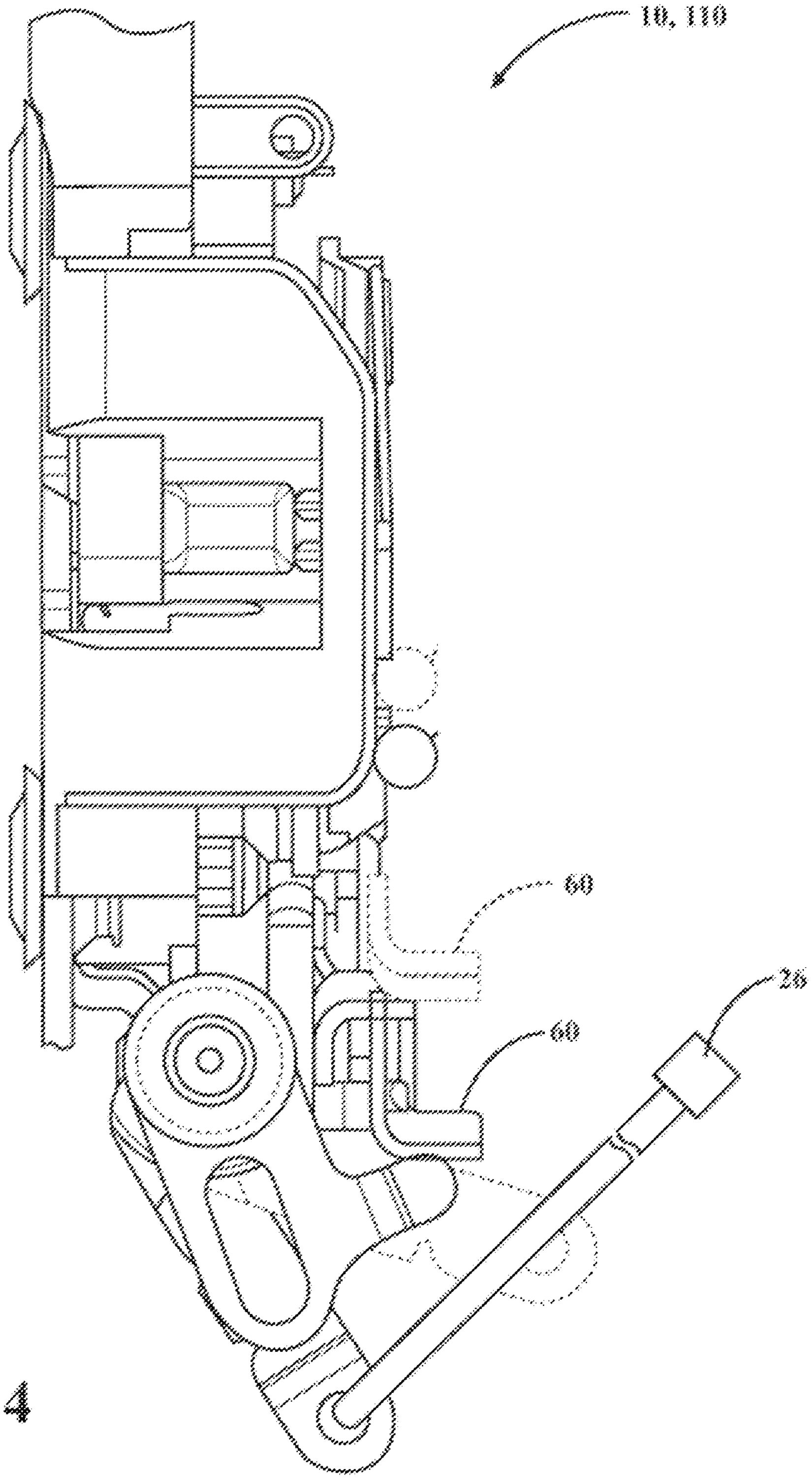
FIG. 4 is an end plan view of the closure latch assembly showing a child lock toggle moved from a deactivated position (phantom) to an activated position (solid)
Figure 5B:
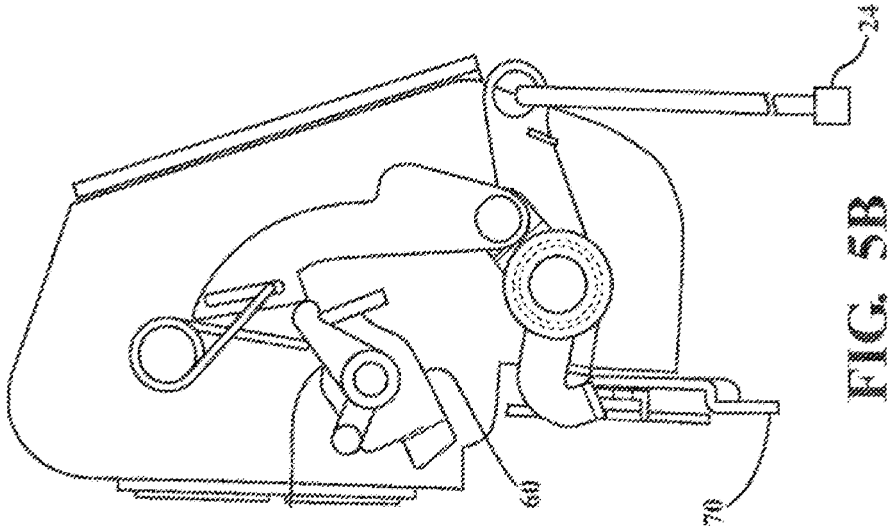
FIG. 5B is a side view of the child lock feature shown in a child lock ON position.
Figure 5A:
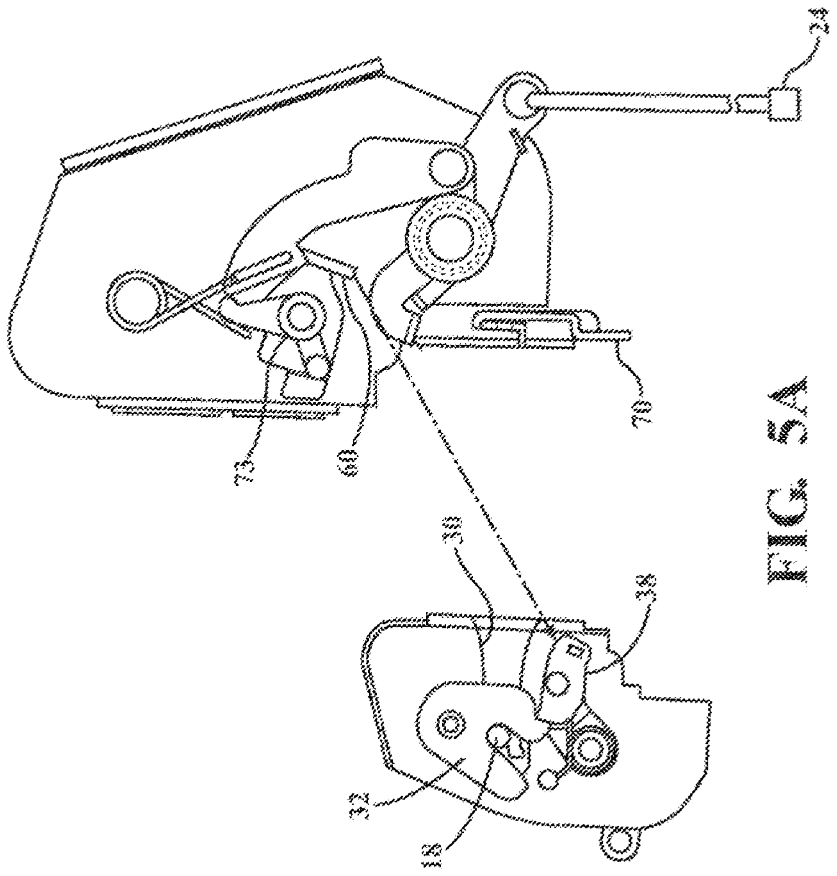
FIG. 5A is an exploded view illustrating a reaction chain connection between a child lock feature and a closure latch assembly operably connected to an inside door handle, with the child lock feature shown in a child lock OFF position.

Referring now to FIGS. 2-3B, a non-limiting example embodiment of closure latch assembly 10 and internal components thereof is shown to generally include a latch mechanism 31 and a power latch release mechanism, referred to hereafter simply as latch release mechanism 33 (FIGS. 3A and 3B). Latch mechanism 31 is shown, by way of example and without limitation, as a double pawl-double ratchet configuration, by way of example and without limitation, having a primary ratchet, also referred to as main ratchet 32, a primary pawl, also referred to as main pawl 36, a secondary ratchet, also referred to as auxiliary ratchet 38, and a secondary pawl, also referred to as auxiliary pawl 40. Primary ratchet 32 is pivotably mounted to a plate segment 28 of a latch housing 29 and has a ratchet slot 34 alignable with a fishmouth slot 30 (FIG. 2) formed in latch housing 29. Primary ratchet 32 is moveable between a primary closed or "striker capture" position whereat striker 18 is held within fishmouth slot 30 via being captured in ratchet slot 34, and an open or "striker release" position whereat striker 18 is free to be released from ratchet slot 34 and fishmouth slot 30. Primary ratchet 32 is biased by a primary ratchet biasing member, such as a primary ratchet spring 32' (FIGS. 3A and 3B) toward its striker release position. Primary pawl 36 is shown, by way of example and without limitation, pivotably supported by secondary ratchet 38 for movement between a secured, primary ratchet locking position, also referred to as "closed" position, whereat primary pawl 36 locates and holds primary ratchet 32 in its striker capture position, and an unsecured, primary ratchet release position, also referred to as "open" position, whereat primary pawl 36 is positioned to permit primary ratchet 32 to move to its striker release position, such as under a bias imparted by primary ratchet spring 32' on primary ratchet 32. A primary pawl biasing member, such as a primary pawl spring 36', is operable to normally bias primary pawl 36 toward its open position. Secondary ratchet 38 is pivotably mounted to plate segment 28 of latch housing 29 for movement between a first or "engaged" position whereat secondary ratchet 38 holds primary pawl 36 in its closed position and a second or "disengaged" position whereat secondary ratchet 38 allows primary pawl 36 to be biased to its open position. A secondary ratchet biasing member (such as a spring member, not shown) is provided for normally biasing secondary ratchet 38 toward its engaged position. Finally, secondary pawl 40 is pivotably mounted to plate segment 28 to pivot about pivot axis PA for movement between an auxiliary ratchet locking position, also referred to as first or "closed" position, whereat secondary pawl 40 holds secondary ratchet 38 in its engaged position, and an auxiliary ratchet release position, also referred to as a second or "open" position, whereat secondary pawl 40 is positioned to permit secondary ratchet 38 to move to its disengaged position. A secondary pawl biasing member, such as a secondary pawl spring (not shown) is provided for normally biasing secondary pawl 40 toward its closed into engagement, or into a blocking position, with auxiliary ratchet 38.

Latch release mechanism 33 is best shown in FIGS. 3A and 3B to include a powered actuator, shown as a single electric motor 41, shown as including a motor shaft with a worm gear WG fixed thereto, and a power release gear 43 driven by worm gear WG of electric motor 41 which functions to drive an actuator release lever, also referred to as actuator lever 58 via engagement of a cam member 44 fixed to power release gear 43 with a first end region 46 of actuator lever 58, which in turn functions to drive a latch release lever, also referred to as release lever, and shown by way of example and without limitation as an auxiliary pawl release lever 60, via engagement of a second end region 48 of actuator lever 58 with auxiliary pawl release lever 60, which in turn moves secondary pawl 40 from its closed position to its open position to provide a power releasing function of latch mechanism 31.

Figure 6:
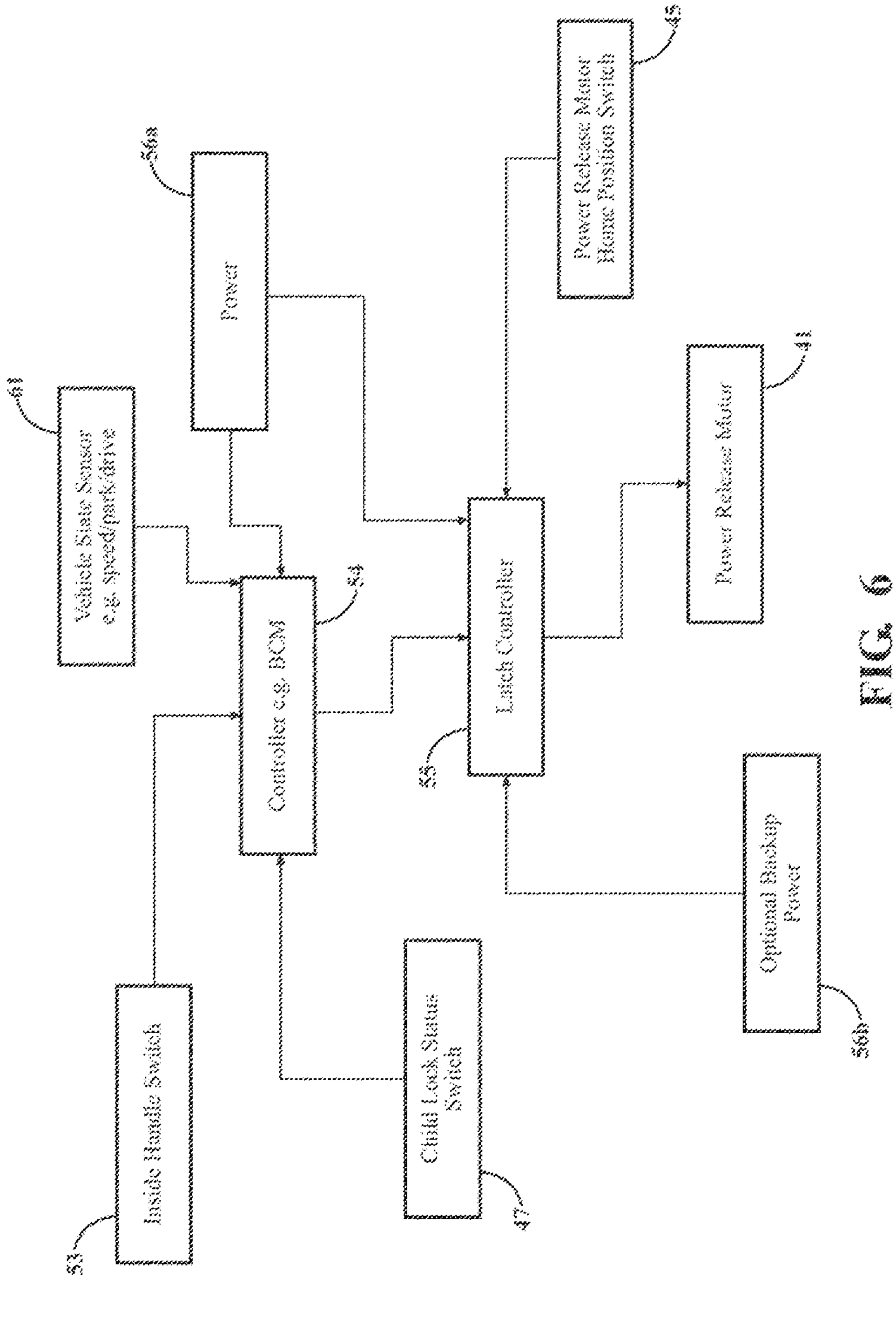
FIG. 6 is a flow diagram illustrating a closure latch system in accordance with one aspect of the disclosure.
Figure 7:
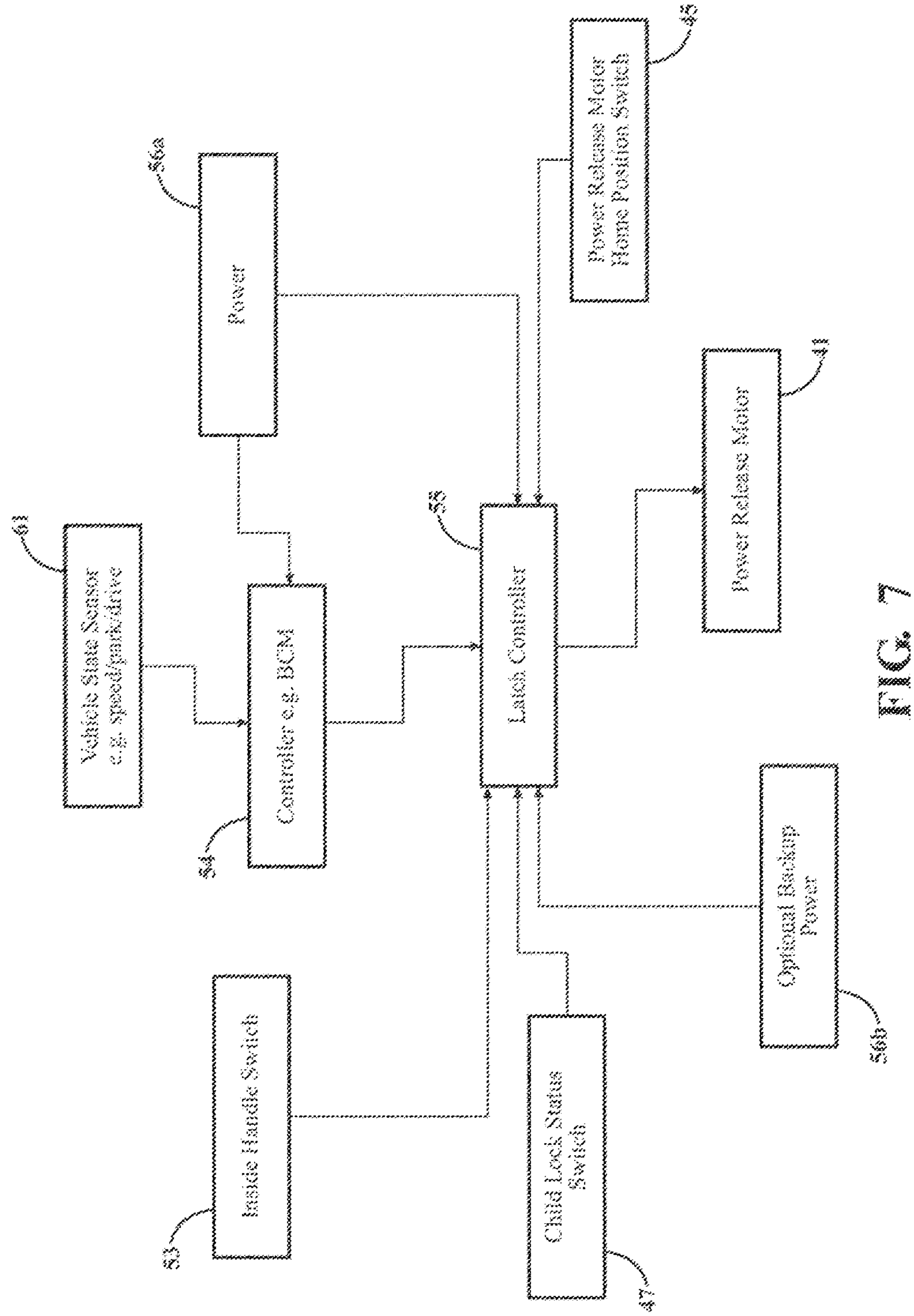
FIG. 7 is a flow diagram illustrating a closure latch system in accordance with another aspect of the disclosure.
Figure 10:
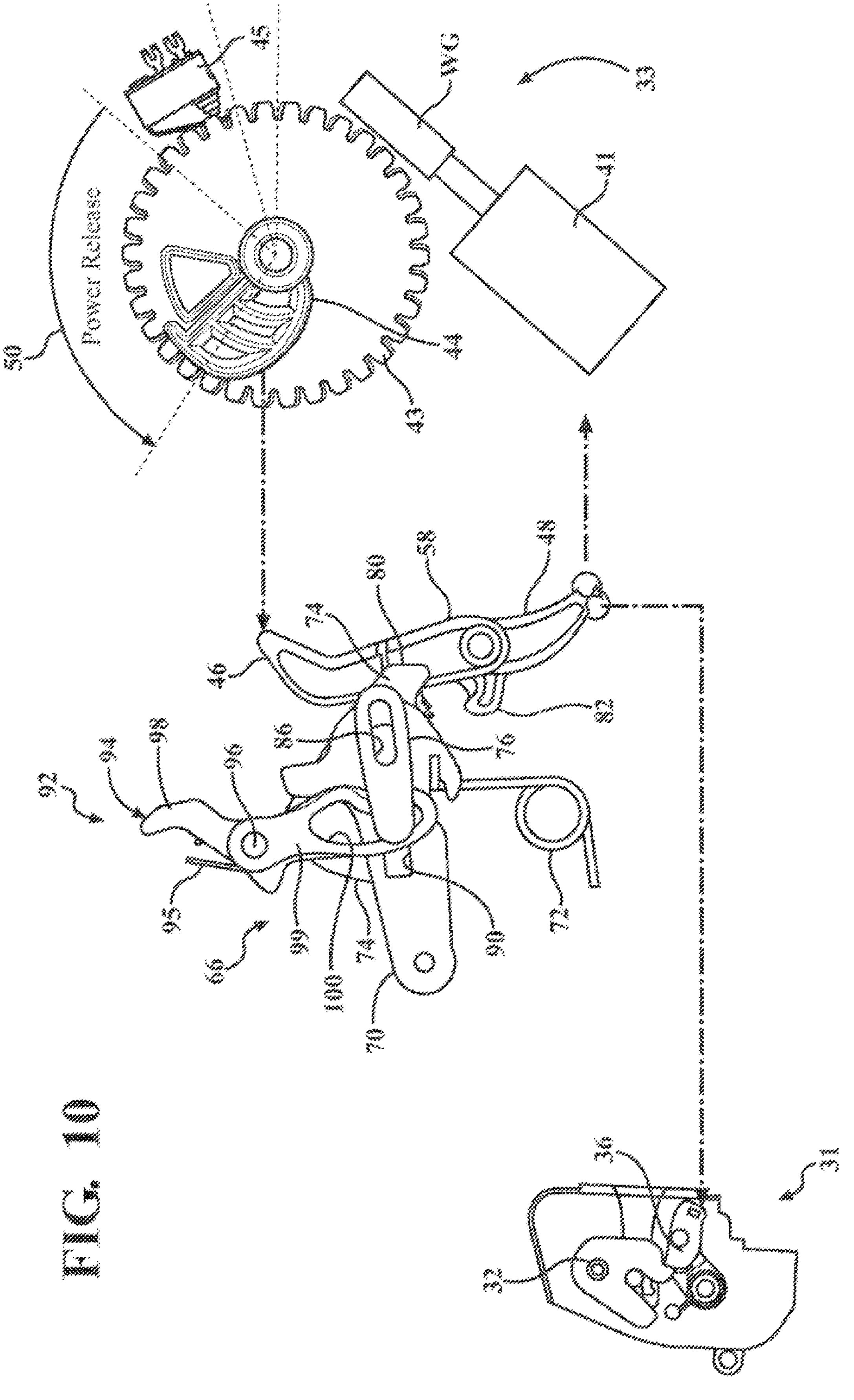
Figure 11:
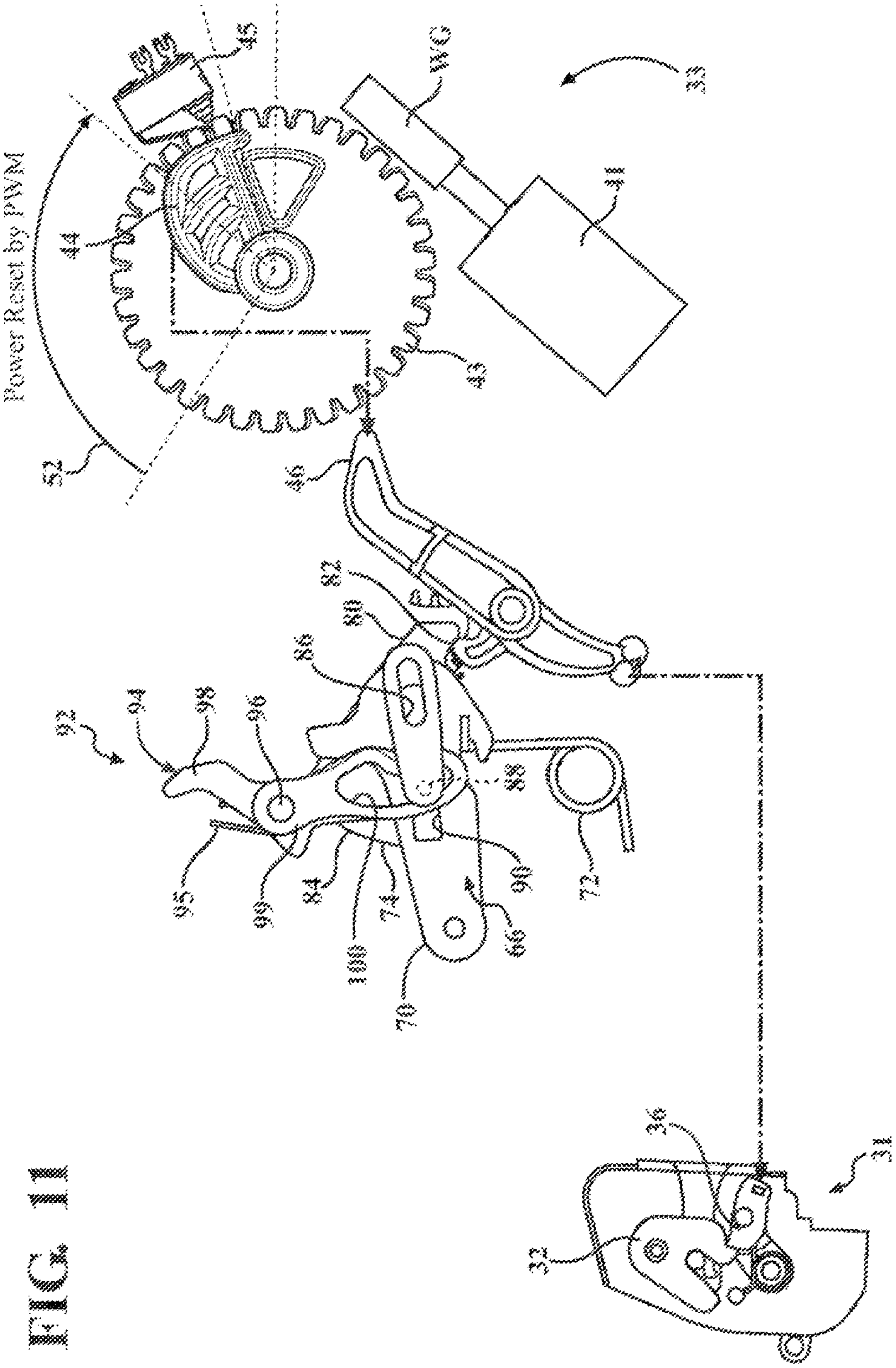

Rotation of power release gear 43 in a first or "releasing" direction 50 (FIG. 10) results in release of latch mechanism 31 via primary pawl 36 being moved to its ratchet releasing position and primary ratchet 32 being allowed to move to its striker releasing position, and rotation in an opposite or "resetting" direction 52 (FIG. 11) results in resetting of latch mechanism 31. The actuator release lever 58 is in direct or operable (chain connection) engagement with the auxiliary pawl release lever 60 while the auxiliary pawl release lever 60 is in a rest position and is moveable by the actuator 41 to move the auxiliary pawl release lever 60 to an engaged position. As is well known, a key fob or actuation of an inside handle switch 53 in operable communication with door handle 24, 25 on door 12, 13 can provide a signal to an electronic control unit (ECU) associated with closure latch assembly 10, such as shown via a controller in the form of a body control module (BCM) 54 and/or a latch controller 55 in FIG. 6, indicating a request to release latch mechanism 31. Accordingly, the ECU and/or latch controller 54, 55 controls operation of motor 41 to rotate power release gear 43. Any suitable main and backup power source 56*a*, 56*b* may be provided for operable communication with ECU and/or latch controller 54, 55. Also shown in FIG. 6 is a child lock status switch 47 and power release motor home position switch 45 configured in operable communication with latch controller 55, and a vehicle state sensor 61 configured in operable communication with ECU 54, by way of example and without limitation. In another embodiment, shown in FIG. 7, the inside handle switch 53 and the child lock status switch 47 are shown configured in operable communication with latch controller 55, otherwise, the embodiment of FIG. 7 is the same as shown for FIG. 6.

Auxiliary pawl release lever 60 is coupled with the auxiliary pawl 40, and as shown illustratively in FIGS. 3A and 3B, is biased into direct engagement with auxiliary pawl 40 via counteracting biasing members, represented by arrow H acting on auxiliary pawl 40 (FIG. 3A), and auxiliary pawl release lever 60 is coupled with the auxiliary ratchet 38, and is shown as being biased into direct engagement with auxiliary ratchet 38 via counteracting biasing members, represented by arrow "I" acting on auxiliary pawl release lever 60 (FIG. 3A). Auxiliary pawl release lever 60 is further biased in addition to spring member I by the engagement of the actuator release lever 58 under bias indicated by arrow "J" shown in FIG. 3A of actuator release lever bias spring 59. Auxiliary pawl release lever 60 is moveable between a rest position, whereat the auxiliary pawl 40 is located in its closed position and the primary pawl 36 is located in its closed position, and a fully engaged position, whereat the auxiliary pawl 40 is moved to its open position and the primary pawl 36 is moved to its open position.

Auxiliary ratchet 38 is operably coupled to the primary pawl 36, wherein primary pawl 36 is shown retained for pivotal movement in a cylindrical pocket 62 of auxiliary ratchet 38. Auxiliary ratchet 38 is moveable between its engaged position, whereat the auxiliary ratchet 38 maintains the primary pawl 36 in its closed position, and its disengaged position, whereat the auxiliary ratchet 38 moves the primary pawl 36 to its open position, as discussed above. Auxiliary ratchet 38 is moved to its disengaged position against bias of spring bias, the auxiliary pawl 40 is forcibly moved to its open position against the spring bias under the driving influence of auxiliary pawl release lever 60 and actuator release lever 58, that is due to the driving influence of actuator release lever 58 moved against spring bias J and acting on auxiliary pawl release lever 60 when power release gear 43 is rotated in the release direction 50 to a release position.

The single motor 41, in association with a release chain 64 and a double pull mechanism 66 having a single pull state and a double pull state, operates to perform a select one of: power release the latch assembly 10, put the latch mechanism 31 of latch assembly 10 in a single pull state, and put the latch mechanism 31 of latch assembly 10 in a double pull state. Operation and logic flow of the closure latch assembly 10 is shown in 8-15, and discussed in more detail hereafter.

The release chain 64 includes latch mechanism 31, including actuator release lever 58 and auxiliary pawl release lever 60. It is to be understood that latch mechanism 31 is illustrated and described having a double pawl/double ratchet mechanism; however, a single pawl/single ratchet mechanism is contemplated herein. The single motor 41 is actuatable to move the double pull mechanism 66 to one of its single pull state and double pull state, wherein activation of the single motor 41 operates to perform a select one of: power release the latch assembly 10 via release chain 64, put the double pull mechanism 66 of latch assembly 10 in the single pull state, and put the double pull mechanism 66 of latch assembly 10 in the double pull state.

Figure 8:
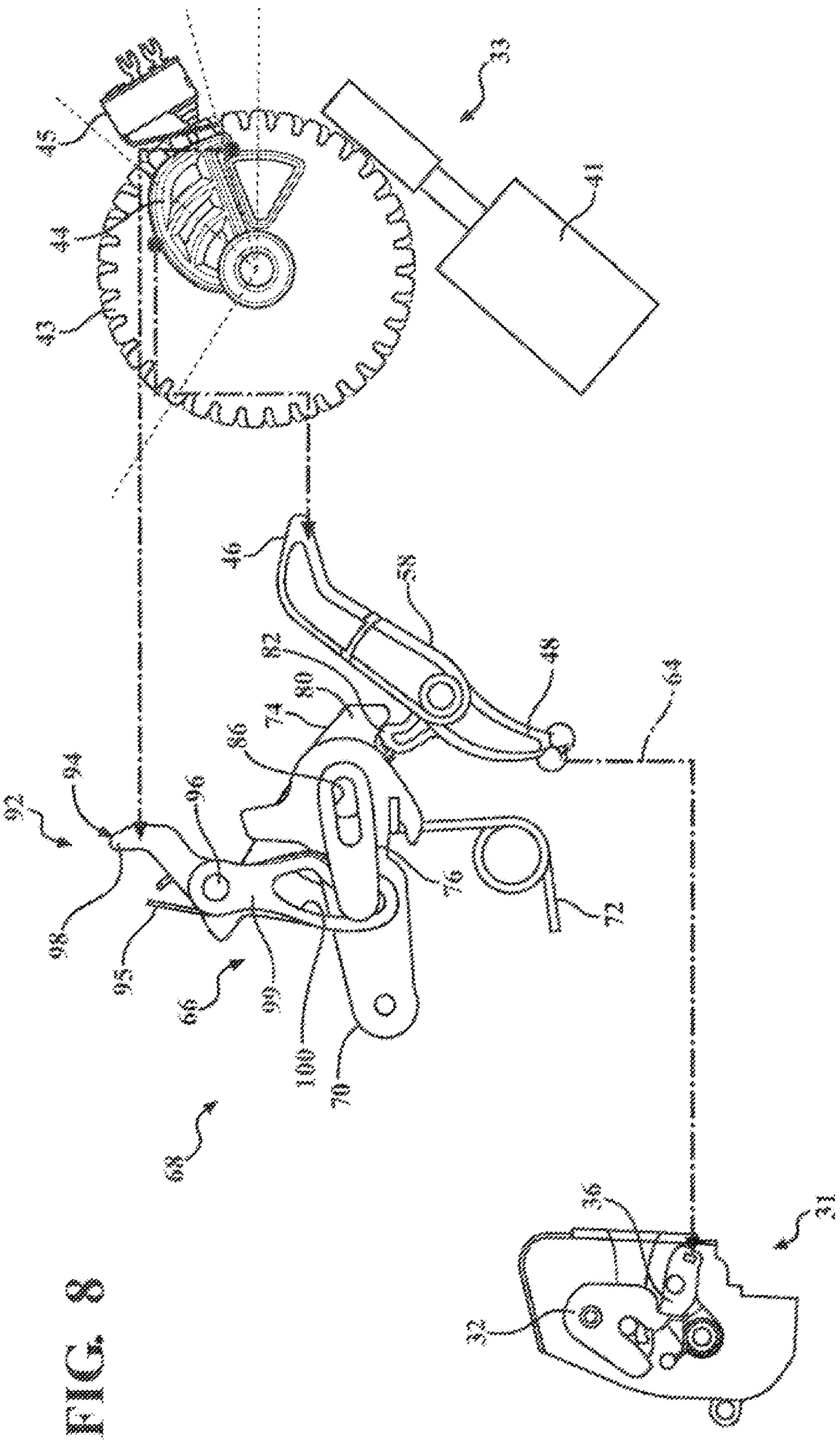
FIGS. 8-15 illustrate aspects and operation of the closure latch assembly and closure latch system therewith in accordance with various aspects of the disclosure.
Figure 12:
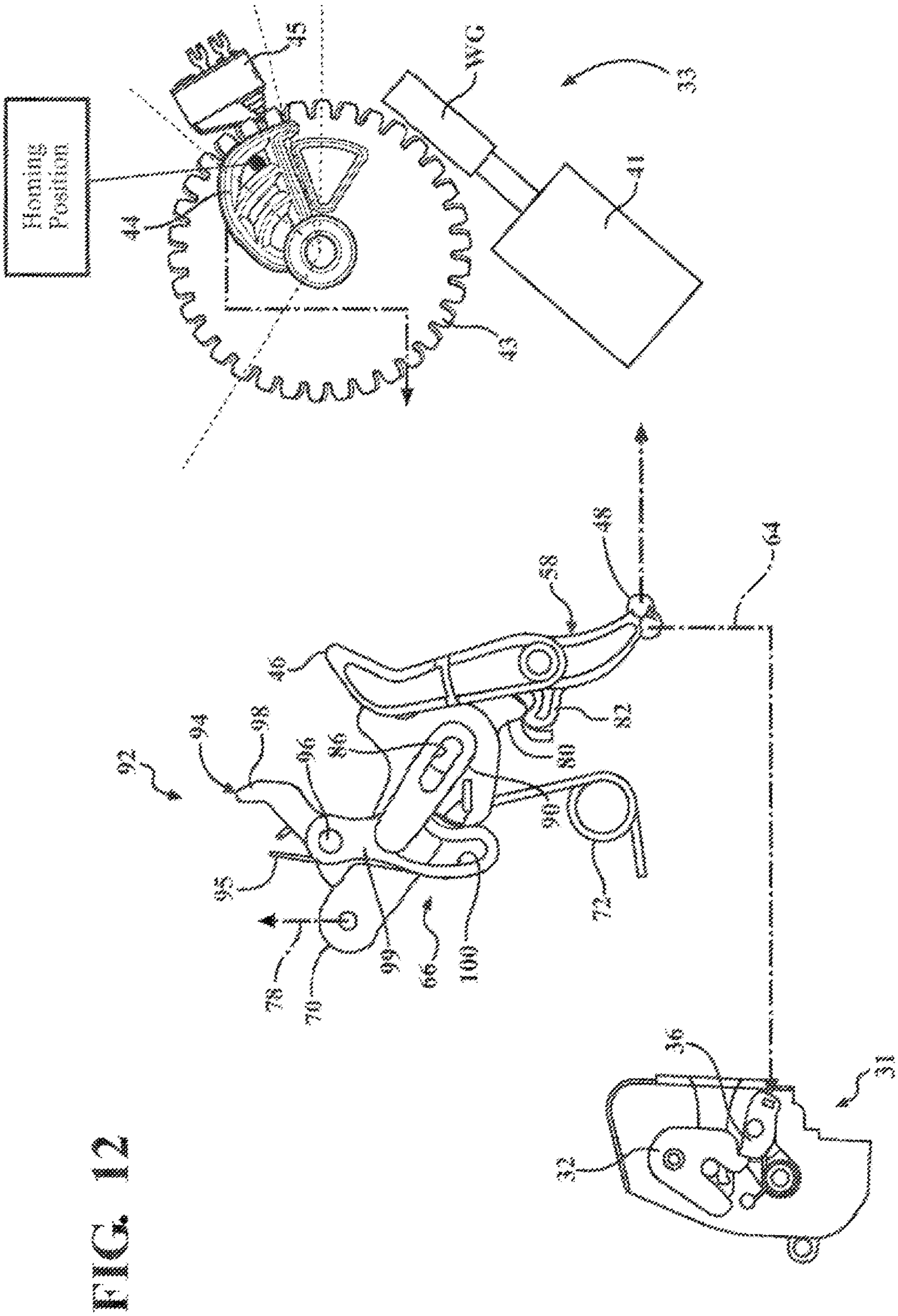

FIG. 8 is a non-limiting embodiment of an inside release mechanism 68 that is operatively associated with power latch release mechanism 33 for use with closure latch assembly 10. Inside release mechanism 68 is shown to include an inside release lever 70 that is pivotably moveable between a first or "home" position (shown) and a second or "actuated" position (FIG. 12), an inside release lever spring 72 operable to normally bias inside release lever 70 to its home position, an auxiliary release lever 74 (FIGS. 10 and 11) and a link lever 76. Inside release lever 70 is mechanically connected via a suitable coupling mechanism 78 (FIG. 12) to inside door handle 26. Inside release lever 70 is supported for pivotal movement relative to a post (not shown) between a first or "home" position and a second or "actuator lever release" position. Auxiliary release lever 74 is biased toward its home position via actuator lever spring acting thereon. Auxiliary release lever 74 is formed to include an actuation lug 80 that is engageable with a release lug 82 formed on actuator release lever 58, and a slotted portion defining a bypass cavity (hidden) and a drive lug 84. Link lever 76 includes an elongated slot 86 and a guide post 88 that is retained for sliding movement within a drive slot 90 formed in inside release lever 70. Guide post 88 on link lever 76 is aligned with bypass cavity (not shown) in auxiliary release lever 74 when link lever 76 is located in a first or "disengaged/retracted" position. In contrast, guide post 88 is aligned with drive lug 84 on auxiliary release lever 74 when link lever 76 is located in a second or "engaged/extended" position. As will be detailed, movement of inside release lever 70 between its home and actuated positions, in cooperation with movement of link lever 76 between its disengaged and engaged positions, controls selective pivotal movement of auxiliary release lever 74 between its home position and its actuator lever release position.

A double pull actuation mechanism 92 is arranged in operative association with inside release mechanism 68 for use with closure latch assembly 10. Double pull actuation mechanism 92 is shown to generally include a double pull lever 94, and a double pull lever spring 95. Double pull lever 94 is pivotably moveable about a pivot post 96 between a first or "double pull-ON" position and a second or "double pull-OFF" position. Double pull lever spring 95 acts on double pull lever 94 and normally biases double pull lever 94 toward its double pull-OFF position. Double pull lever 94 includes a first leg segment 98 and a second leg segment 99, with the second leg segment 99 having a contoured drive slot 100. As seen, second leg segment 99 is disposed between link lever 76 and inside release lever 70 such that guide post 88 on link lever 76 passes through drive slot 100 in double pull lever 94 and drive slot 90 in inside release lever 70.

Figure 9:
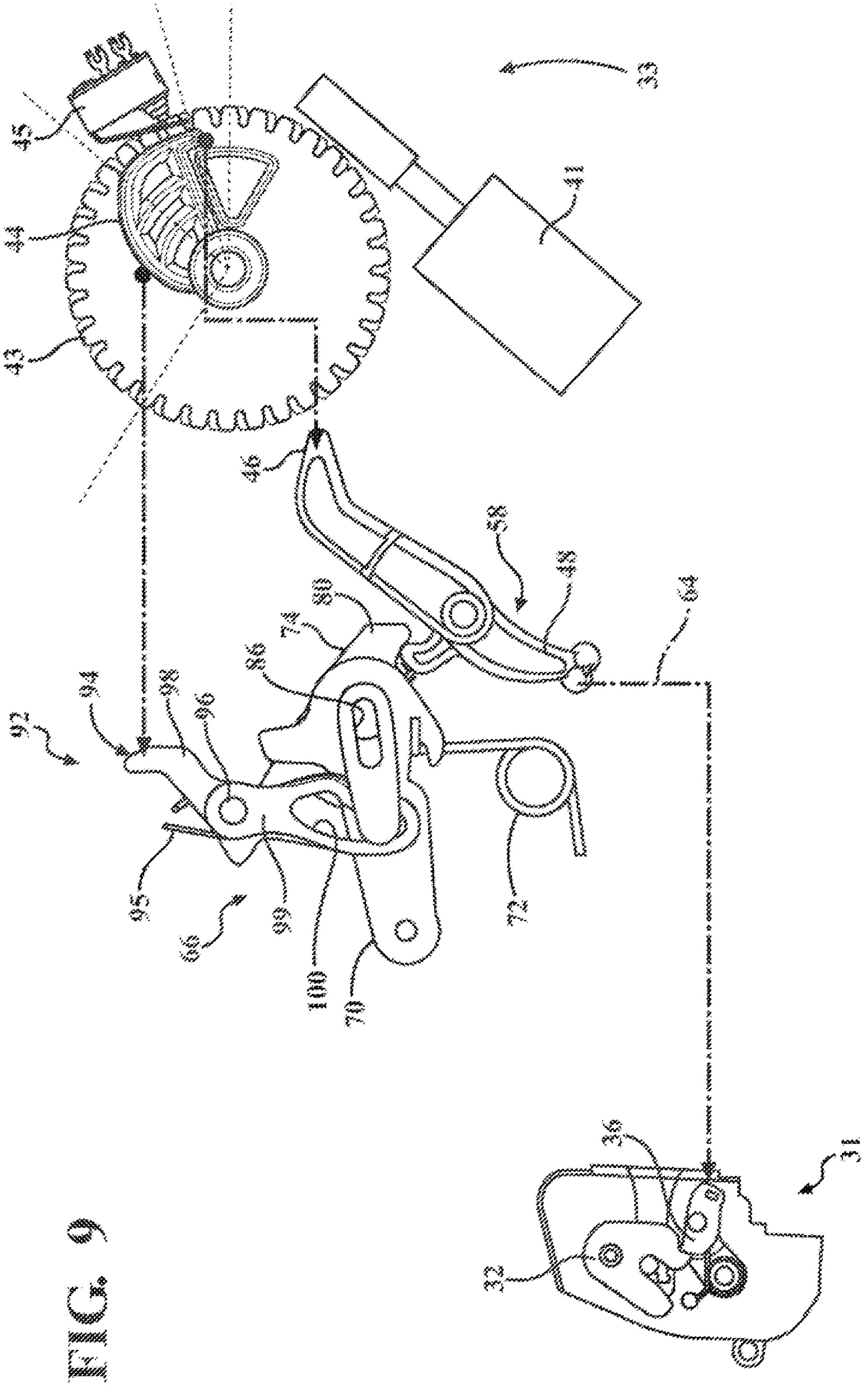
Figure 13:
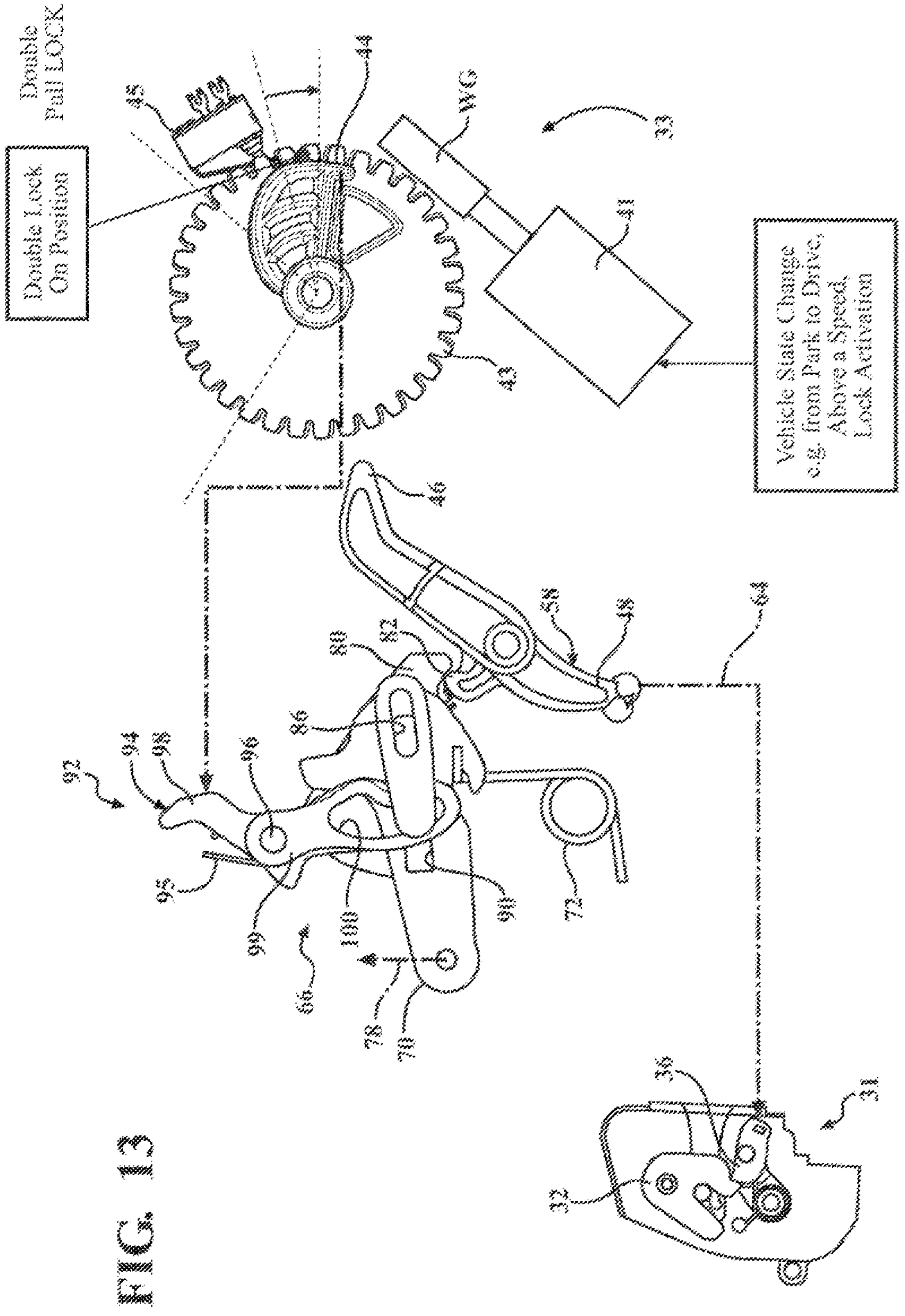

Power release mechanism 33 and power release gear 43 thereof is moveable by the single actuator 41 between a home position (FIG. 9), whereat power release gear 43 can be sensed via a home position sensor/switch, also referred to as first sensor 45, such that a switch that can be triggered by cam member 44, by way of example and without limitation, when power release gear 43 is in its home position, whereat the pawl 36 can be moved from the ratchet holding position to the ratchet releasing position upon a single actuation of the power release mechanism 33 or upon a single actuation of an inside handle 26, and a double pull lock position, also referred to as double pull or double lock position (FIG. 13), whereat the pawl 36 cannot be moved from the ratchet holding position to the ratchet releasing position upon a single actuation of the power release mechanism 33 or upon a single actuation of an inside handle 26. While the power release mechanism 33 is in the double pull lock position, the pawl 36 can only be moved from the ratchet holding position to the ratchet releasing position upon performing a double actuation of the power release mechanism 33, wherein the power release mechanism 33 moves directly from the double pull lock position to the release position upon performing the double actuation of the power release mechanism 33, or upon performing a double actuation of the inside handle 26, otherwise, the pawl 36 will remain in its ratchet holding position.

In accordance with another aspect of the disclosure, a closure latch assembly 110 and closure latch system 110' therefor is shown in FIGS. 16-30, wherein the same reference numerals, offset by a factor of 100 in some instances, are used to identify like features.

Figure 16:
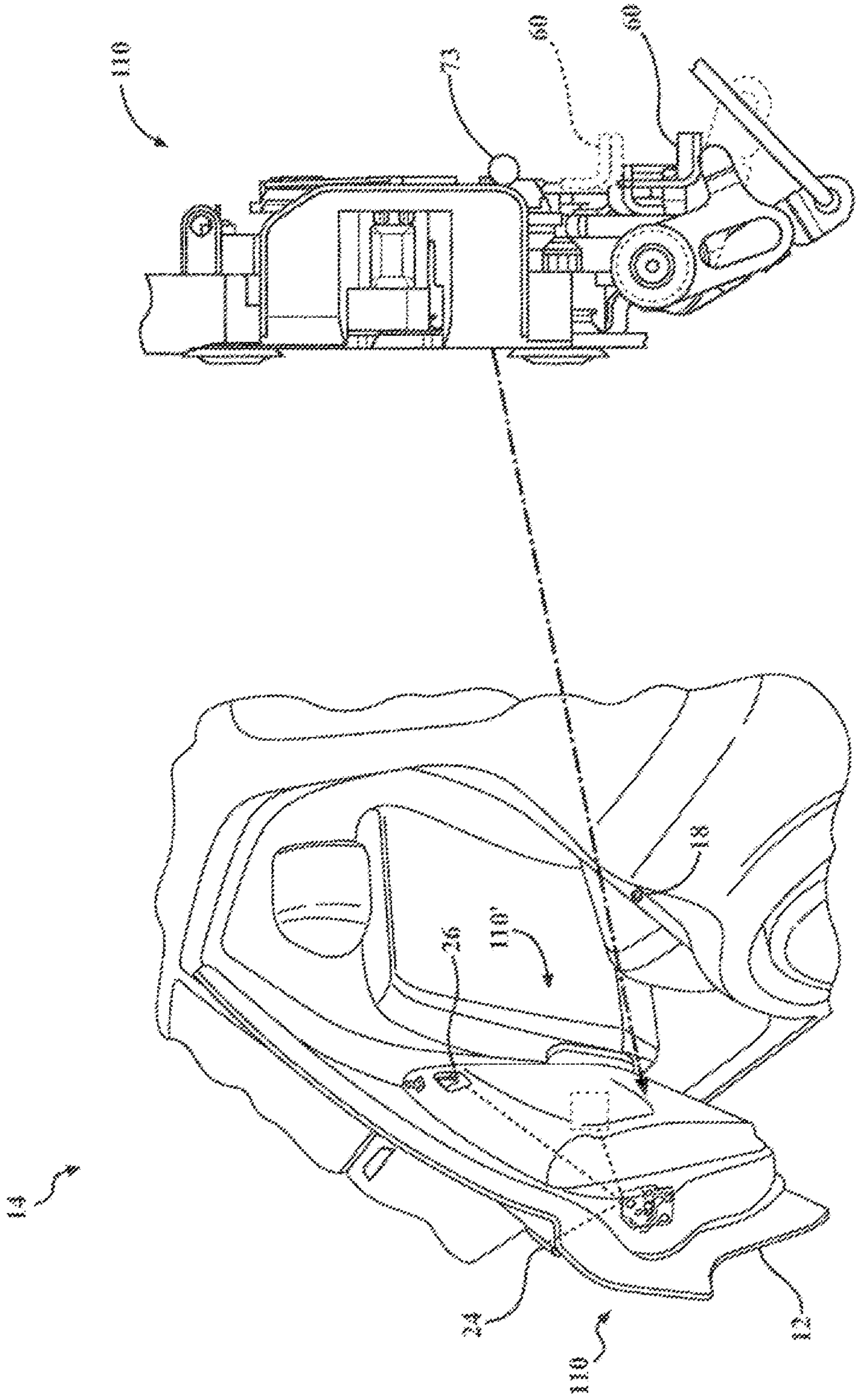
FIGS. 16-26 illustrate further aspects and operation of a closure latch assembly and closure latch system therewith in accordance with additional aspects of the disclosure.
Figure 17:
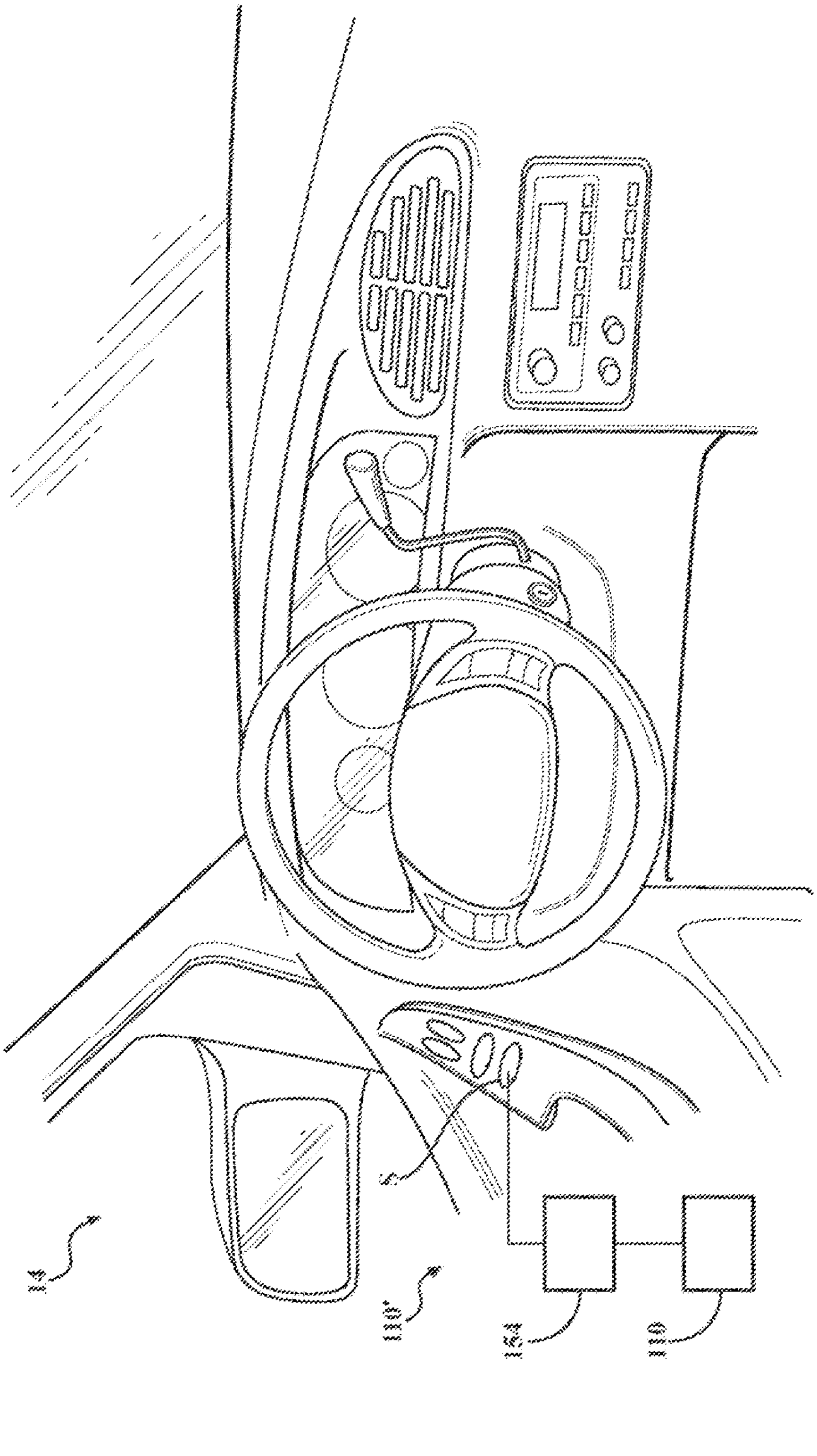
Figure 18:
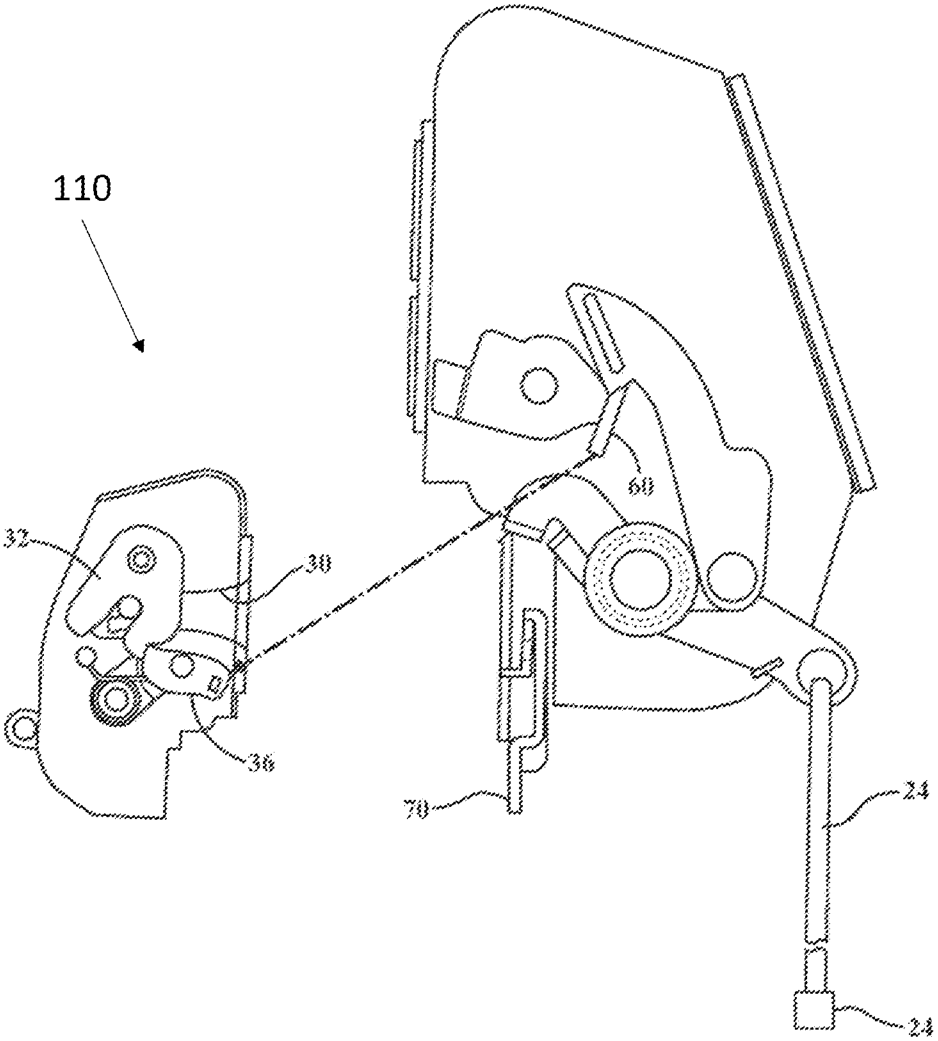
Figure 19:
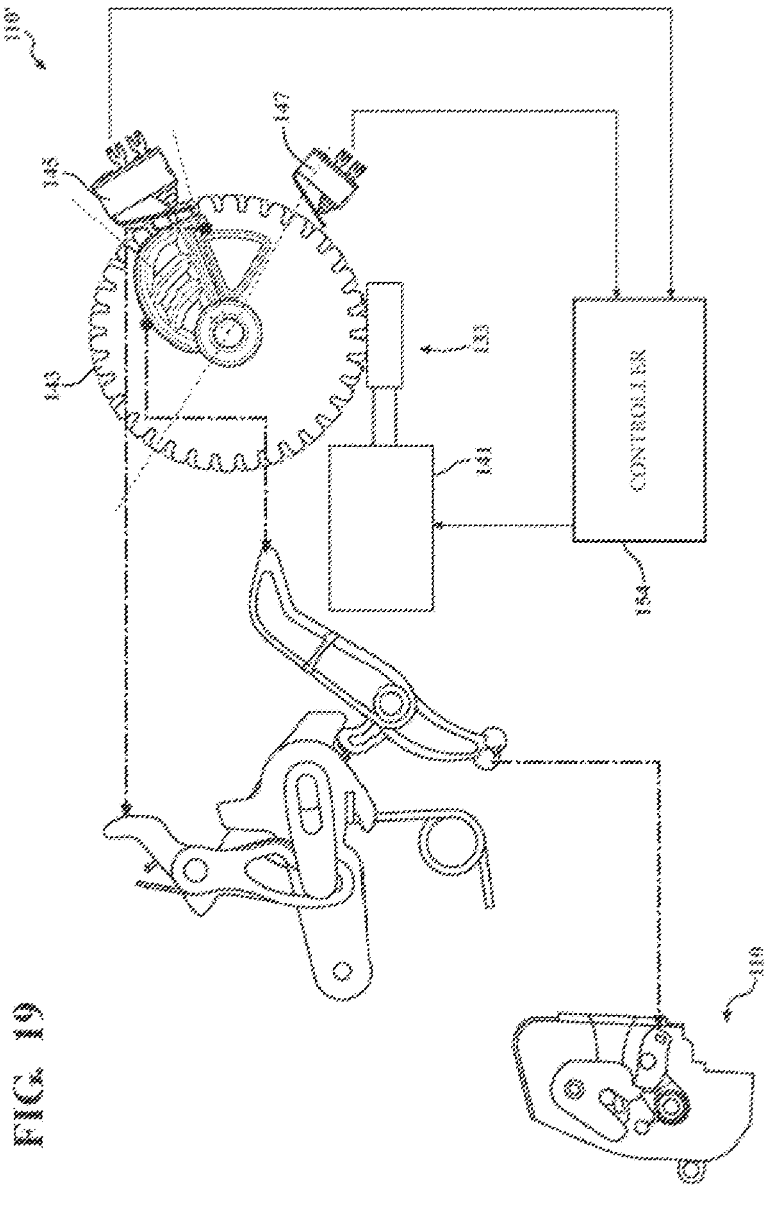
Figure 20:
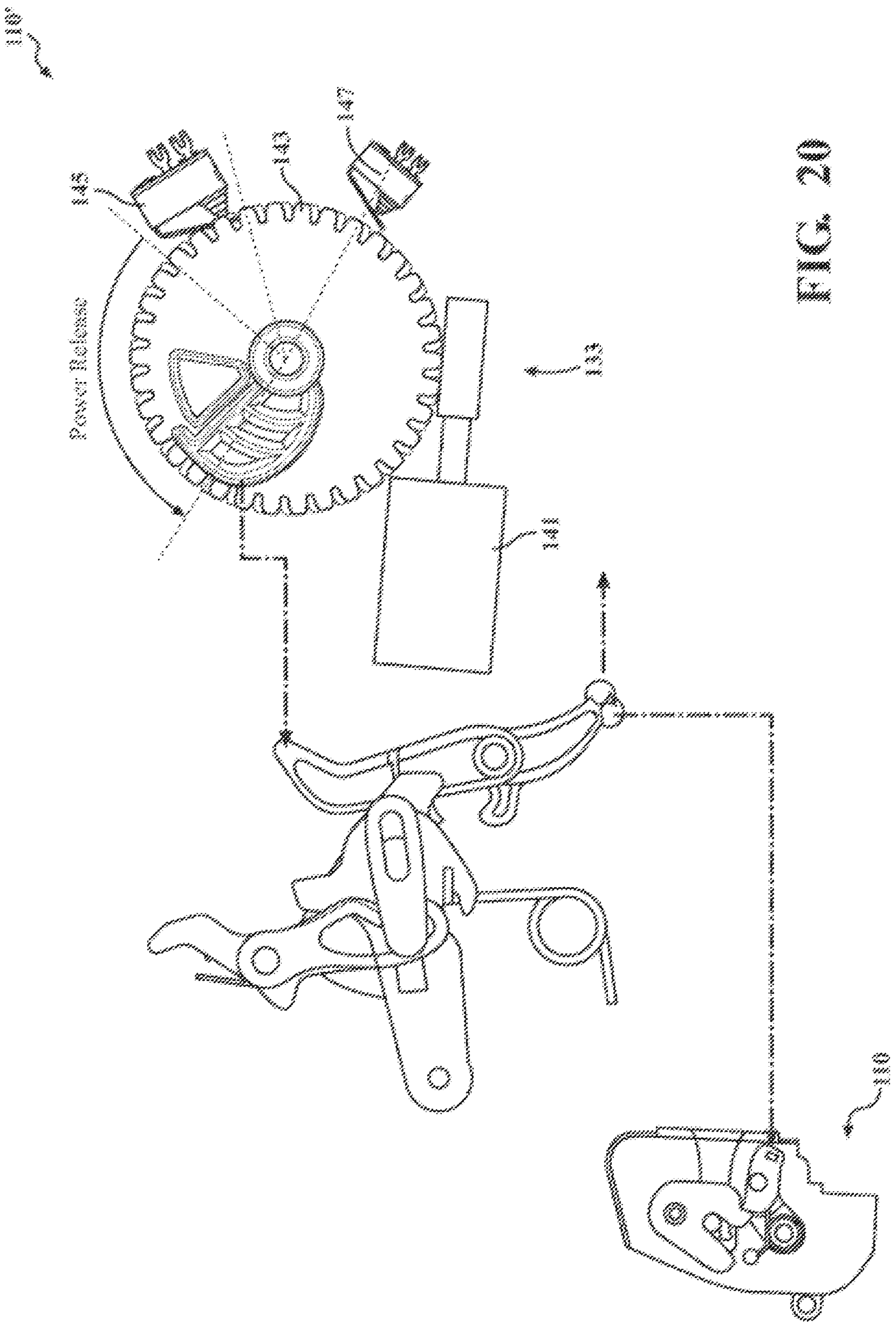
Figure 21:
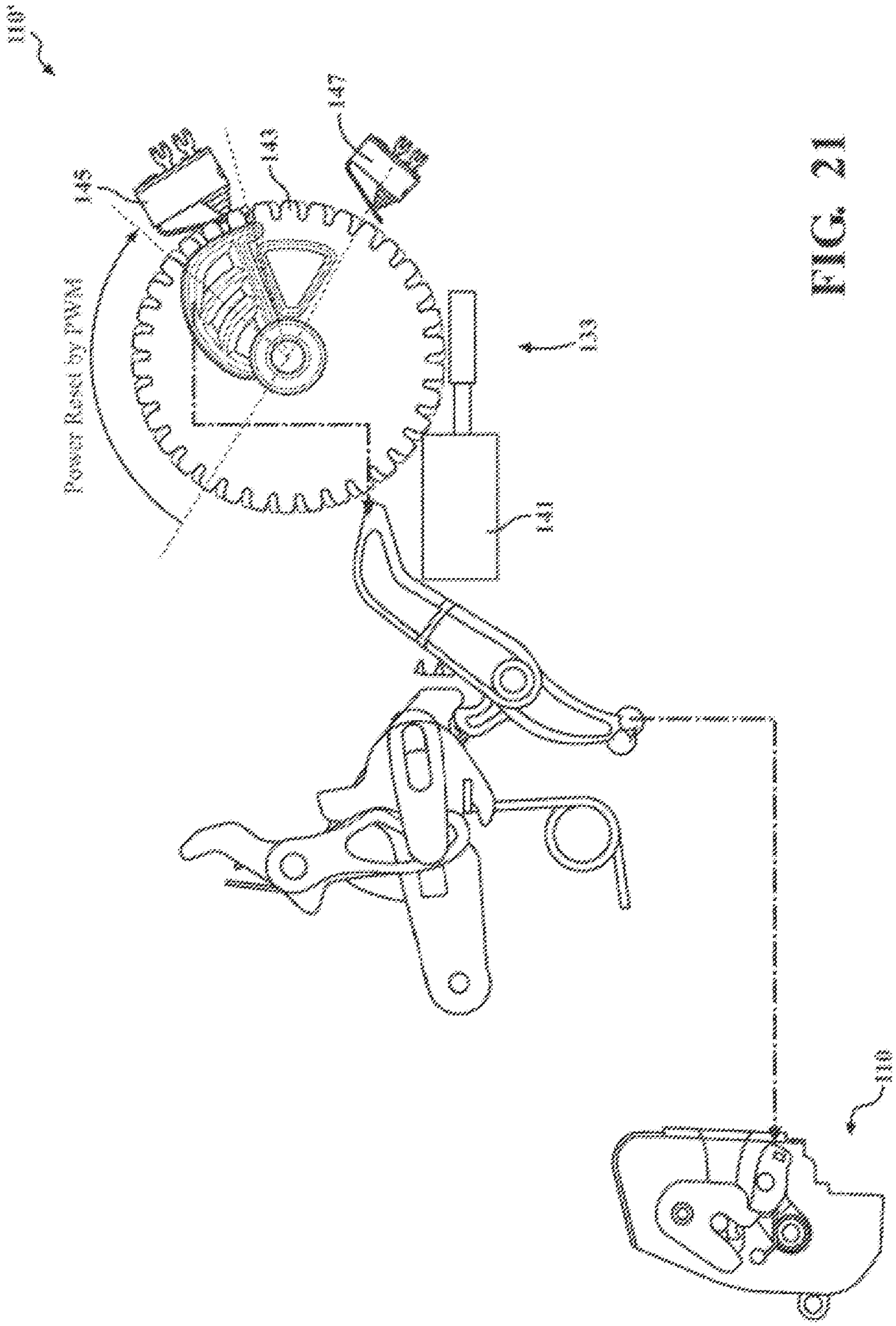
Figure 22:
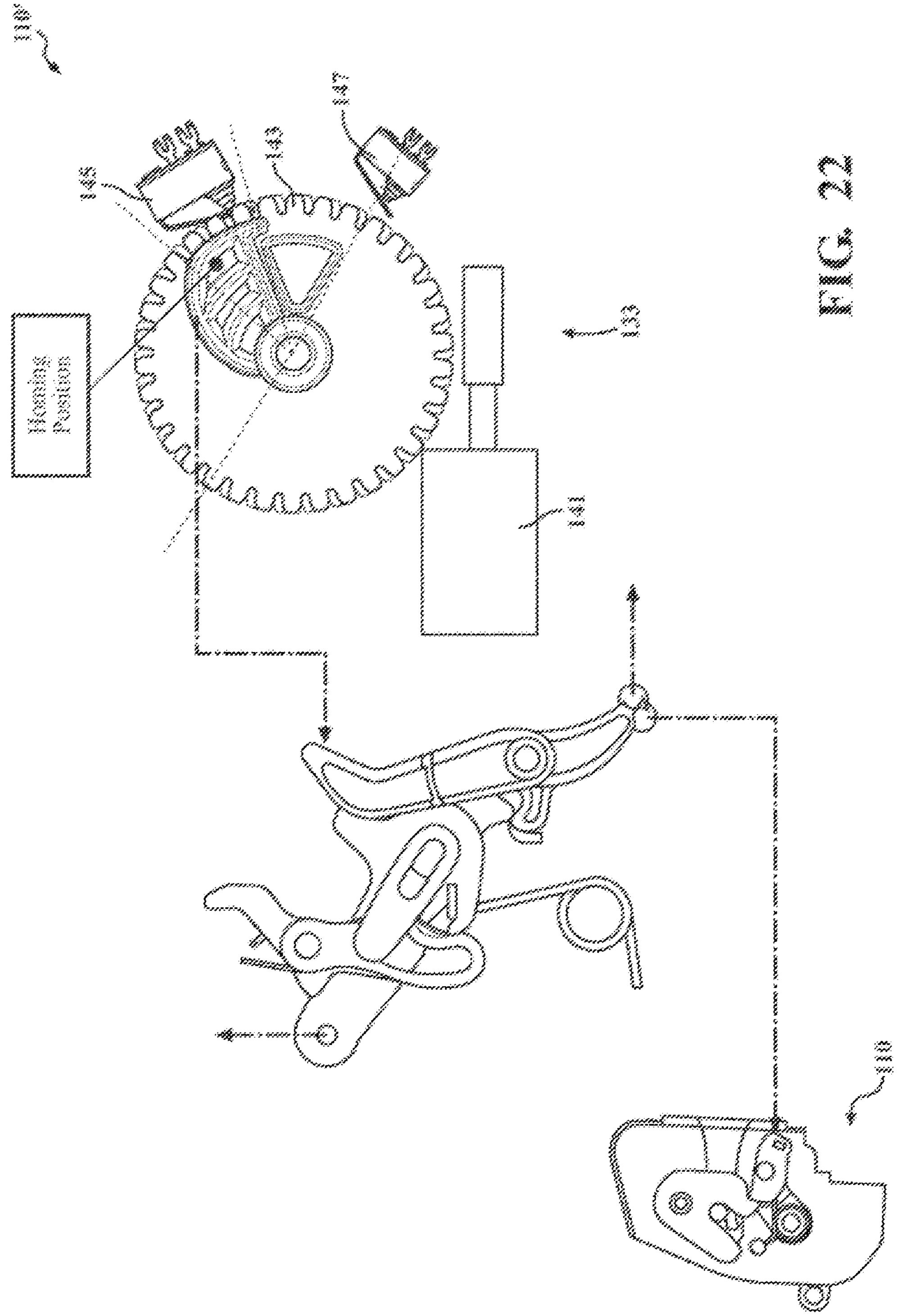
Figure 23:
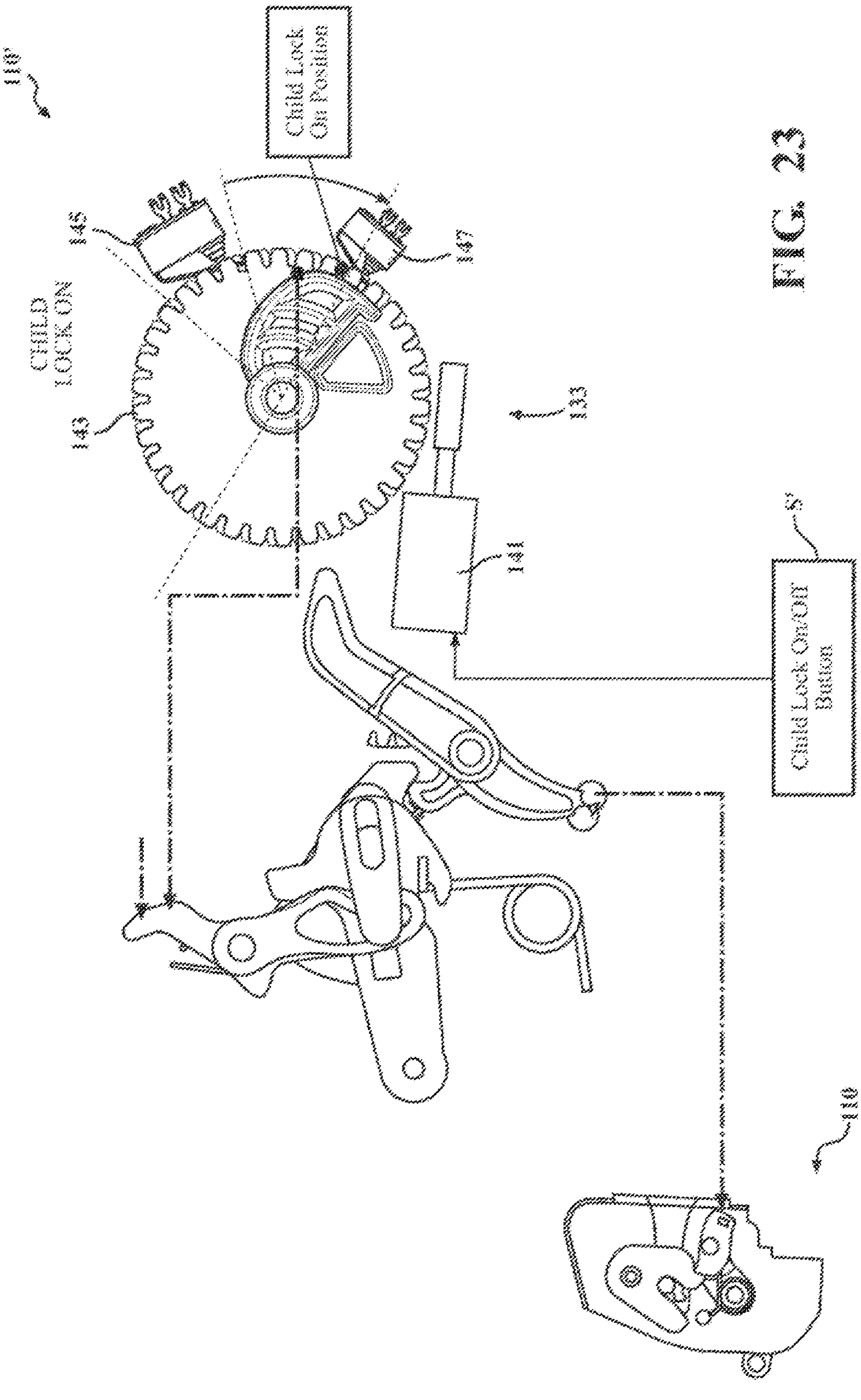
Figure 24:
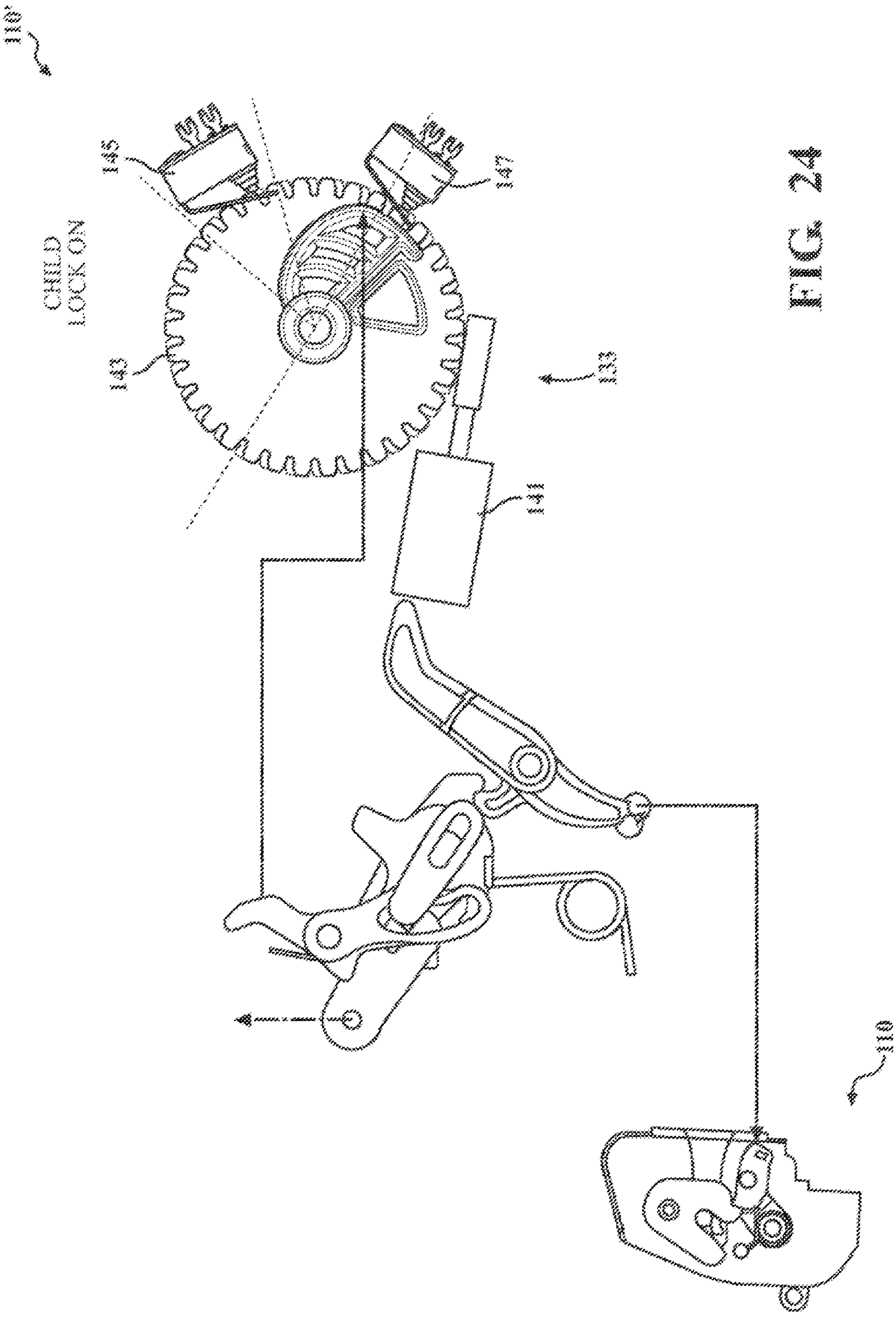
Figure 29:
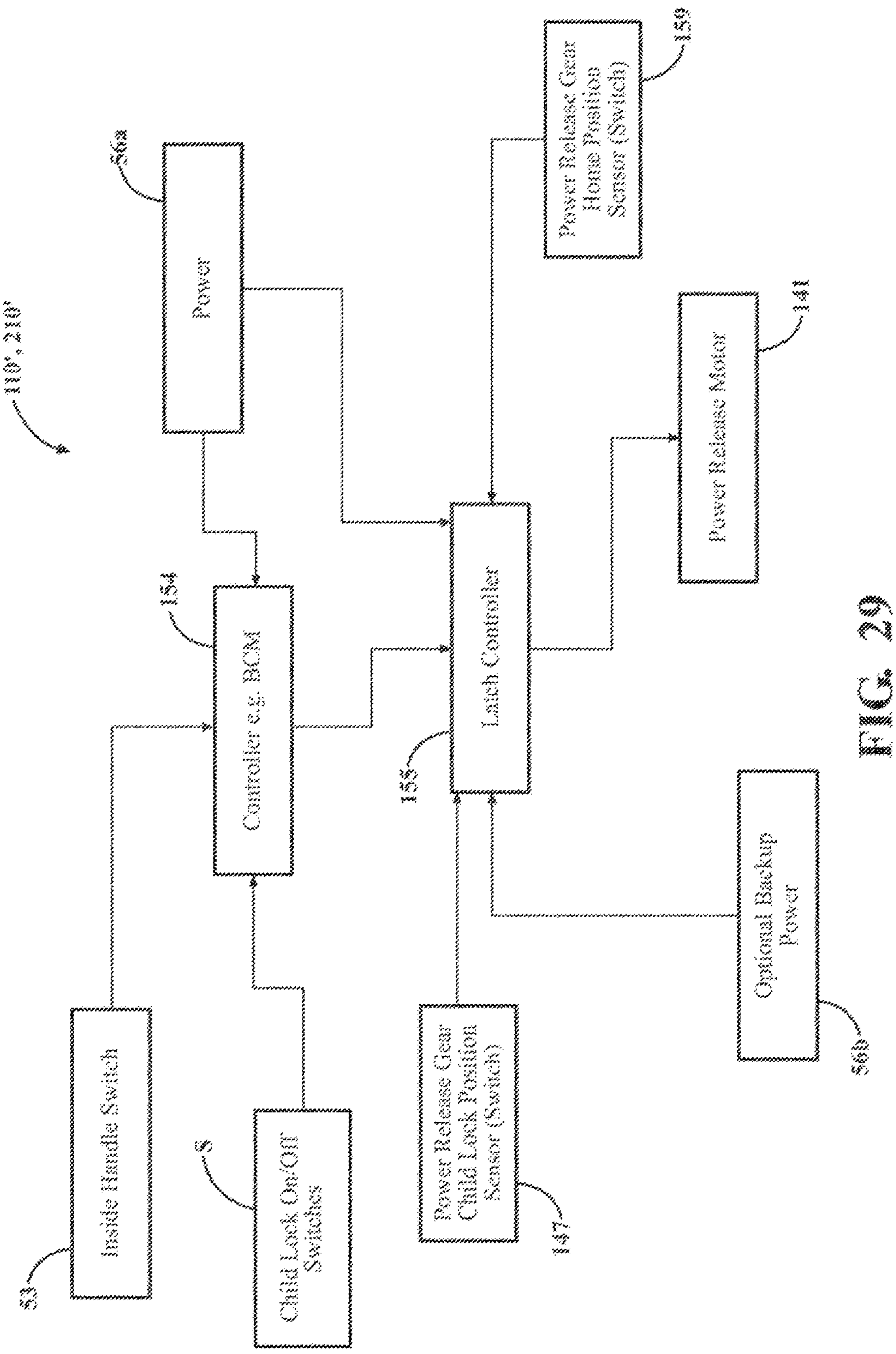
FIG. 29 is a flow diagram illustrating a closure latch system in accordance with a further aspect of the disclosure.
Figure 30:
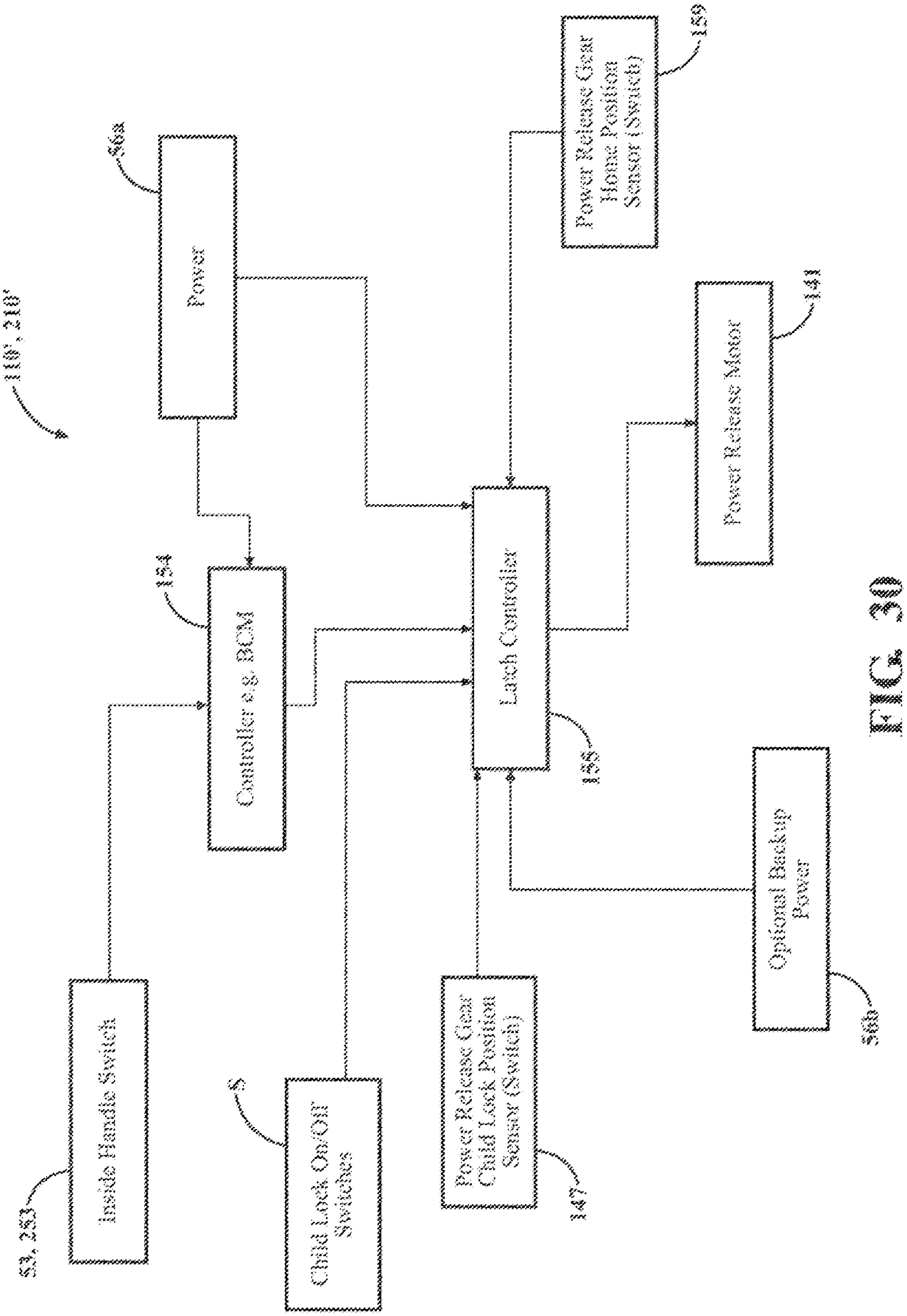
FIG. 30 is a flow diagram illustrating a closure latch system in accordance with yet another aspect of the disclosure.

Closure latch system 110' and closure latch assembly 110 thereof is shown in FIG. 16 as being configured for use on rear passenger door 12 of vehicle 14, by way of example and without limitation. Closure latch system 110' includes a power-actuated child lock feature to selectively disable inside rear door handle 26 from being able to move closure latch assembly 110 from the latched state to the unlatched state while in a child lock ON position. Closure latch assembly 110 is the same or substantially the same as discussed above for closure latch assembly 10, and thus, repetition of discussion thereof is unnecessary, as one possessing ordinary skill in the art will readily understand the workings of closure latch assembly 110 without needless repetition. Power-actuated child lock feature can be selectively moved from a child lock OFF position, whereat rear door handle 26 is operable to move closure latch assembly 110 from the latched state to the unlatched state, to the child lock ON position. As shown in FIG. 17, a child lock button or switch S, shown as being accessible on an inner front door panel next to a front driver's seat, by way of example and without limitation, is operable to move the power-actuated child lock feature of the closure latch system 110' and closure latch assembly 110 thereof between the child lock OFF position and the child lock ON position. Child lock switch S, as shown in FIG. 29, is configured in electrical communication with a controller (e.g. body control module BCM) 154, wherein BCM 154 can be configured in electrical communication with a latch controller 155, which can be configured in electrical communication with power actuator 141 of a power release mechanism 133, such as electrical motor, of closure latch assembly 110. As shown in FIG. 30, child lock switch S can be configured in direct electrical communication with latch controller 155, if desired.

Figure 25:
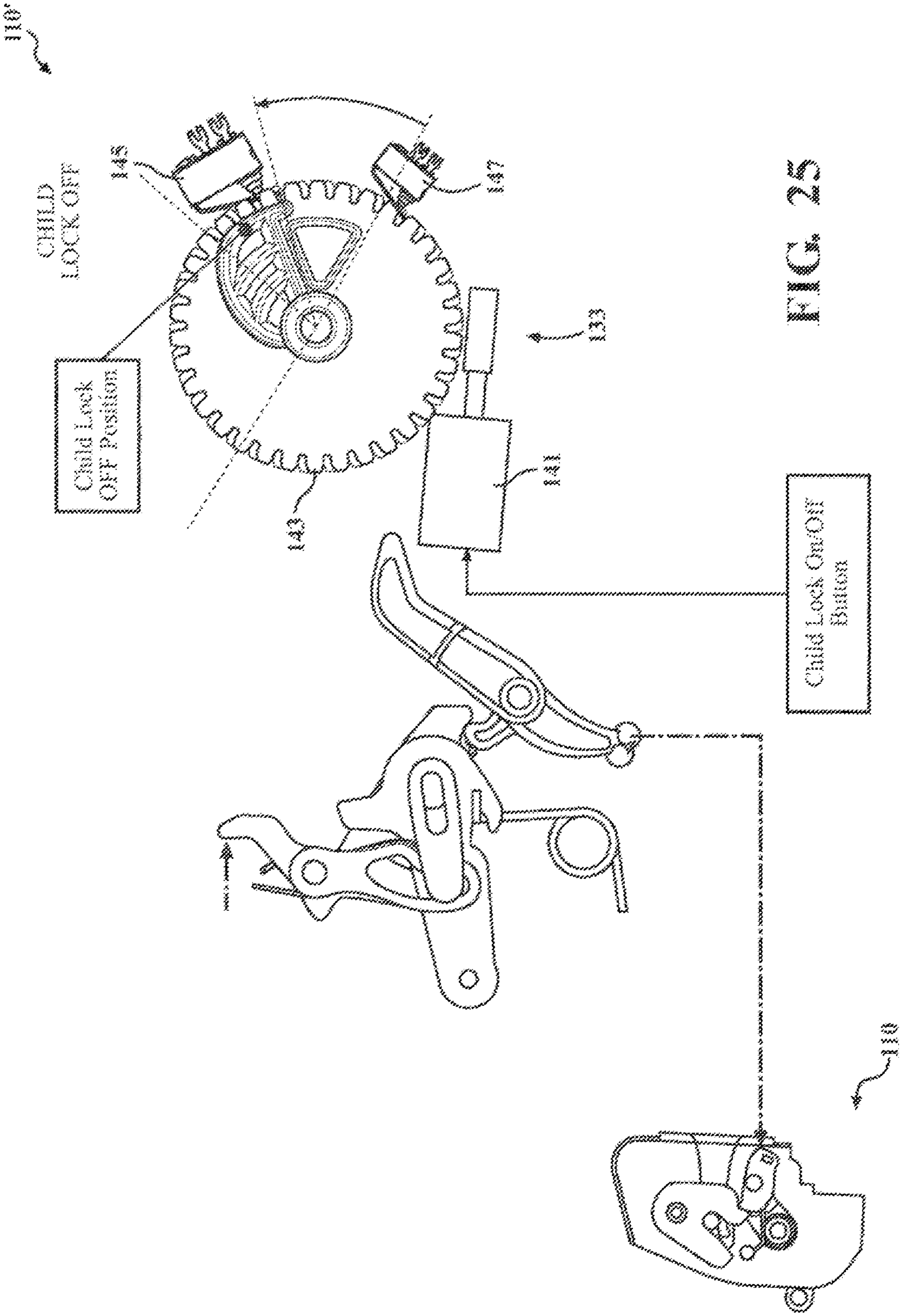
Figure 26:
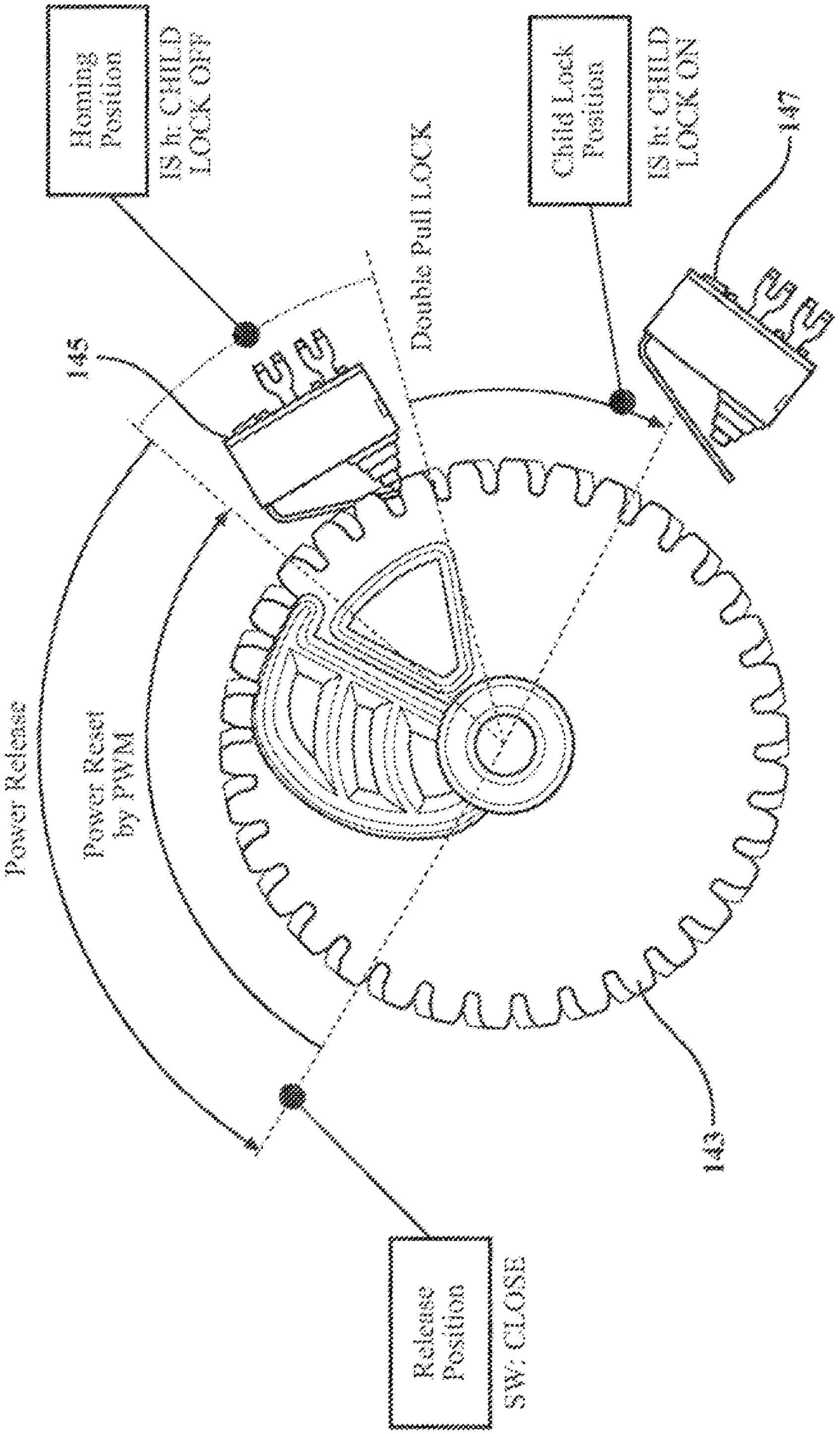

In FIGS. 19-26, various positions of power release gear 143 of power release mechanism 133 associated with power actuator 141 are shown. In FIGS. 19-22, the power-actuated child lock feature is in the child lock OFF position, whereat power release gear 143 can be sensed via a home position sensor/switch, also referred to as first sensor 145, such that a switch that can be triggered by cam member 144, by way of example and without limitation, when power release gear 143 is in its home position. In this position, the rear door handle 26 is operable to move the closure latch assembly 110 from the latched state to the unlatched state. In contrast, in FIGS. 23 and 24, power-actuated child lock feature is in the child lock ON position, whereat power release gear 143 can be sensed via a child lock position sensor/switch, also referred to as second sensor 147, such that a switch that can be triggered by cam member 144, by way of example and without limitation, when power release gear 143 is in its child lock position. In this position, the rear door handle 26 is inoperable to move the closure latch assembly 110 from the latched state to the unlatched state. Accordingly, rear door handle 26 is temporarily disconnected from electrical communication with power actuator 141, and thus, is unable to command movement of the closure latch assembly 110 from the latched state to the unlatched state. As shown in FIG. 25, activation of the child lock switch S, such as by a driver sitting in a driver's seat, can drive power actuator 141 to move power-actuated child lock feature from the child lock ON position to the child lock OFF position, whereat rear door handle 26 is again operable to move the closure latch assembly 110 from the latched state to the unlatched state. Accordingly, rear door handle 26 is reconnected for electrical communication with power actuator 141, and thus, is able to command movement of the closure latch assembly 110 from the latched state to the unlatched state.

Figure 27:
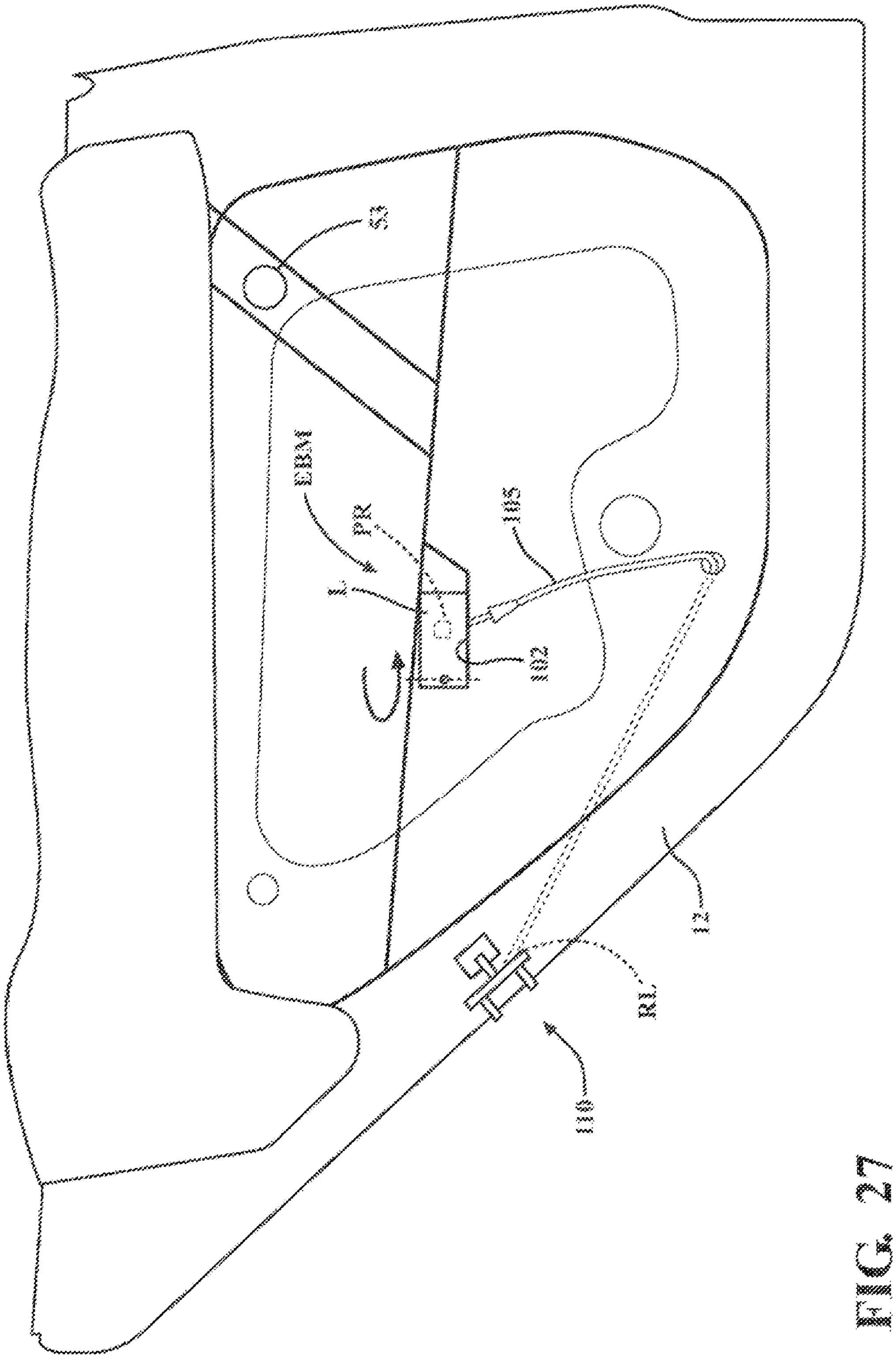
FIGS. 27, 27A and 28 illustrate an emergency backup mechanism of a closure latch system in accordance with a further aspect of the disclosure.
Figure 27A:
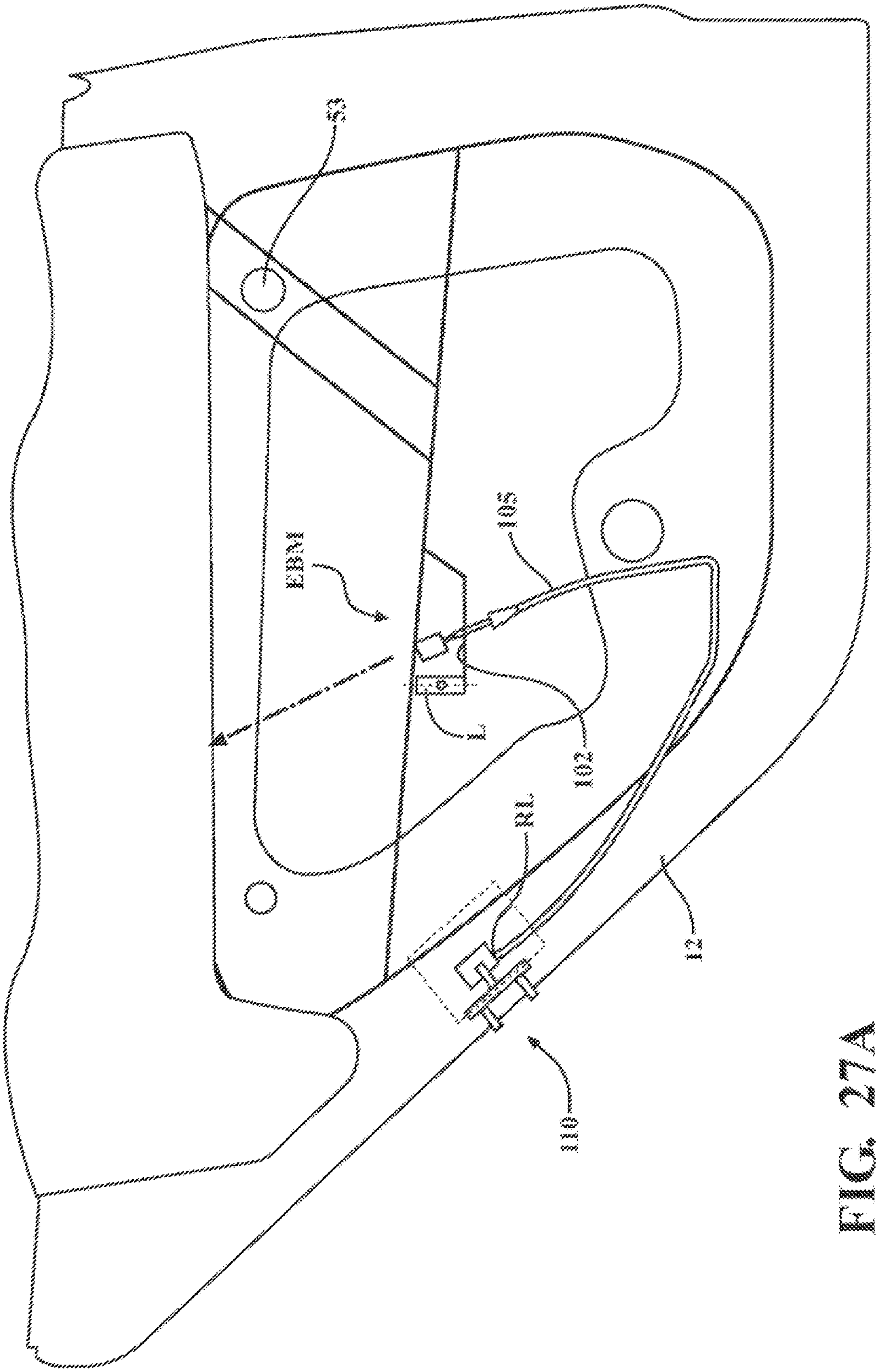

In FIGS. 27 and 27A, an emergency backup mechanism (EBM) is shown to provide an ability to mechanically move the closure latch assembly 110 from the latched state to the unlatched state without assistance from the power actuator 141. Emergency backup mechanism is an example of a latch release mechanism, and it is recognized that other types of release mechanisms may be employed to actuate the release lever RL, such as a hidden handle assembly, and outside handle assembly, an inside handle assembly, a remote powered actuator, a lever system, as but only non-limiting examples. As such, in the event power is inadvertently interrupted to power actuator 141, by way of example and without limitation, a passenger inside the motor vehicle 14 can gain access to the emergency backup mechanism EBM, such as via an access opening 102 covered by an emergency access panel or lid L, to manually move closure latch assembly 110 from the latched state to the unlatched state. Emergency backup mechanism EBM can be provided by a handle, lever, pull tab, pull ring, or the like, attached to a cable, such as a Bowden cable, that is mechanically coupled to a release lever RL (FIG. 28) that is moveable to move pawl to the ratchet releasing position, thereby causing latch assembly 110 to move from the latched state to the unlatched state. Accordingly, in a power-interrupted state, closure latch assembly 110 can be unlatched via manual actuation of mechanical linkage, though closure latch assembly 110 is intended to be solely actuatable in "normal use" by inside handle 26 via powered actuation. As shown schematically in FIG. 16, outside door handle 24 can be configured for manual actuation via a Bowden cable.

Figure 31:
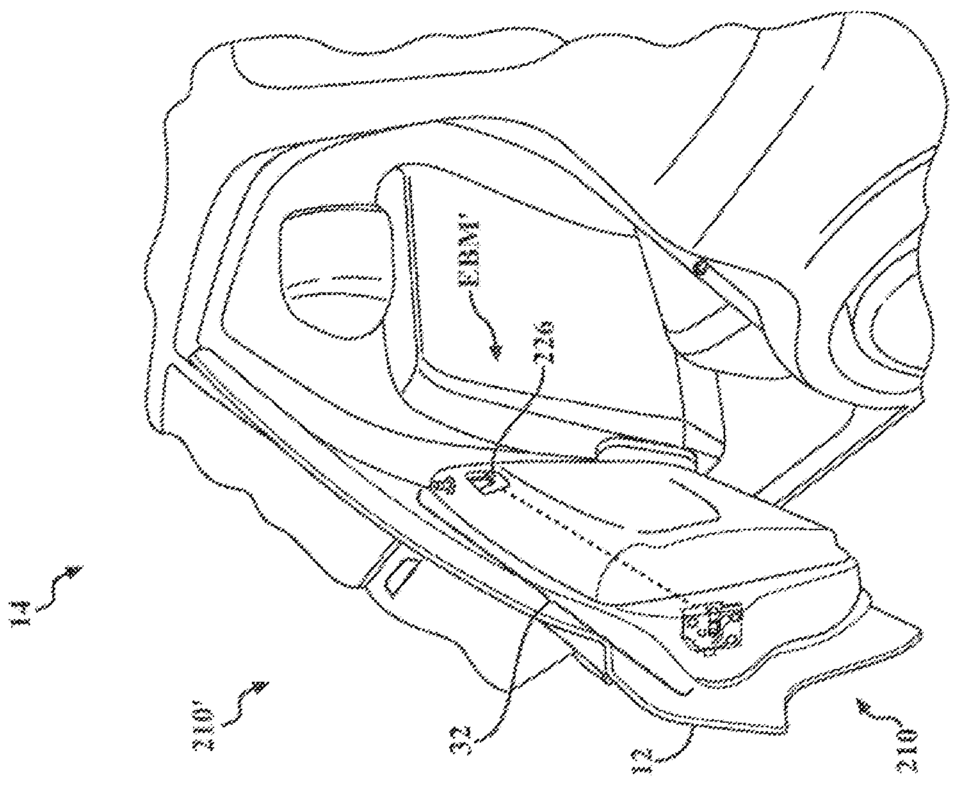
FIG. 31 is an isometric view of a motor vehicle having vehicle door equipped with a closure latch assembly constructed in accordance with another aspect of the disclosure.

In FIG. 31, a closure latch system 210' and closure latch assembly 210 thereof is shown configured for use on rear passenger door 12 of vehicle 14, by way of example and without limitation. Closure latch system 210' includes a child lock feature to selectively disable an inside rear door release member, such as a rear door handle 226, from being able to move closure latch assembly 210 from a latched state to an unlatched state while in a child lock ON position. Closure latch system 210' and closure latch assembly 210 thereof is the same or substantially the same as discussed above for closure latch assemblies 10, 110 and closure latch system 110', and thus, repetition of discussion thereof is unnecessary, as one possessing ordinary skill in the art will readily understand the workings of closure latch system 210' and closure latch assembly 210 without repetition. Power-actuated child lock feature can be selectively moved from a child lock OFF position (FIGS. 33, 35, and 37), whereat rear door handle 226 is operable to move closure latch assembly 210 from the latched state to the unlatched state, to the child lock ON position (FIG. 36), whereat rear door handle 226 is inoperable to move closure latch assembly 210 from the latched state to the unlatched state. As shown in FIG. 17, a child lock button or switch S, shown as being accessible on an inner front door panel next to a front driver's seat, by way of example and without limitation, is operable to move the power-actuated child lock feature of the closure latch system 210' and closure latch assembly 210 thereof between the child lock OFF position and the child lock ON position. Child lock switch S, as shown in FIG. 29, is configured in electrical communication with a controller (e.g. body control module BCM) 154, wherein BCM 154 can be configured in electrical communication with a latch controller 155, which can be configured in electrical communication with power actuator 141 of a power release mechanism 133, such as electrical motor, of closure latch assembly 210. As shown in FIG. 30, child lock switch S can be configured in direct electrical communication with latch controller 155, if desired. Further, closure latch system 210' is operable to move to a double lock position, also referred to as lock ON position, as shown and discussed for FIG. 13, and thus, no further discussion is believed necessary.

Figure 28:
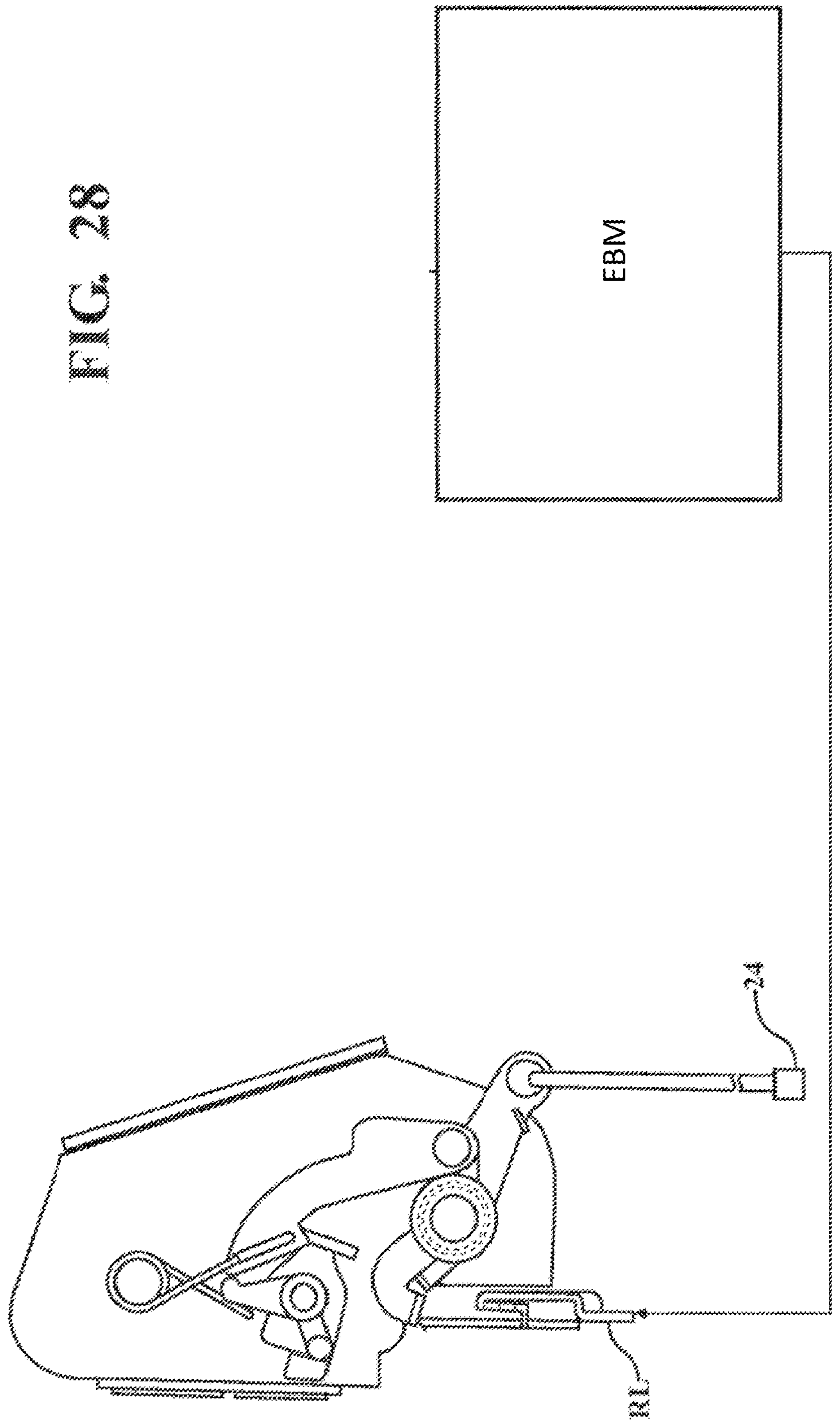
Figure 32:
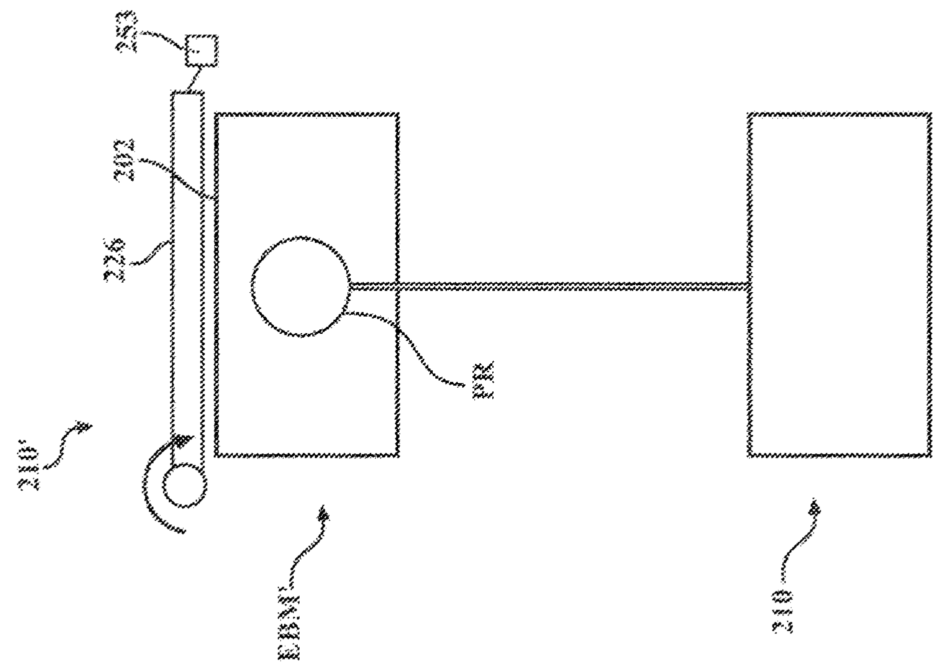
FIG. 32 is a schematic view of the bracketed region 32 of FIG. 31 illustrating operable communication between an inside actuation assembly and a closure latch assembly of a closure latch system with normal and emergency backup mechanisms being provided in accordance with a further aspect of the disclosure.
Figure 33:
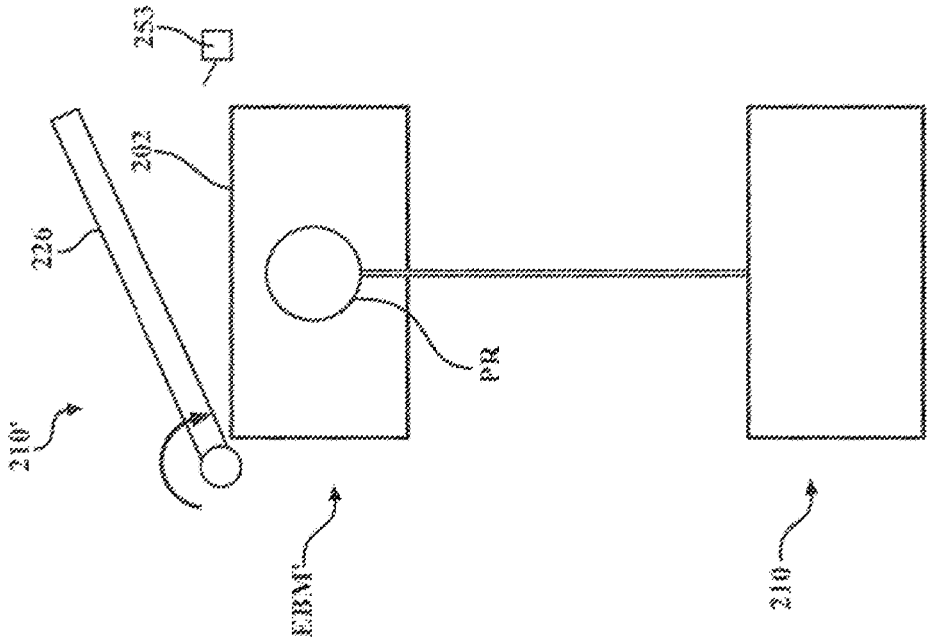
FIG. 33 is a view similar to FIG. 32 illustrating a sequence of a normal release of the closure latch assembly via selective movement of an inside handle of the inside actuation assembly.

In FIGS. 32-33, an emergency backup mechanism (EBM') is schematically shown to provide an ability to mechanically move the closure latch assembly 210 from the latched state to the unlatched state without assistance from the power actuator 141. As such, in the event power is inadvertently interrupted to power actuator 141, or if power actuator 141 otherwise becomes mechanically inoperable, by way of example and without limitation, a passenger inside the motor vehicle 14 can gain open and ready access to the emergency backup mechanism EBM', such as via an access opening 202 covered and concealed by rear door handle 226, to manually move closure latch assembly 210 from the latched state to the unlatched state. Emergency backup mechanism EBM' can be provided by a handle, lever, pull tab, pull ring PR, or the like, attached to a cable, such as a Bowden cable, that is mechanically coupled to a release lever RL (as shown in FIG. 28) that is moveable to move pawl to the ratchet releasing position, thereby causing latch assembly 210 to move from the latched state to the unlatched state. Accordingly, in a power-interrupted state, or other inoperable condition of power actuator 141, closure latch assembly 210 can be unlatched via manual actuation of mechanical linkage, though closure latch assembly 210 is intended to be solely actuatable in "normal use" by rear inside handle 226 via powered actuation as long as closure latch assembly 210 is not in the child lock ON position.

With reference to FIG. 35, when closure latch system 210' is in the lock OFF and child lock OFF position, actuation of rear door handle 226 from a closed position, also referred to as rest position (FIG. 32), to a normal open position, also referred to as first deployed position or first position (FIG. 33), causes closure latch assembly 210 to move from the latched state to the unlatched state, thereby allowing rear door 12 to be opened. Movement of rear door handle 226 to the normal open position triggers an inside handle switch 253 that is configured in operable communication BCM 154 and/or latch controller 155, with at least one of BCM 154 and/or latch controller 155 being configured in operable communication with home position sensor/switch (first sensor) 143, thereby causing the latch controller 155 to signal motor 141 to drive power release gear 143 to the release position, as discussed above, thereby causing closure latch assembly to move to the unlatched state. Rear door handle 226 can be biased by a rear handle biasing member, such as a suitable spring member SM, to return rear door handle 226 to the closed position, thereby causing switch 253 to become reset.

Figure 36:
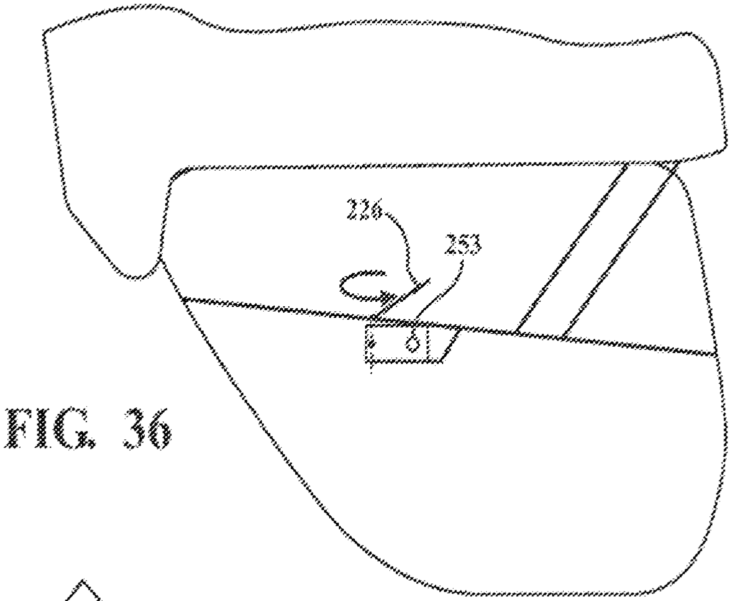
FIG. 36 is a view similar to FIG. 35 showing closure latch system during a deactivated, decoupled condition while in a lock ON, child lock ON position corresponding to FIGS. 23-24.
Figure 36A:
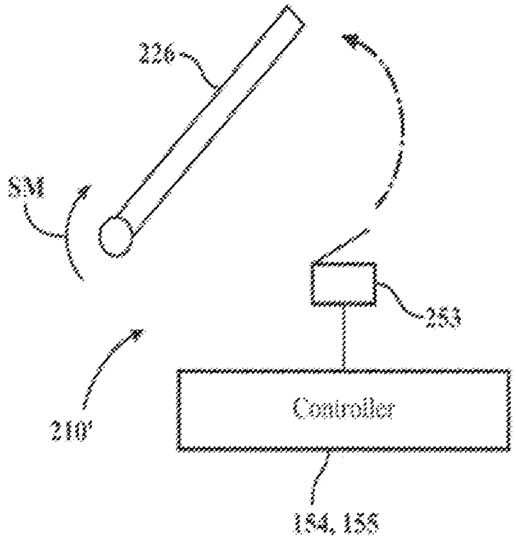
FIG. 36A is a schematic illustration of closure latch system of FIG. 36 showing a controller in operable communication with the inside release mechanism.
Figure 36B:
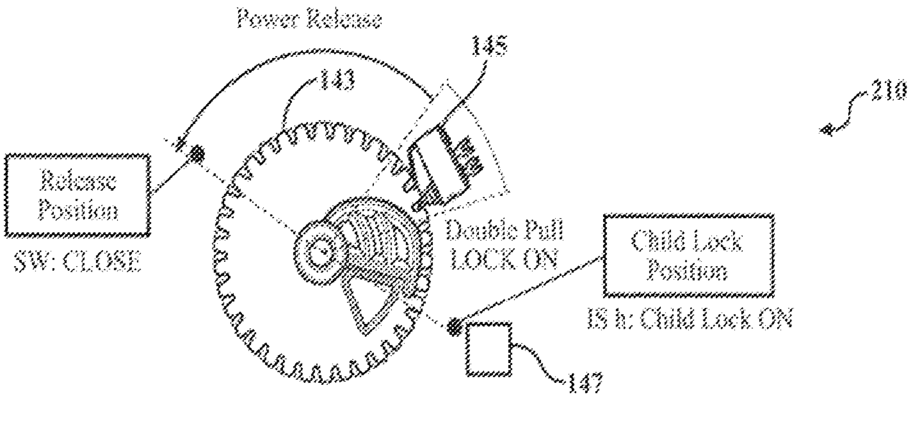
FIG. 36B illustrates a power release gear of the closure latch system of FIGS. 36 and 36A.

With reference to FIG. 36, when closure latch system 210' is in the lock ON and child lock ON position, actuation of rear door handle 226 from the closed position (FIG. 32) to the normal open position (FIG. 33) fails to cause closure latch assembly 210 to move from the latched state to the unlatched state, thereby causing closure latch assembly 210 to remain in the latched state and rear door 12 to be maintained in the closed position. Movement of rear door handle 226 to the normal open position, with child lock ON, triggers an inside handle switch 253 that is configured in operable communication BCM 154 and/or latch controller 155, with at least one of BCM 154 and/or latch controller 155 being configured in operable communication with child lock position sensor/switch (second sensor) 147, thereby preventing the latch controller 155 from signaling motor 141 to drive power release gear 143 to the release position, as discussed above, thereby maintaining closure latch assembly 210 in the latched state. Further, while in the child lock ON position, manual actuation of emergency backup mechanism EBM' does not cause closure latch assembly 210 to move to the unlatched state, as discussed above for FIGS. 23 and 24.

Figure 14:
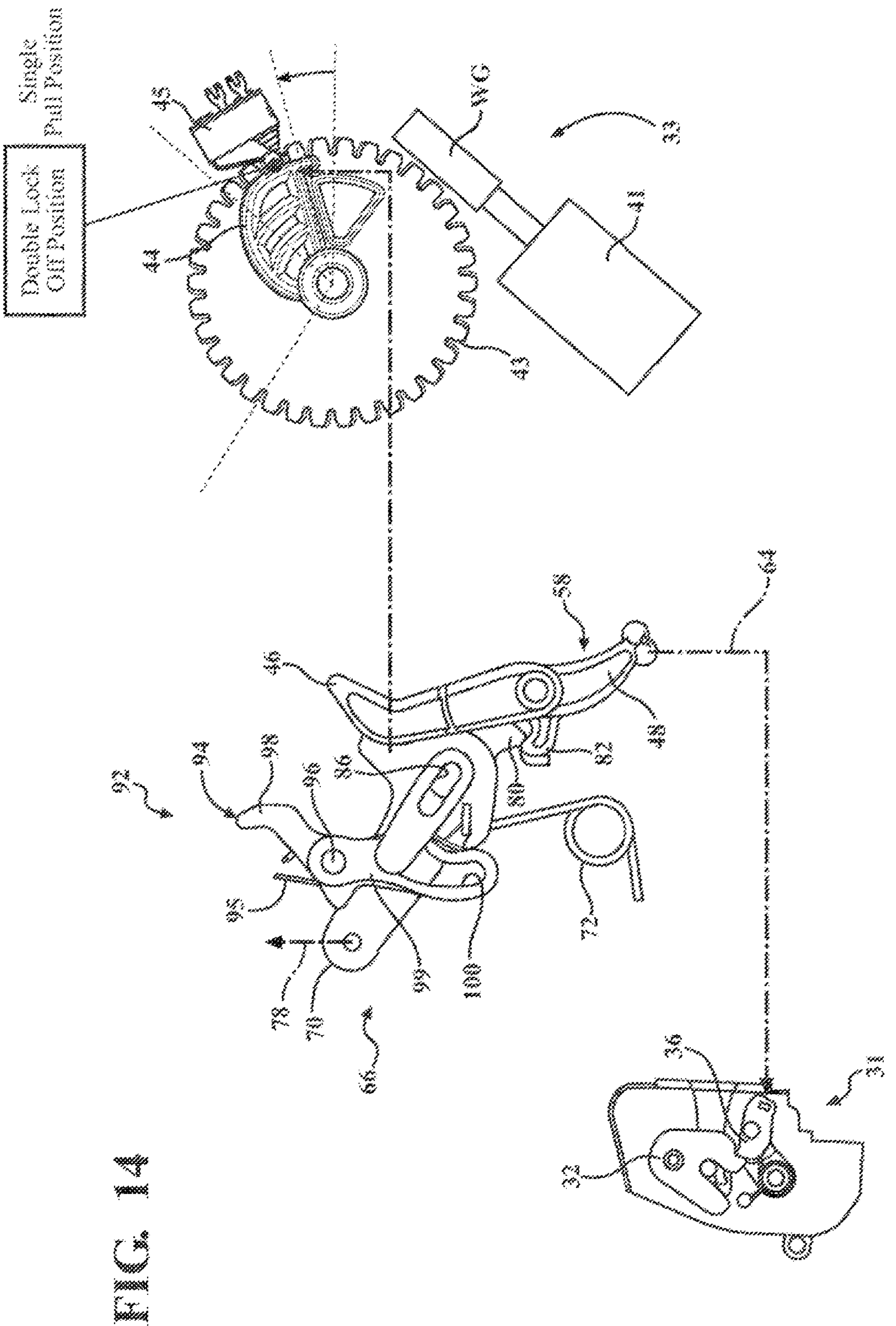
Figure 15:
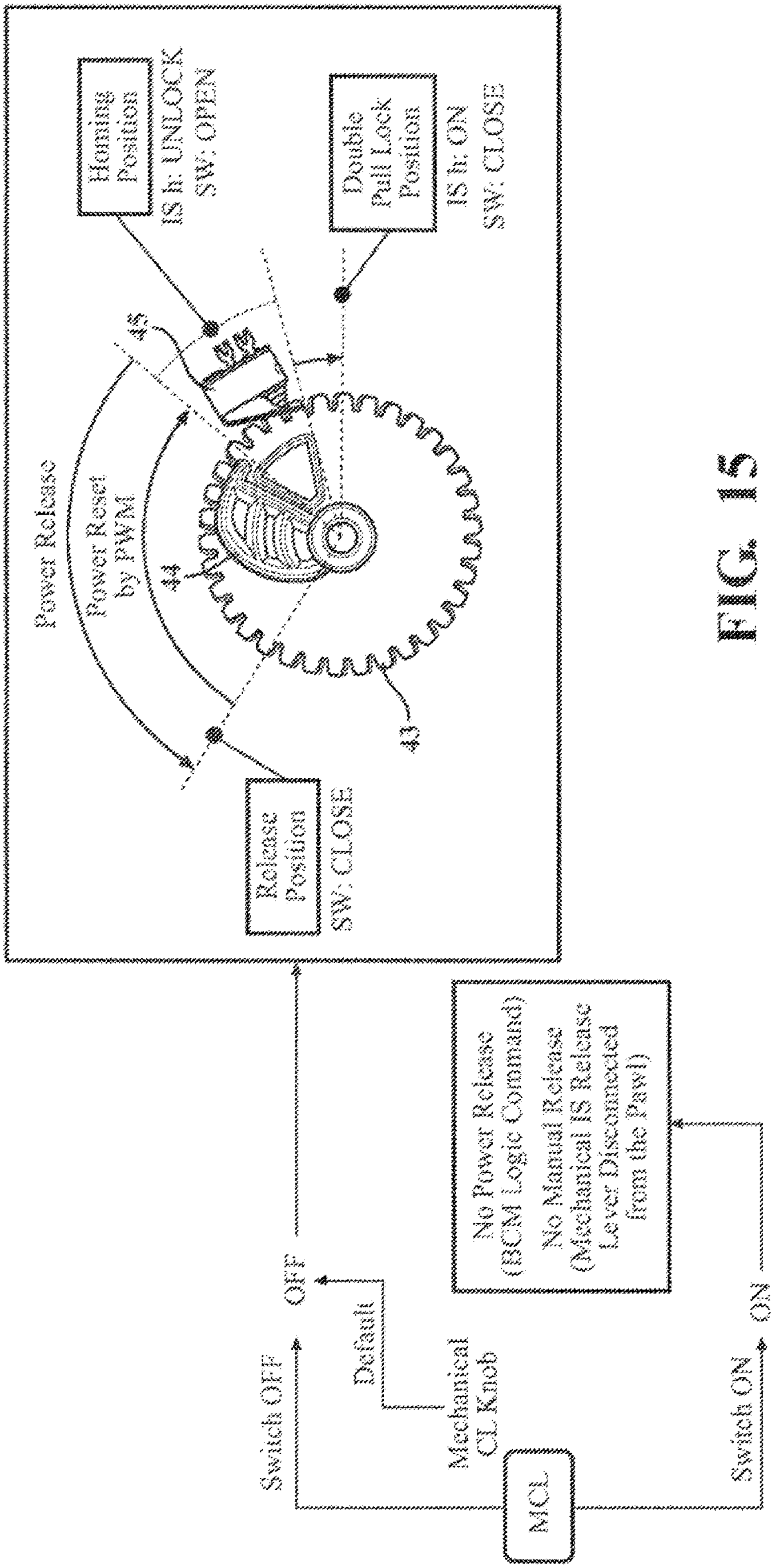
Figure 37:
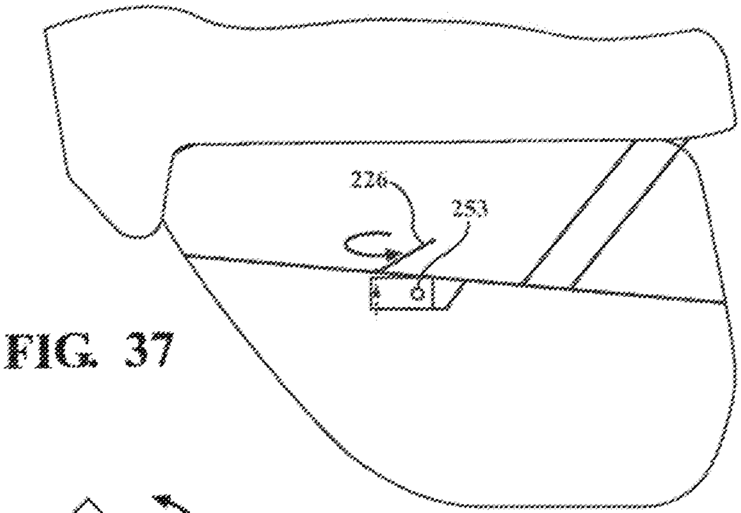
FIG. 37 is a view similar to FIG. 35 showing closure latch system during an emergency release condition while in a lock ON, child lock OFF position.
Figure 37A:
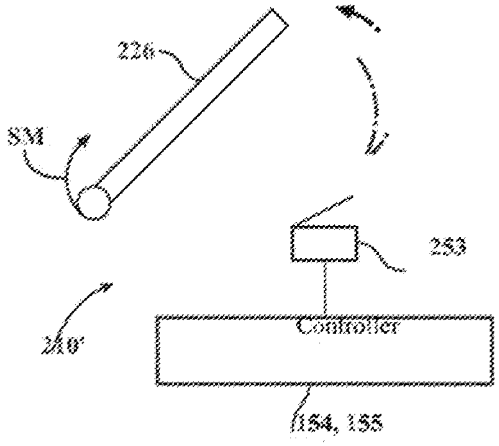
FIG. 37A is a schematic illustration of closure latch system of FIG. 37 showing a controller in operable communication with the inside release mechanism.
Figure 37B:
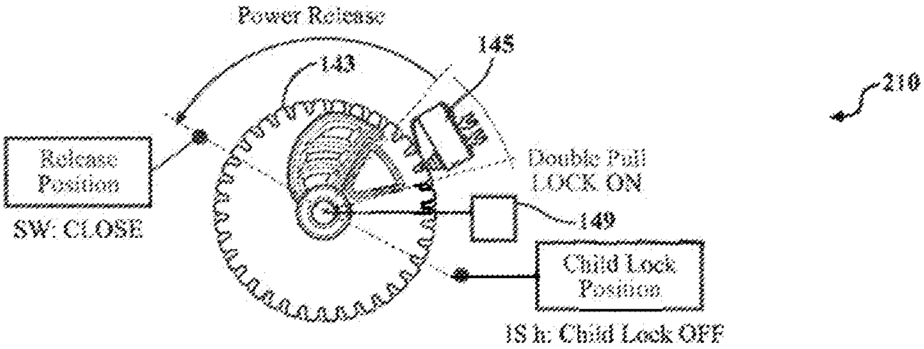
FIG. 37B illustrates a power release gear of the closure latch system of FIGS. 37 and 37A.
Figure 38:
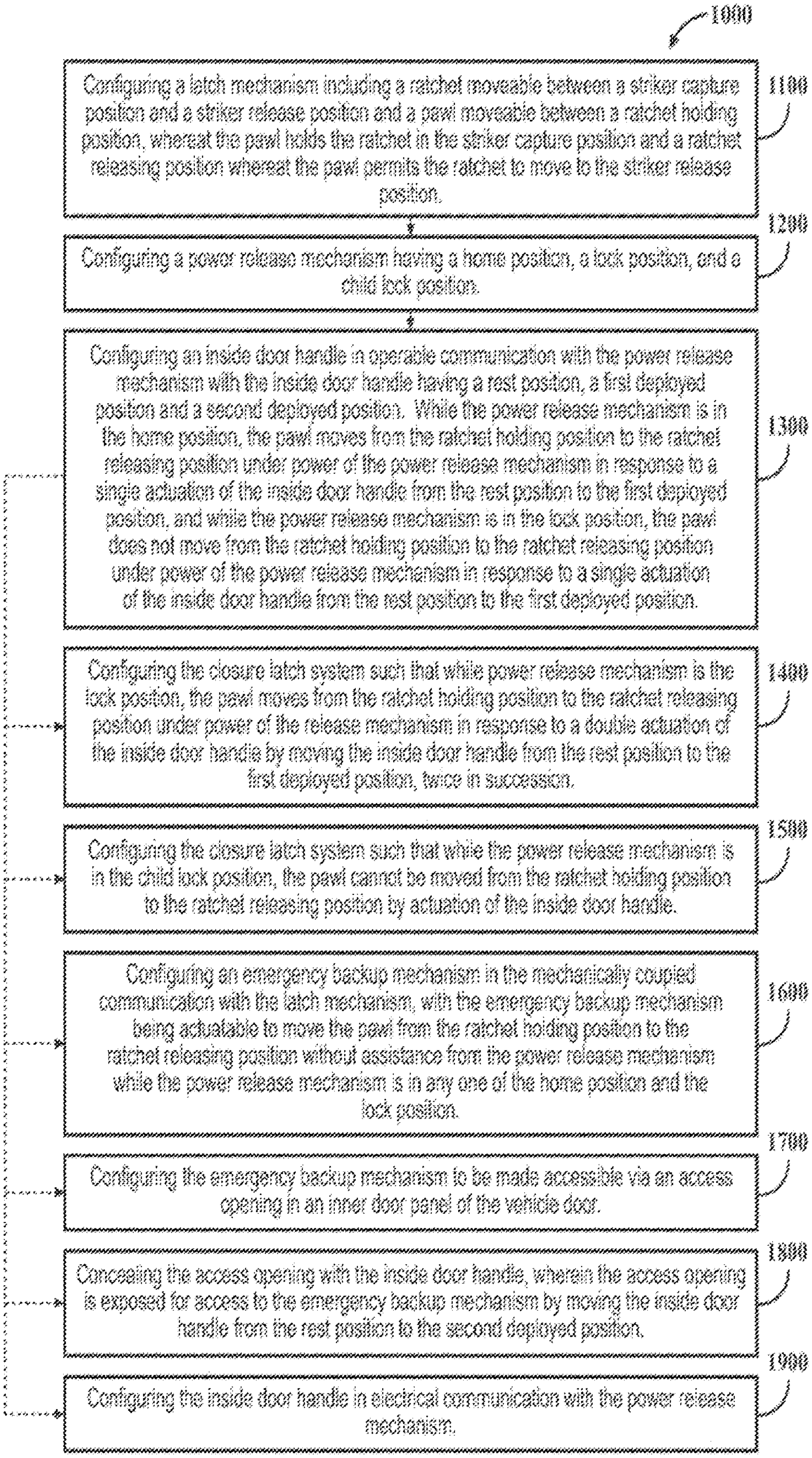
FIG. 38 is a flow diagram illustrating a method of constructing a closure latch system for a vehicle door in accordance with a further aspect of the disclosure.

With reference to FIG. 37, when closure latch system 210' is in the lock ON and child lock OFF position, a single actuation of rear door handle 226 from the closed position (FIG. 32) to the normal open position (FIG. 33) fails to cause powered movement of closure latch assembly 210 from the latched state to the unlatched state, thereby causing closure latch assembly 210 to remain in the latched state and rear door 12 to be maintained in the closed position. However, a second actuation, also referred to as double actuation, of rear door handle 226 from the closed position to the normal open position causes powered movement of closure latch assembly 210 from the latched state to the unlatched state, thereby causing closure latch assembly 210 to move to the unlatched state, thereby allowing rear door 12 to be opened, such as discussed above with regard to FIGS. 13, 14 and 15 (sequence 3-6). Movement of rear door handle 226 to the normal open position in the first actuation, with lock ON and child lock OFF position, triggers inside handle switch 253 that is configured in operable communication BCM 154 and/or latch controller 155, with at least one of BCM 154 and/or latch controller 155 being configured in operable communication with lock position sensor/switch (third sensor) 149, with the first actuation not being sufficient to cause the latch controller 155 to signal motor 141 to drive power release gear 143 to the release position, as discussed above for FIG. 13, thereby maintaining closure latch assembly 210 in the latched state. But then, movement of rear door handle 226 to the normal open position in the second actuation, with lock ON and child lock OFF position, triggers inside handle switch 253, with the second actuation causing the latch controller 155 to signal motor 141 to drive power release gear 143 to the release position, as discussed above for FIG. 14, thereby causing closure latch assembly 210 to move from the latched state to the unlatched state. Accordingly, movement of the rear door handle 226 twice, from the rest, home position to the normal open position causing powered actuation of closure latch assembly 210 to move from the latched to the unlatched state.

Figure 34:
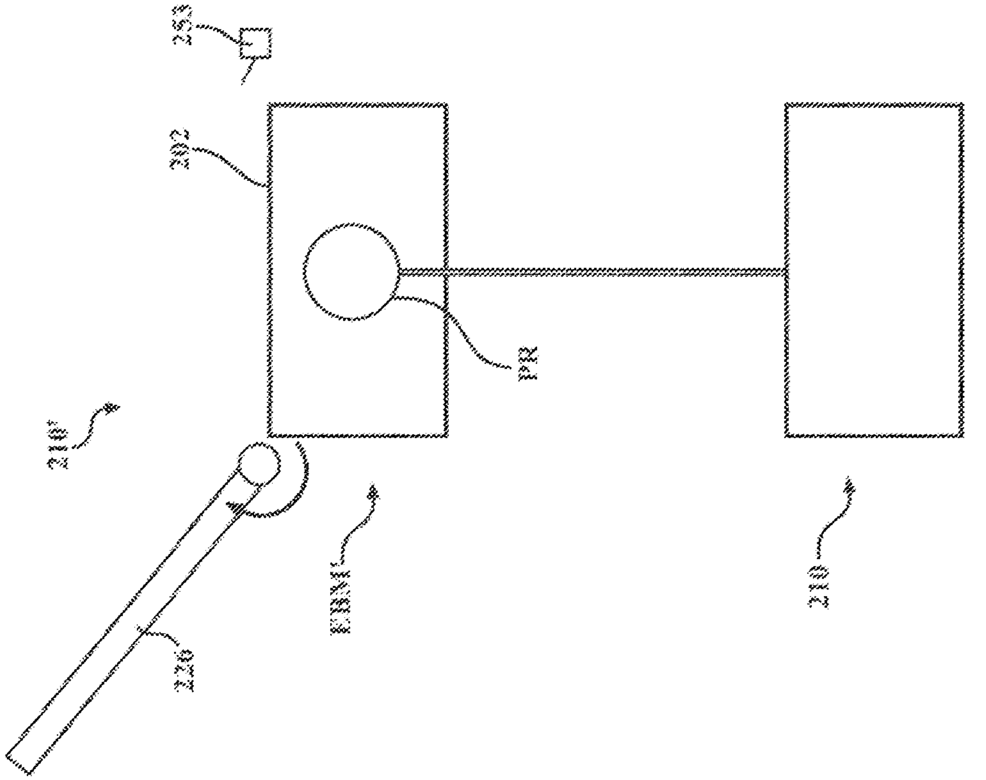
FIG. 34 is a view similar to FIG. 32 illustrating a sequence of an emergency release of the closure latch assembly via selective movement of an emergency release member of the inside actuation assembly.

Additionally, when closure latch system 210' is in the lock ON and child lock OFF position, should a power interruption condition exist, actuation of the emergency backup mechanism EBM' causes closure latch assembly 210 to move to the unlatched state, as discussed above for FIGS. 13 and 14. The user can simply move the rear door handle 226 from the rest position to an emergency open position, also referred to as second deployed position or second position (FIG. 34), with the second position being beyond the first position, thereby exposing the access opening 202 such that the user can have ready access to the emergency pull ring PR. Then, the user can simply perform a double actuation of the emergency pull ring PR, thereby causing the closure latch assembly 210 to move to the unlatched state. Accordingly, even during a power interruption, a rear seat passenger can override power release system, while closure latch system 210' is in the lock ON and child lock OFF position, via mechanical actuation of emergency backup mechanism EBM'.

In accordance with another aspect of the disclosure, a method 1000 of constructing a closure latch system 210' for a vehicle door 12 is provided. The method 1000 includes a step 1100 of configuring a latch mechanism 31 including a ratchet 32 moveable between a striker capture position and a striker release position and a pawl 36 moveable between a ratchet holding position, whereat the pawl 36 holds the ratchet 32 in the striker capture position and a ratchet releasing position whereat the pawl 36 permits the ratchet 32 to move to the striker release position. Further, a step 1200 of configuring a power release mechanism 133 having a home position, a lock position, and a child lock position; and a step 1300 of configuring an inside door handle 26 in operable communication with the power release mechanism 133 with the inside door handle 26 having a rest position, a first deployed position and a second deployed position. While the power release mechanism 133 is in the home position, the pawl 36 moves from the ratchet holding position to the ratchet releasing position under power of the power release mechanism 133 in response to a single actuation of the inside door handle 26 from the rest position to the first deployed position, and while the power release mechanism 133 is in the lock position, the pawl 36 does not move from the ratchet holding position to the ratchet releasing position under power of the power release mechanism 133 in response to a single actuation of the inside door handle 26 from the rest position to the first deployed position.

In accordance with a further aspect of the method 1000, a step 1400 includes configuring the closure latch system 210' such that while power release mechanism 133 is in the lock position, the pawl 36 moves from the ratchet holding position to the ratchet releasing position under power of the release mechanism 133 in response to a double actuation of the inside door handle 26 by moving the inside door handle 26 from the rest position to the first deployed position, twice in succession.

In accordance with a further aspect of the method 1000, a step 1500 includes configuring the closure latch system 210' such that while the power release mechanism 133 is in the child lock position, the pawl 36 cannot be moved from the ratchet holding position to the ratchet releasing position by actuation of the inside door handle 26.

In accordance with a further aspect of the method 1000, a step 1600 includes configuring an emergency backup mechanism (EBM') in mechanically coupled communication with the latch mechanism 31, with the emergency backup mechanism EBM' being actuatable to move the pawl 36 from the ratchet holding position to the ratchet releasing position without assistance from the power release mechanism 133 while the power release mechanism 133 is in any one of the home position and the lock position.

In accordance with a further aspect of the method 1000, a step 1700 includes configuring the emergency backup mechanism EBM' to be made accessible via an access opening 202 in an inner door panel of the vehicle door 12.

In accordance with a further aspect of the method 1000, a step 1800 includes concealing the access opening 202 with the inside door handle 26, wherein the access opening 202 is exposed for ready access to the emergency backup mechanism EBM' by moving the inside door handle 26 from the unactuated, rest position to the actuated, second deployed position. It is to be recognized that the access opening 202 is intended to be inaccessible during normal use, and is further intended to be inconspicuous, such that the aesthetic appearance of the inside door handle region is pleasing. It is only when desired, such as during an emergency, including a power shortage to power release mechanism 133, by way of example and without limitation, that the access opening 202 is intended to be exposed for access to the emergency backup mechanism EBM', as will be understood by a person skilled in the art upon viewing the disclosure herein.

In accordance with a further aspect of the method 1000, a step 1900 includes configuring the inside door handle 26 in electrical communication with the power release mechanism 133, such that the only operable communication between the inside door handle 26 and the latch mechanism 31 is electrical, with no mechanical connection being present therebetween.

Figure 39:
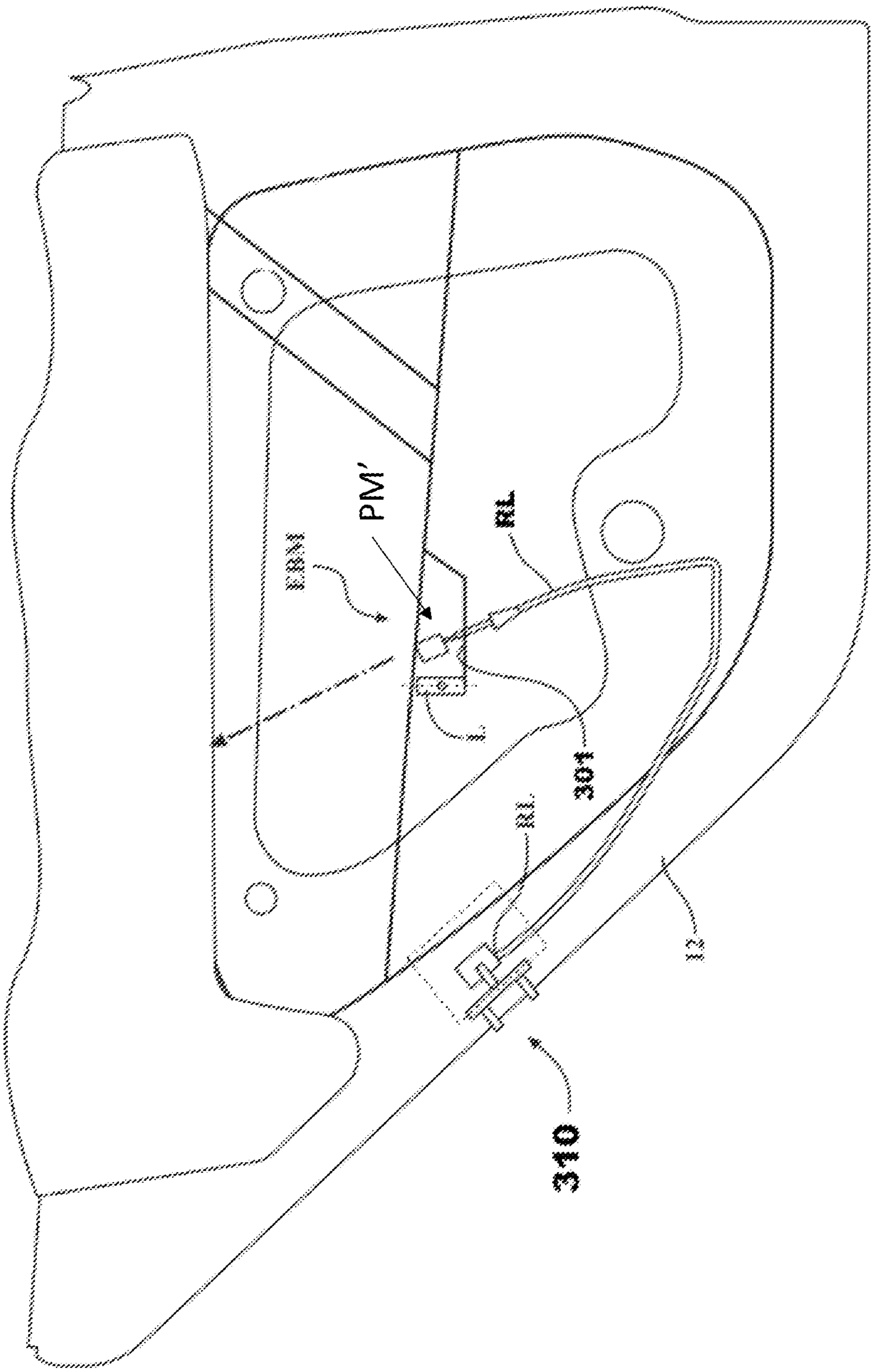
FIGS. 39-41B illustrate an emergency backup mechanism of a closure latch system in accordance with yet a further aspect of the disclosure.

In FIG. 39, an emergency backup mechanism (EBM") is shown to provide an ability to mechanically move a closure latch assembly 310, such as discussed above for closure latch assemblies 110, 210, of a closure latch system 310', such as discussed above for closure latch systems without repeating the discussion for closure latch assemblies 110, 210 here, from the latched state to the unlatched state from inside the motor vehicle 14 without assistance from a power actuator, such as discussed above for power actuator 141. As such, in the event power is inadvertently interrupted to power actuator, or power actuator otherwise becomes inoperable, a passenger inside the motor vehicle 14 can choose to gain access to the emergency backup mechanism EBM", such as, by way of example and without limitation, via access opening 301 covered by an emergency access panel or lid L, to manually move closure latch assembly 310 from the latched state to the unlatched state. Emergency backup mechanism EBM" can be provided having a pull member PM', such as a handle, lever, pull tab, pull ring, or the like, attached to a central cable 302 of a cable assembly 304, such as a Bowden cable having an outer tubular cable conduit 306 configured for sliding receipt of the central cable, referred to hereafter as cable 302, along a cable axis 308 therethrough. Cable 302, as an example of a release member, extends between a first cable end 311, having pull member PM' fixed thereto, and a second end 313 that is mechanically coupled to release lever RL', such as via a suitable connector member 315. Mechanical actuation of the emergency backup mechanism EBM" from a non-deployed position to a deployed position causes release lever RL' to be selectively moved to move pawl to the ratchet releasing position, thereby causing latch assembly 310 to move from the latched state to the unlatched state. Accordingly, in an inoperable state, such as a power-interrupted state, for example, closure latch assembly 310 can be unlatched via manual actuation of cable assembly 304, though closure latch assembly 310 can be configured, as discussed above for closure latch assembly 110, to be solely actuatable in "normal use" by inside handle 26 via powered actuation. Release member may also be provided as a rod, a lever, a plastic cable, metal cable, as but non-limiting examples.

Figures 40, 40A, 40B:
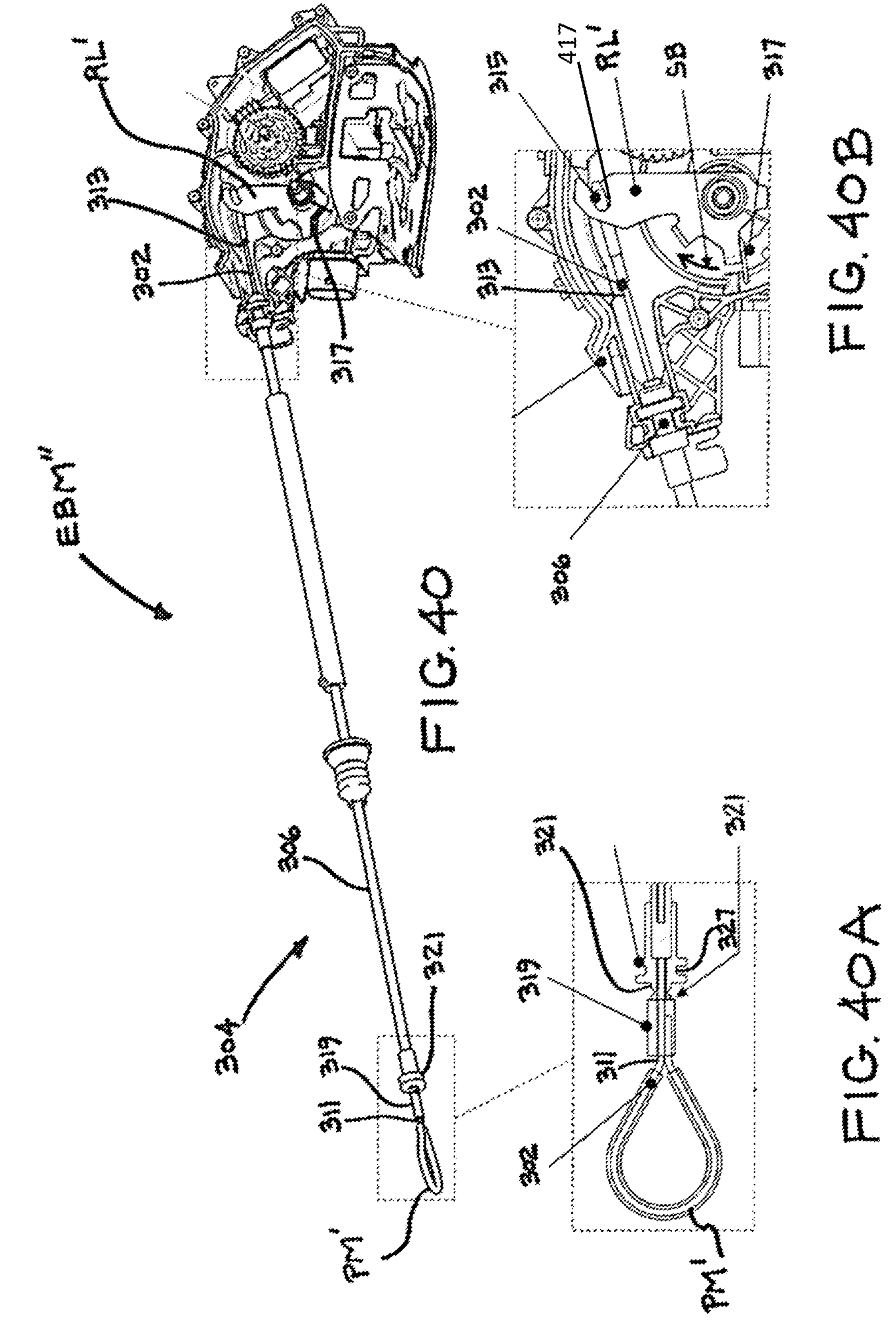

Emergency backup mechanism EBM" has a preload bias imparted thereon to prevent rattling noise while the EBM" is in the non-deployed position (EBM" is in an at rest state during normal operation of motor vehicle 14) and while the motor vehicle 14 is moving, regardless of the terrain, including unsmooth, bumpy terrain. The preload bias is imparted on the cable assembly 304, and in particular, the bias is imparted on the central cable 302. In the non-limiting embodiment illustrated, the bias can be imparted to apply a constant tension force TF (FIG. 41B) on the central cable 302, such as by a spring member 317, by way of example and without limitation. The spring member 317 is shown configured to impart a spring bias SB directly on the release lever RL', whereupon the release lever RL' can be configured to impart the bias on the cable 302. The bias force SB imparted by the spring member 317 is shown to bias release lever RL' in a clockwise direction, as view in FIGS. 40B, 41A-41B.

Figure 41B:
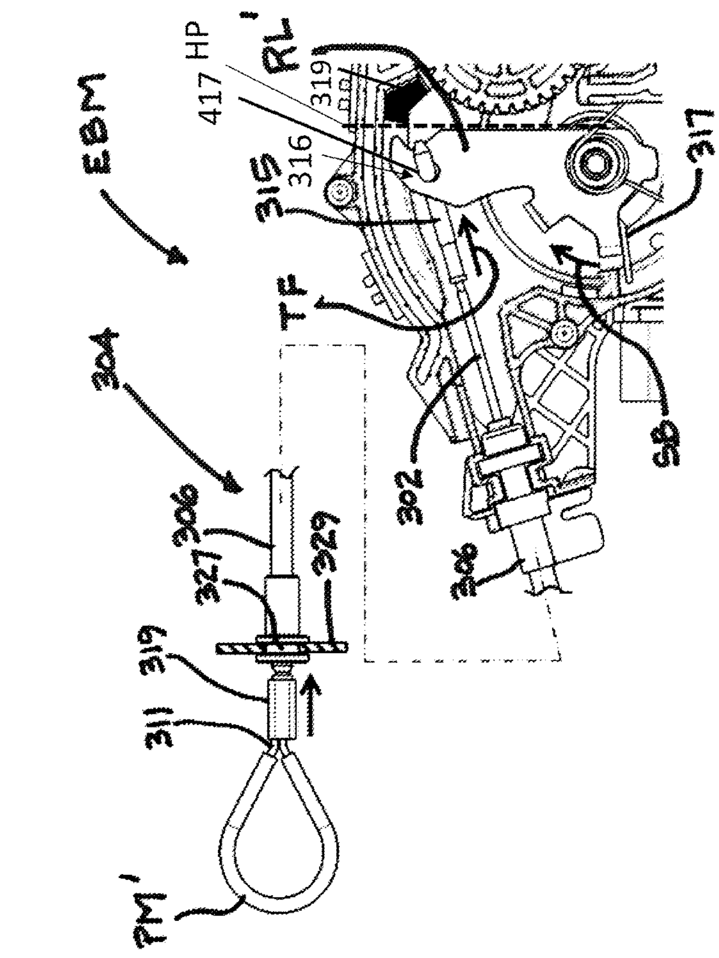
Figure 41A:
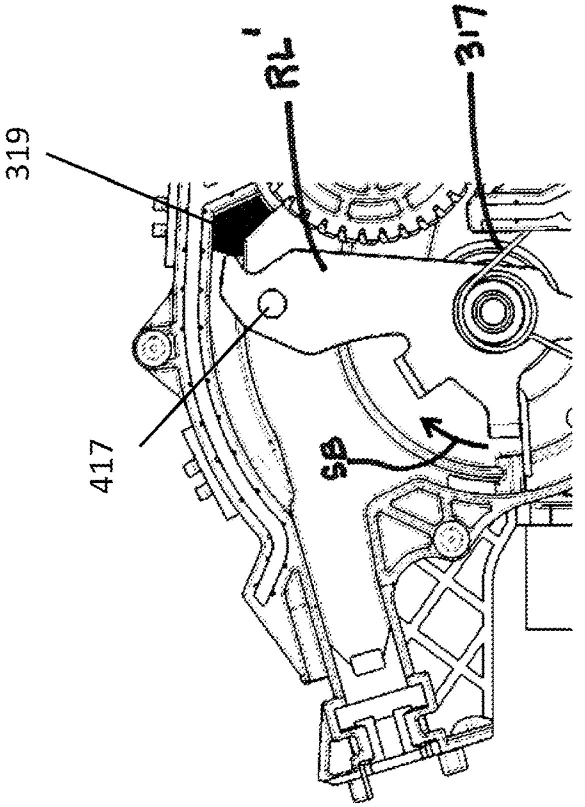

To facilitate maintaining the tension force TF in the cable 302, a stop member 319 can be fixed to the central cable 302, such that the bias imparted on the cable 302 via release lever RL' pulls the stop member 319 into engagement with a stop surface 321 that is fixed against movement along the cable axis 308 to maintain the tension force TF on the cable 302 while the emergency backup mechanism EBM" is in the non-deployed position. With the cable 302 being maintained under tension force TF, rattle and noise generation by the emergency backup mechanism EBM" while the motor vehicle is being driven is prevented. Stop member 319 acts to limit the travel of the release lever RL' at a hard-stopped position, thus limiting any further motion of the cable 302 by the release lever RL' as being pulled by the release lever RL' being biased in the clockwise direction as seen in FIG. 41A. In the illustrative configuration shown in FIG. 41B, the restricted travel of the cable 302 e.g. due the hard-stopped position of the cable 302, rather controls the non-deployed position of the release lever RL', and release level RL' does not need to engage with a separate hard stop surface e.g. housing bumper 319 provided on the housing of the latch assembly 310. As seen in FIG. 41B, the maximum travel of the cable 302 towards the right as it extends from the tubular cable conduit 306 will control the home non-actuated position of the release lever RL'. As a result, a hard stop of the release lever RL', such as the release lever RL' abutting against a stop surface provided on the housing of the closure latch assembly 310, is not required or does not occur. As shown in FIG. 41B, hard stop surface 319 is not in contact with the release lever RL' for example. The release lever RL' will be prevented from rotating (e.g. clockwise) further past its non-deployed position e.g. further clockwise from its position (HP) as shown in FIG. 41B, by the limited travel of the cable 302. In other words, the release lever RL' is in a suspended, tensed state when in its non-deployed position. In one possible configuration, a handle assembly, such as a pivoting inside or outside door handle is not connected to the cable 302 such that a hard stopped position of the cable 302 may control the non-actuated position of the release lever RL'. In another possible configuration, a handle assembly, such as a pivoting inside or outside door handle may be connected to the cable 302 such that a hard stopped position of the cable 302 may control the non-actuated position of the release lever RL'.

The outer tubular cable conduit 306 extends between opposite first and second ends 323, 325, wherein the stop surface 321 can be fixed to the outer tubular cable conduit 306, and in particular, to the first end 323. The stop surface 321 can be provided having a circumferentially extending groove 327 configured for fixed receipt of an edge of a panel 329 (FIG. 41B) of the vehicle door therein, thereby preventing unwanted relative movement of the stop surface 321 and the outer tubular cable conduit 306 along the cable axis 308. To further prevent unwanted relative movement of the outer tubular cable conduit 306 along the cable axis 308, the second end 325 of the outer tubular cable conduit 306 can be fixed to a housing 331 of the closure latch assembly 310.

In the non-limiting embodiment illustrated, the pull member PM' is provided at the free first end 311 of the cable 302 and the stop member 319 is between the pull member PM' and the stop surface 321. The pull member PM' is configured to be pulled generally along the cable axis 308 to move the stop member 319 away from the stop surface 321 and move the release lever RL' against the bias imparted by the spring member 317 to cause the pawl to move from the ratchet holding position to the ratchet releasing position while the emergency backup mechanism EBM" is in the deployed position, regardless of the state of the power release mechanism.

In view of the above discussion pertaining to the EBM", it is to be understood that the cable 302 is always under tension, regardless of its position, and thus, rattling of the cable 302 and the EMB" in general is prevented. This is in contrast to what would happen absent the cable 302 being under constant tension so as to prevent relative motion between the cable 302 and the release lever RL', such as if there were no preload in the EMB", as shown, by way of example in FIG. 43A, were no spring force is imparted on cable 302. The problem resulting from no preload is potential rattling noise, which is remedied in FIG. 43B via imparting a preload via spring member 317. For example, rattling or shaking or vibration imparted to the closure latch assembly 310 during operation of the vehicle on the road will not cause relative motion between the cable 302 and the release lever RL' which would cause the interacting surfaces of the cable 302 and release lever RL' to be brought apart and back together causing impact sounds e.g. connector member 315 would be caused to rattle (shown as arrows R in FIG. 43A) within aperture 417 formed in the release lever RL'. Noise emanating from the closure latch assembly 310 when the closure latch is vibrated may be prevented or reduced.

Figure 43A:
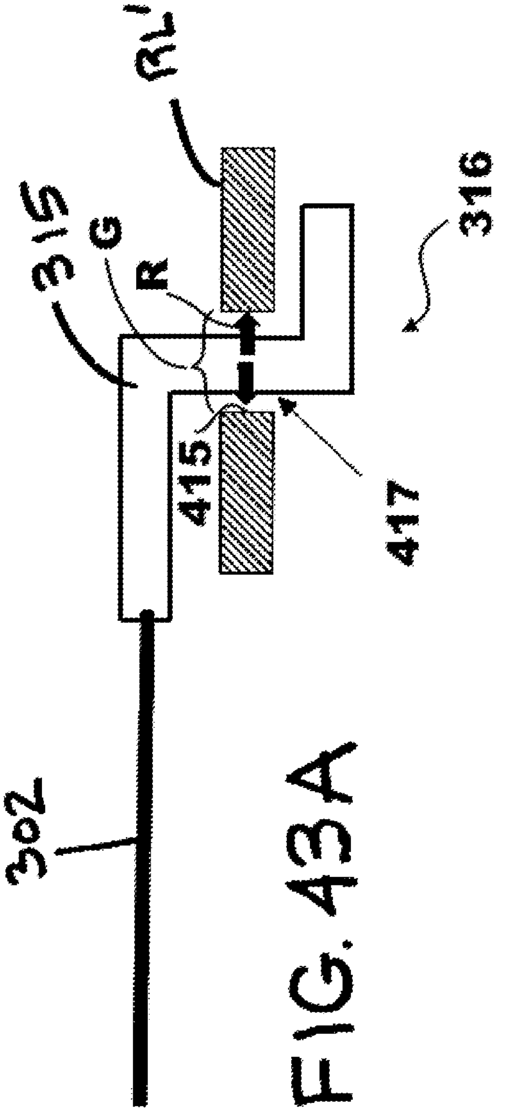
FIG. 43A illustrates a cable of an emergency backup mechanism in an undesired state of not being under tension.
Figure 43B:
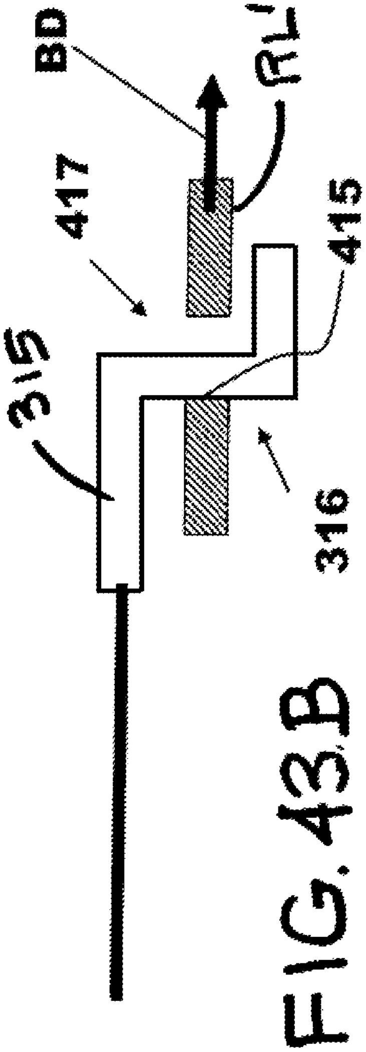
FIG. 43B illustrates a cable of an emergency backup mechanism in a state of being under tension in accordance with an aspect of the disclosure.

Aperture 417 may be sized having a large tolerance, shown as a gap G in FIG. 43A as compared to the width of a connector member 315, to be able to receive the connector member 315 (shown illustratively as an L shaped terminal connector of the cable 302) to facilitate assembly of the cable 302 with the release lever RL'. Illustratively, connector member 315 inserted into aperture 417 forms a connection 316 having initially a tolerance fit, which may be for example in one or more directions. During such an initial assembly step, relative movement between the cable 302 or connector 315 and the release lever RL' may occur, shown by the connector member 315 being able to be moved within the gap G, e.g. left or right in FIG. 43A. When the coupling between connector member 315 and the release lever RL' is configured to take-up the large tolerance such as when the release lever is in the non-deployed position following the completion of the initial assembly step, the relative movement between the cable 302 and the release lever RL' is inhibited to prevent noise during vibration of the closure latch assembly 310, which may occur during driving e.g. going over pop-holes, bumps in the road. As shown illustratively in FIG. 43B, the connector member 315 and an inner surface 415 of the aperture 417 may be urged into contact with one another, such as continuous contact. Illustratively the release lever RL' is shown to be biased in a direction BD such that the inner surface of the aperture 417 may be urged into contact with the connector member 315. Tolerance is thus taken up in one direction to prevent movement of the connector member 315 within the aperture 417.

Figure 42A:
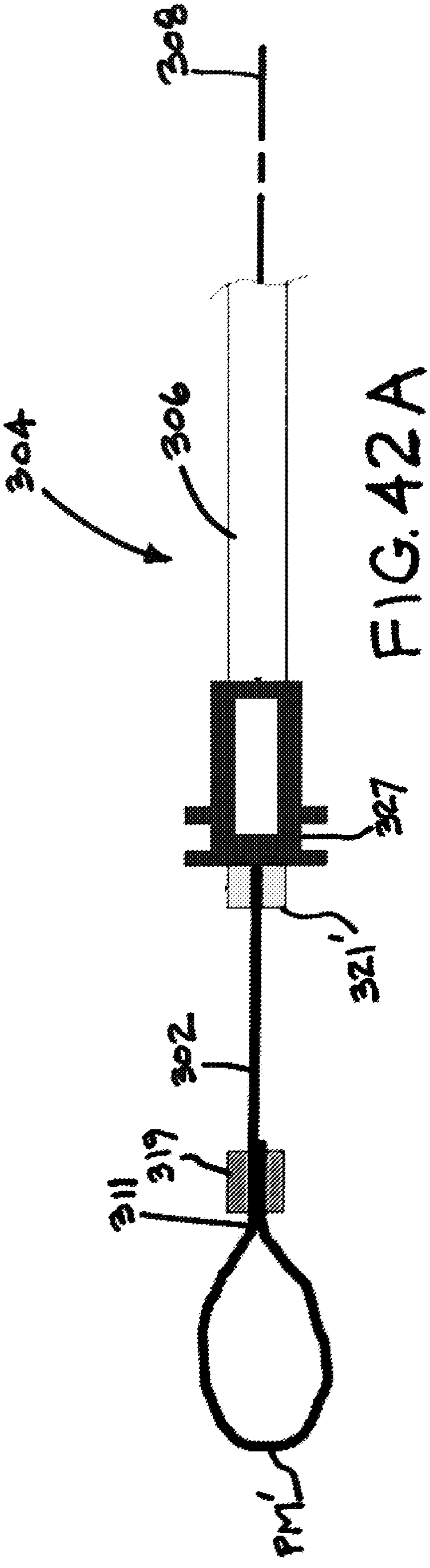
FIGS. 42A and 42B illustrate alternate embodiments of a portion of an emergency backup mechanism of a closure latch system similar to FIGS. 39-41B in accordance with yet further aspects of the disclosure.
Figure 42B:
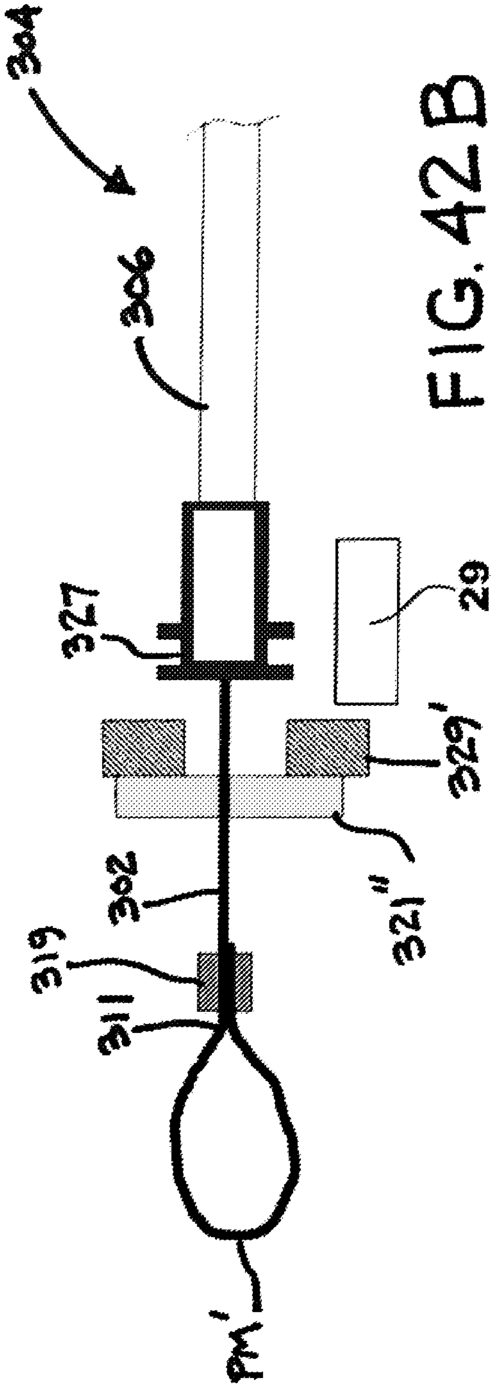

In FIGS. 42A and 42B, alternate embodiments are shown, wherein rather than fixing the stop surface 321 to the first end 323 of outer tubular cable conduit 306, the stop surface 321 is separate from the outer tubular cable conduit 306, wherein the stop surface 321 can be configured to be fixed to a door panel 329' separate from the door panel 329 disposed in groove 327.

Figure 44:
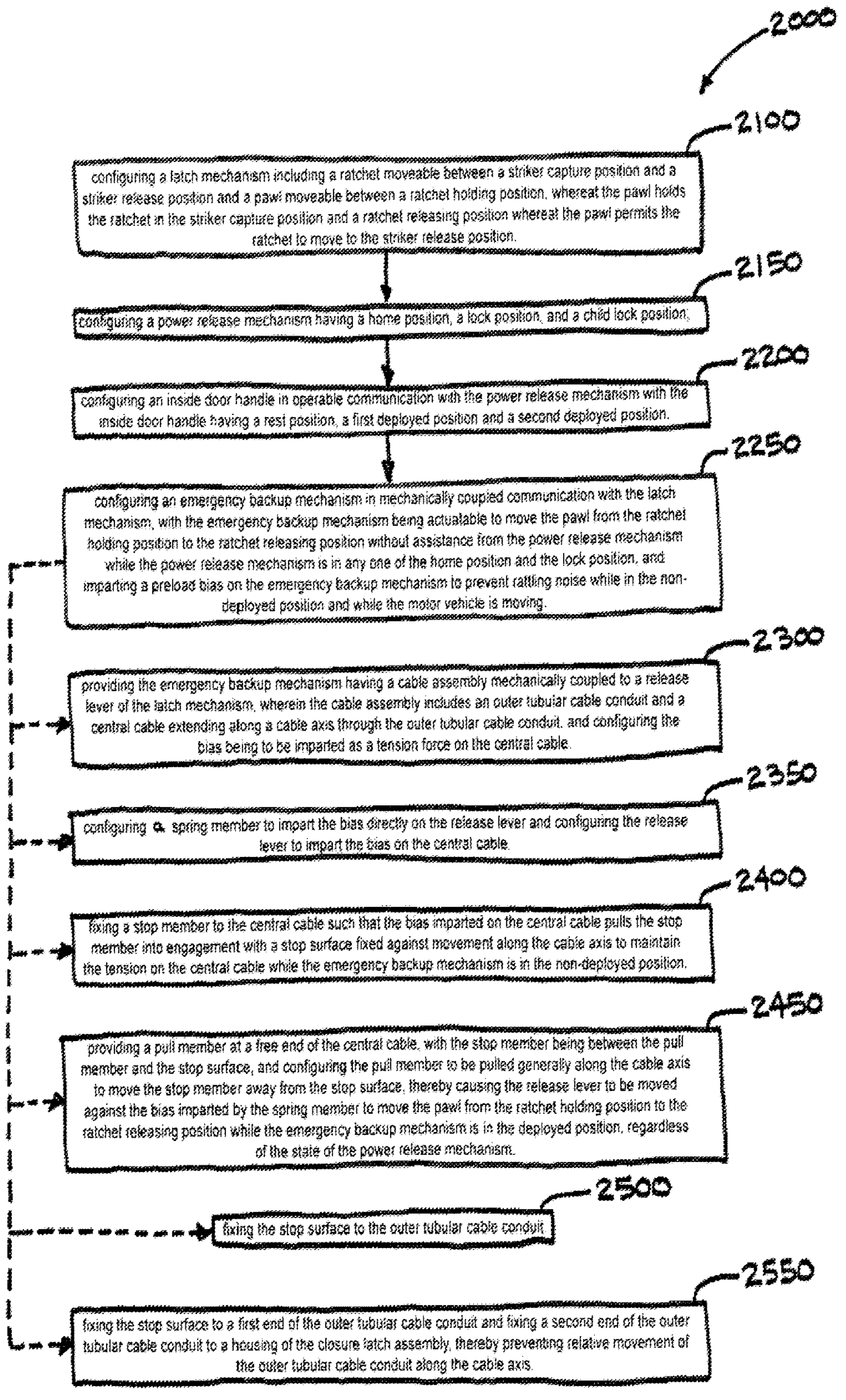
FIG. 44 is a flow diagram illustrating a method of constructing a closure latch system for a vehicle door in accordance with a further aspect of the disclosure.

In accordance with another aspect of the disclosure, as shown in FIG. 44, a method 2000 of constructing a closure latch system 310' for a vehicle door 12 of a motor vehicle 14 is provided. The method 2000 includes a step 2100 of configuring a latch mechanism including a ratchet moveable between a striker capture position and a striker release position and a pawl moveable between a ratchet holding position, whereat the pawl holds the ratchet in the striker capture position and a ratchet releasing position, whereat the pawl permits the ratchet to move to the striker release position. Further, a step 2150 of configuring a power release mechanism having a home position, a lock position, and a child lock position; and a step 2200 of configuring an inside door handle in operable communication with the power release mechanism with the inside door handle having a rest position, a first deployed position and a second deployed position. While the power release mechanism is in the home position, the pawl moves from the ratchet holding position to the ratchet releasing position under power of the power release mechanism in response to a single actuation of the inside door handle from the rest position to the first deployed position, and while the power release mechanism is in the lock position, the pawl does not move from the ratchet holding position to the ratchet releasing position under power of the power release mechanism in response to a single actuation of the inside door handle from the rest position to the first deployed position. Further yet, a step 2250 includes configuring an emergency backup mechanism EBM" in mechanically coupled communication with the latch mechanism, with the emergency backup mechanism EBM" being actuatable to move the pawl from the ratchet holding position to the ratchet releasing position without assistance from the power release mechanism while the power release mechanism is in any one of the home position and the lock position, and imparting a preload bias on the emergency backup mechanism EBM" to prevent rattling noise while in the non-deployed position and while the motor vehicle 14 is moving.

In accordance with a further aspect of the method 2000, a step 2300 includes In providing the emergency backup mechanism EBM" having a cable assembly 304 mechanically coupled to a release lever RL' of the latch mechanism, wherein the cable assembly 304 includes an outer tubular cable conduit 306 and a central cable 302 extending along a cable axis 308 through the outer tubular cable conduit 306, and configuring the bias being to be imparted as a tension force on the central cable 302.

In accordance with another aspect, the method 2000 can include a step 2350 of configuring a spring member 317 to impart the bias directly on the release lever RL' and configuring the release lever RL' to impart the bias on the central cable 302.

In accordance with another aspect, the method 2000 can include a step 2400 of fixing a stop member 319 to the central cable 302 such that the bias imparted on the central cable 302 pulls the stop member 319 into engagement with a stop surface 321, that is fixed against movement along the cable axis 308, to maintain the tension on the central cable 302 while the emergency backup mechanism EBM" is in the non-deployed position.

In accordance with another aspect, the method 2000 can include a step 2450 of providing a pull member PM' at a free end 311 of the central cable 302, with the stop member 319 being between the pull member PM' and the stop surface 321, and configuring the pull member PM' to be pulled generally along the cable axis 308 to move the stop member 319 away from the stop surface 321, thereby causing the release lever RL' to be moved against the bias imparted by the spring member 317 to move the pawl from the ratchet holding position to the ratchet releasing position while the emergency backup mechanism EBM" is in the deployed position, regardless of the state of the power release mechanism.

In accordance with another aspect, the method 2000 can include a step 2500 of fixing the stop surface 321 to the outer tubular cable conduit 306. For example, the stop surface 321 can be constructed as a separate piece of material from the outer tubular cable conduit 306 and then be subsequently attached thereto, such as via any suitable adhesive, including a weld joint, or, the stop surface 321 can be constructed as a monolithic piece of material with the outer tubular cable conduit 306.

In accordance with another aspect, the method 2000 can include a step 2550 of fixing the stop surface 321 to a first end 323 of the outer tubular cable conduit 306 and fixing a second end 325 of the outer tubular cable conduit 306 to a housing 331 of the closure latch assembly 310, thereby preventing relative movement of the outer tubular cable conduit 306 along the cable axis 308.

In accordance with another aspect, the method 2000 can include a step of configuring the emergency backup mechanism (EBM") to be made accessible via an access opening 202 in an inner door panel of the vehicle door 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure latch system for a vehicle door, comprising:

a closure latch assembly having a latch mechanism including a ratchet and a pawl, the ratchet being moveable between a striker capture position and a striker release position, the pawl being moveable between a ratchet holding position whereat the pawl holds the ratchet in its striker capture position and a ratchet releasing position whereat the pawl permits the ratchet to move to its striker release position;

a power release mechanism moveable by an actuator between a home position, whereat the pawl can be moved from the ratchet holding position to the ratchet releasing position upon a single actuation of the power release mechanism, and at least one of a double pull lock position and child lock position, whereat the pawl cannot be moved from the ratchet holding position to the ratchet releasing position upon a single actuation of the power release mechanism or upon a single actuation of an inside release member; and an emergency backup mechanism configured in mechanically coupled communication with the latch mechanism, wherein actuation of the emergency backup mechanism from a non-deployed position to a deployed position causes the pawl to move from the ratchet holding position to the ratchet releasing position regardless of the position of the power release mechanism, wherein the emergency backup mechanism has a preload bias imparted thereon to prevent rattling noise while in the non-deployed position, wherein the emergency backup mechanism has a cable assembly mechanically coupled to a release lever of the latch mechanism, wherein the bias is imparted on the cable assembly, and wherein the cable assembly includes an outer tubular cable conduit and a central cable extending along a cable axis through the outer tubular cable conduit, the bias being imparted on the central cable.

2. The closure latch system of claim 1, wherein the bias is a tension force imparted on the central cable.

3. The closure latch system of claim 1, wherein the bias is imparted by a spring member.

4. The closure latch system of claim 3, wherein the spring member imparts the bias directly on the release lever, whereupon the release lever imparts the bias on the central cable.

5. The closure latch system of claim 3, further including a stop member fixed to the central cable, wherein the bias imparted on the central cable pulls the stop member into engagement with a stop surface that is fixed against movement along the cable axis to maintain the tension on the central cable while the emergency backup mechanism is in the non-deployed position.

6. The closure latch system of claim 5, further including a pull member at a free end of the central cable, wherein the stop member is between the pull member and the stop surface, wherein the pull member is configured to be pulled generally along the cable axis to move the stop member away from the stop surface and move the release lever against the bias imparted by the spring member to cause the pawl to move from the ratchet holding position to the ratchet releasing position while the emergency backup mechanism is in the deployed position.

7. The closure latch system of claim 6, wherein the stop surface is fixed to the outer tubular cable conduit.

8. The closure latch system of claim 6, wherein the stop surface has a circumferentially extending groove configured for fixed receipt of an edge of a panel of the vehicle door therein.

9. The closure latch system of claim 8, wherein the outer tubular cable conduit extends between opposite first and second ends, the stop surface being fixed to the first end.

10. The closure latch system of claim 8, wherein the second end of the outer tubular cable conduit is fixed to a housing of the closure latch assembly.

11. A method of constructing a closure latch for a vehicle door, comprising:

configuring a latch mechanism including a ratchet moveable between a striker capture position and a striker release position and a pawl moveable between a ratchet holding position, whereat the pawl holds the ratchet in the striker capture position and a ratchet releasing position whereat the pawl permits the ratchet to move to the striker release position;

configuring a release lever in mechanically coupled communication with the latch mechanism and with a release member, with the release lever being actuatable to move the pawl from the ratchet holding position to the ratchet releasing position in response to actuation of the release member;

imparting a preload bias on the release lever to apply a tension to the release member; and restricting the travel of the release member to prevent the preload bias from moving the release lever past a home non-deployed position.

12. A closure latch assembly for a vehicle door, comprising:

a latch mechanism including a ratchet and a pawl, the ratchet being moveable between a striker capture position and a striker release position, the pawl being moveable between a ratchet holding position whereat the pawl holds the ratchet in its striker capture position and a ratchet releasing position whereat the pawl permits the ratchet to move to its striker release position; and a release lever operably coupled with the pawl, wherein actuation of the release lever from a non-deployed position to a deployed position causes the pawl to move from the ratchet holding position to the ratchet releasing position; and a release member operably coupled to the release lever, the release member for actuating the release lever;

wherein relative movement between the release member and the release lever is inhibited when the release member is coupled to the release lever to prevent noise during vibration of the closure latch assembly, wherein the release member is a cable, wherein a spring biases the release lever against the cable while the release lever is in the non-deployed position, and wherein while the release lever is in the non-deployed position, the release lever is not in contact with a stop surface.

13. The closure latch assembly of claim 12, wherein the cable is operably coupled to the release lever via a connection having a tolerance, wherein release lever in the non-deployed position is adapted to take up the tolerance.

14. The closure latch assembly of claim 12, wherein the non-deployed position of the release lever is controlled by an extended position of the cable.

15. A closure latch system for a vehicle door, comprising:

a closure latch assembly having a latch mechanism including a ratchet and a pawl, the ratchet being moveable between a striker capture position and a striker release position, the pawl being moveable between a ratchet holding position whereat the pawl holds the ratchet in its striker capture position and a ratchet releasing position whereat the pawl permits the ratchet to move to its striker release position;

a power release mechanism moveable by an actuator between a home position whereat the pawl can be moved from its ratchet holding position to its ratchet releasing position upon a single actuation of the power release mechanism, and at least one of a double pull lock position and a child lock position whereat the pawl cannot be moved from its ratchet holding position to its ratchet releasing position upon a single actuation of the power release mechanism or upon a single actuation of an inside release member; and an emergency backup mechanism having a cable mechanically coupled to a release lever of the latch mechanism, wherein actuation of the emergency backup mechanism from a non-deployed position to a deployed position causes the pawl to move from its ratchet holding position to its ratchet releasing position regardless of the position of the power release mechanism, wherein the emergency backup mechanism has a preload bias imparted thereon to prevent rattling noise while in the non-deployed position, and wherein a spring member imparts the bias directly on the release lever, whereupon the release lever imparts the bias on the cable.

16. The closure latch system of claim 15, further including a stop member fixed to the cable, wherein the bias imparted on the cable pulls the stop member into engagement with a stop surface that is fixed against movement along a cable axis to maintain tension on the cable while the emergency backup mechanism is in the non-deployed position.

17. The closure latch system of claim 16 further including a pull member at a free end of the cable, wherein the stop member is between the pull member and the stop surface, wherein the pull member is configured to be pulled generally along the cable axis to move the stop member away from the stop surface and move the release lever against the bias imparted by the spring member so as to cause the pawl to move from its ratchet holding position to its ratchet releasing position while the emergency backup mechanism is in the deployed position.

18. The closure latch system of claim 16, wherein the stop surface has a circumferentially extending groove configured for fixed receipt of an edge of a panel of the vehicle door therein.

* * * * *